Figure 1:
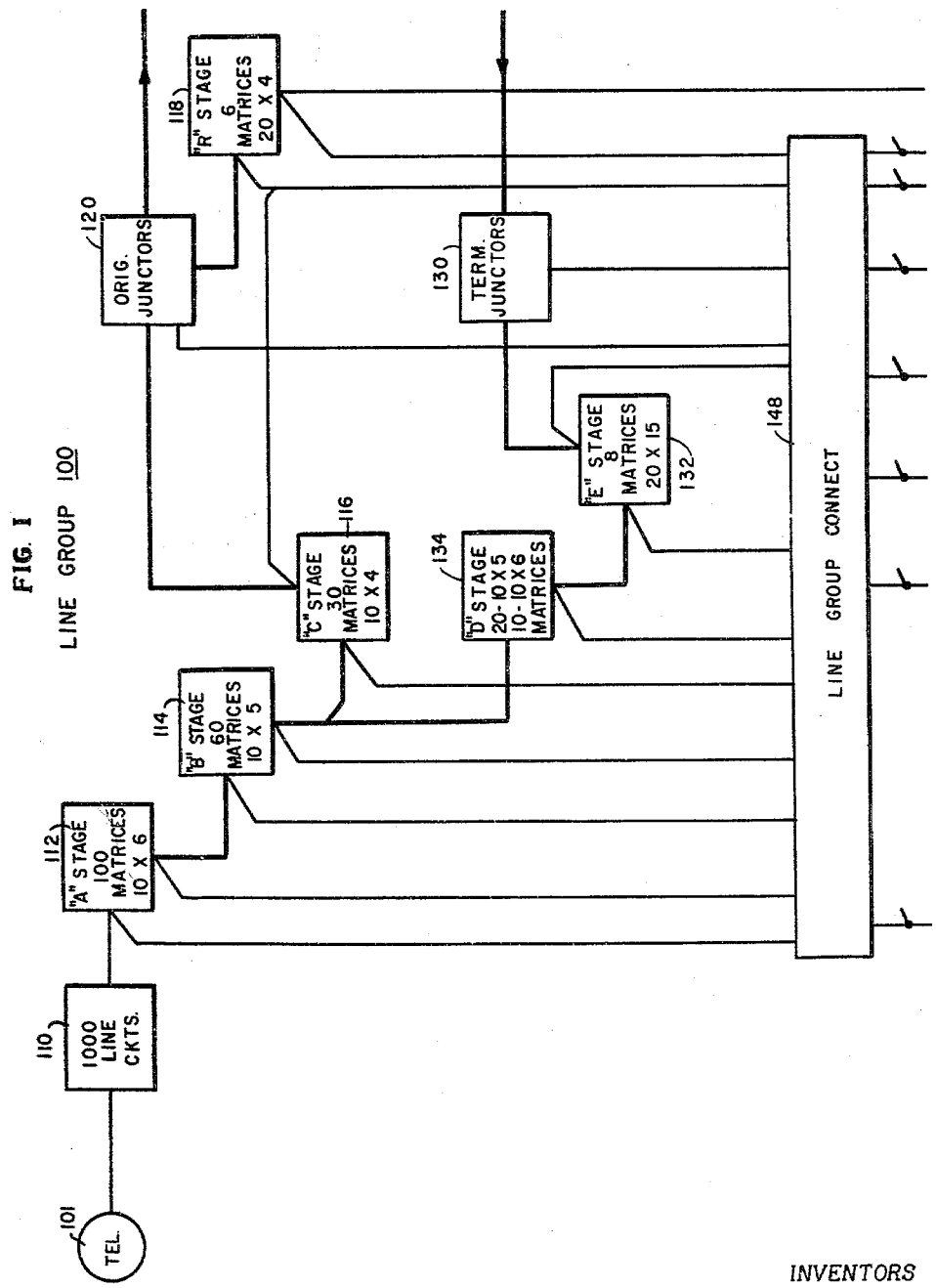
Figure 2:
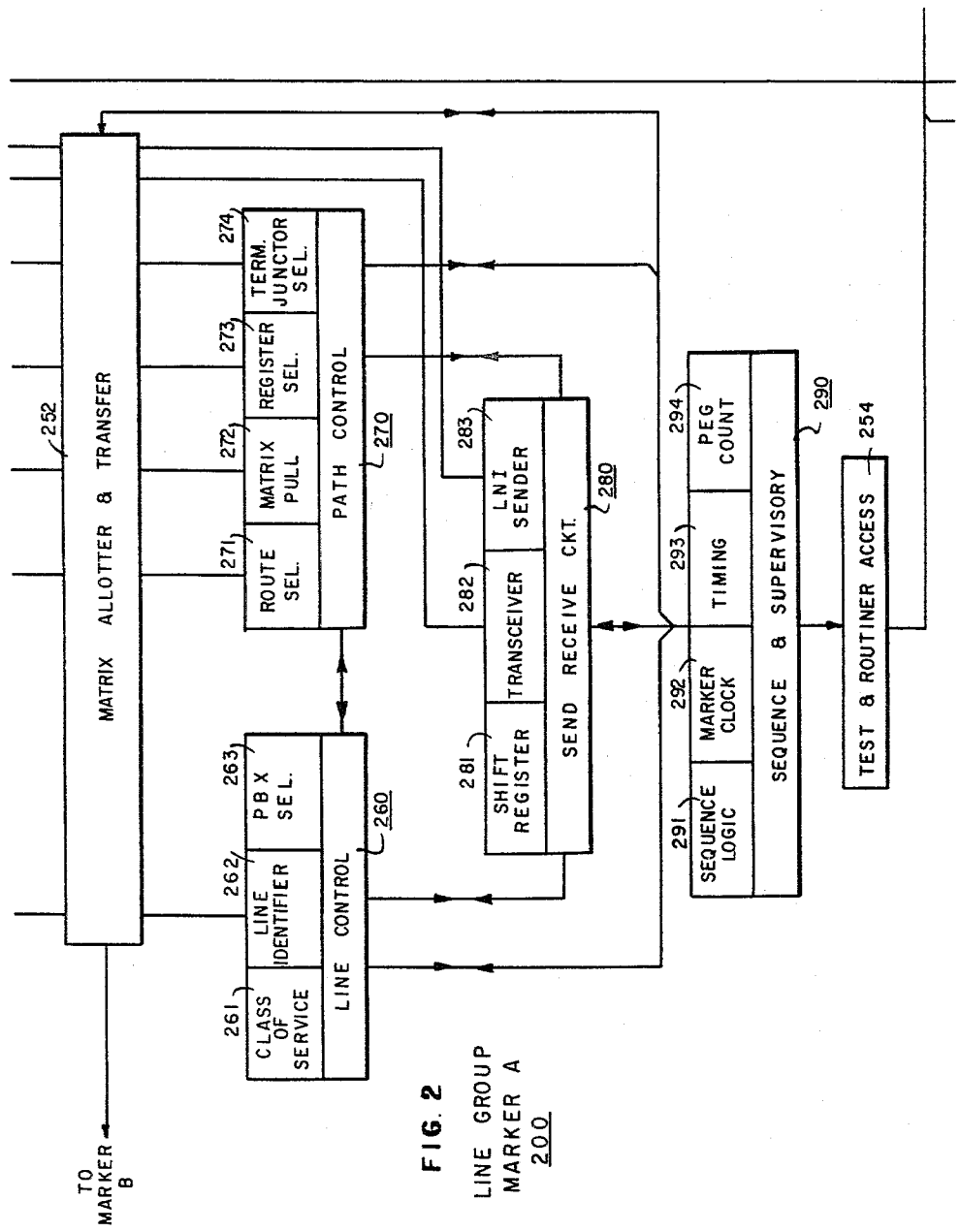
Figure 3:
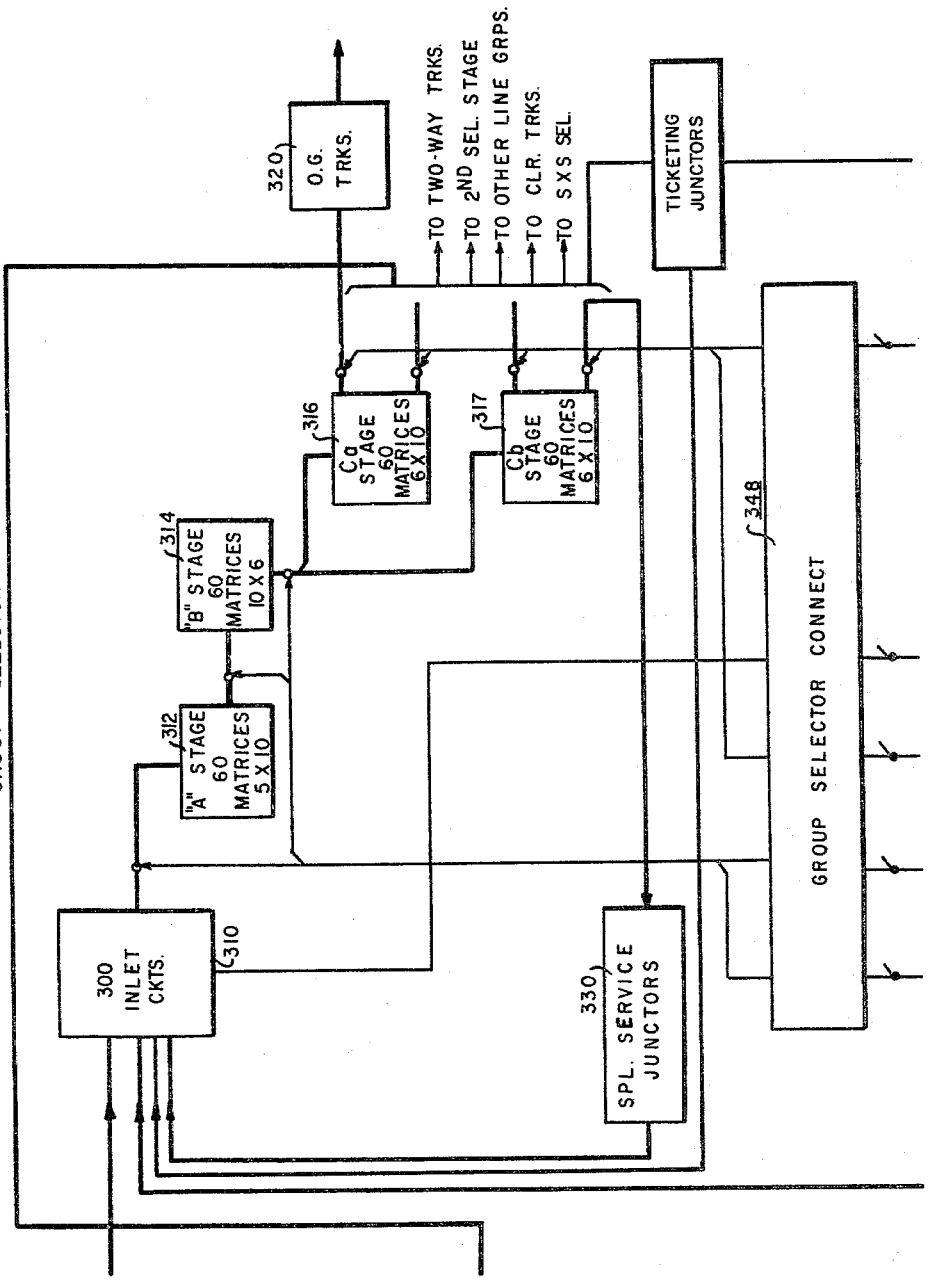
Figure 4:
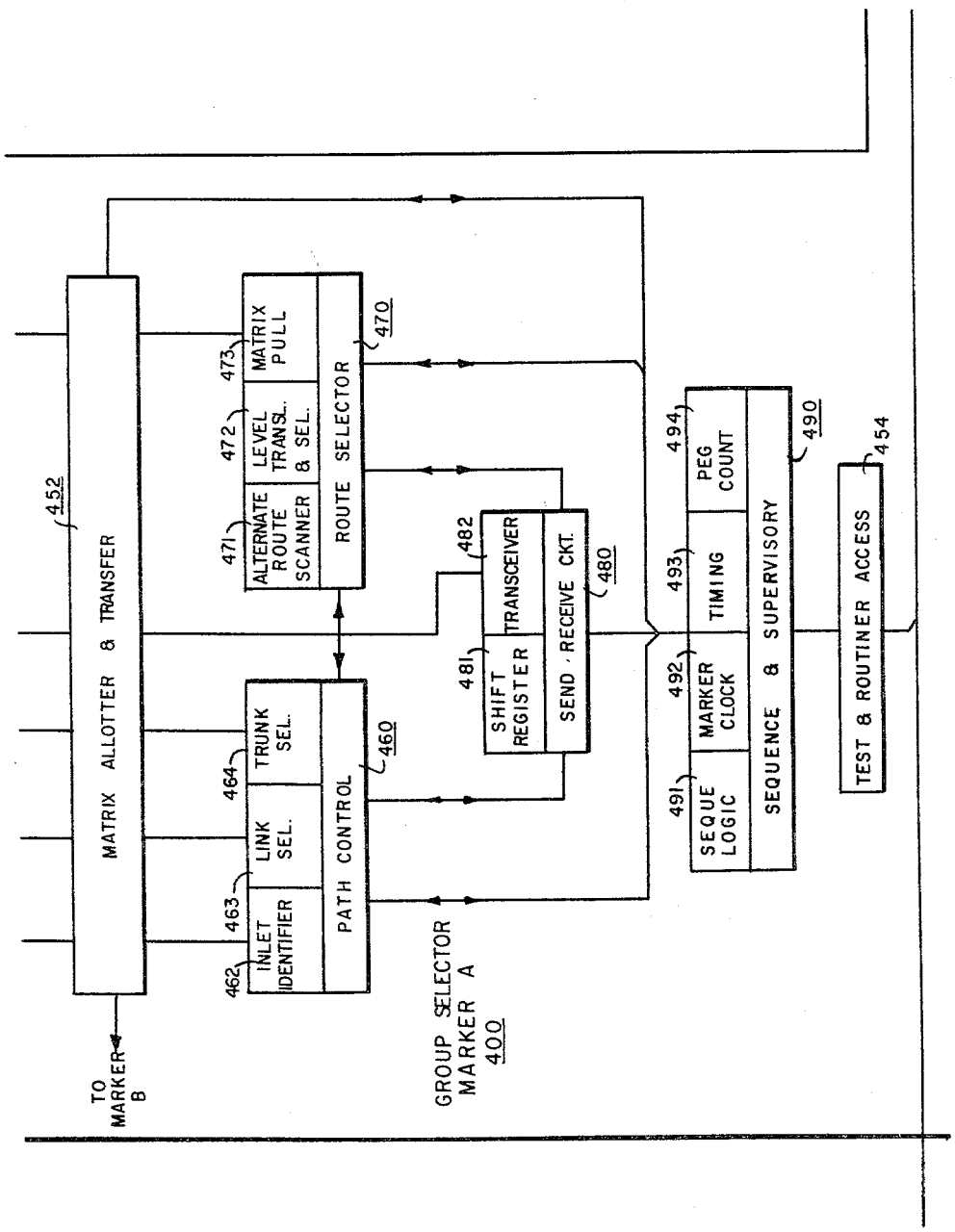
Figure 5:
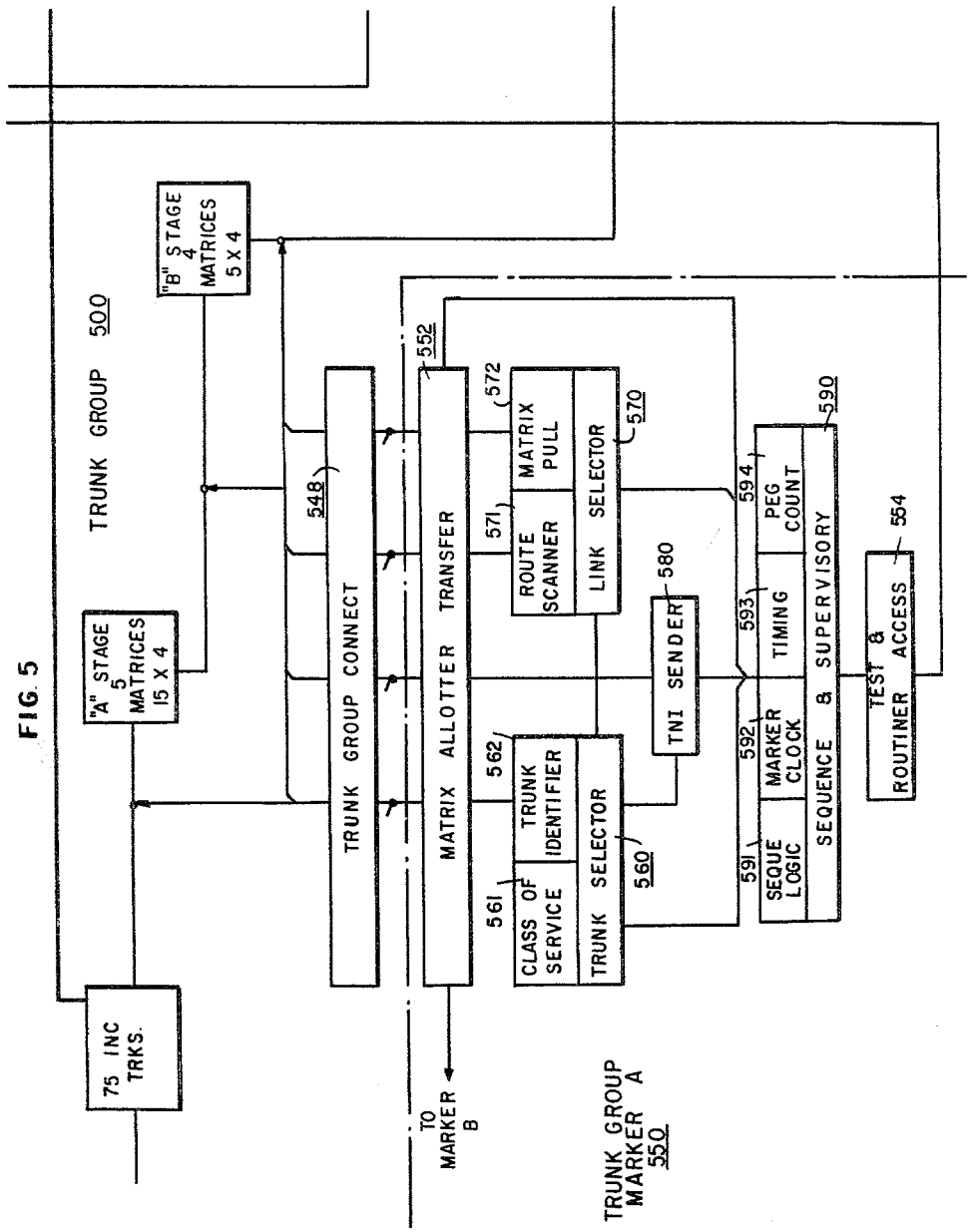

LINE GROUP MARKER A
200

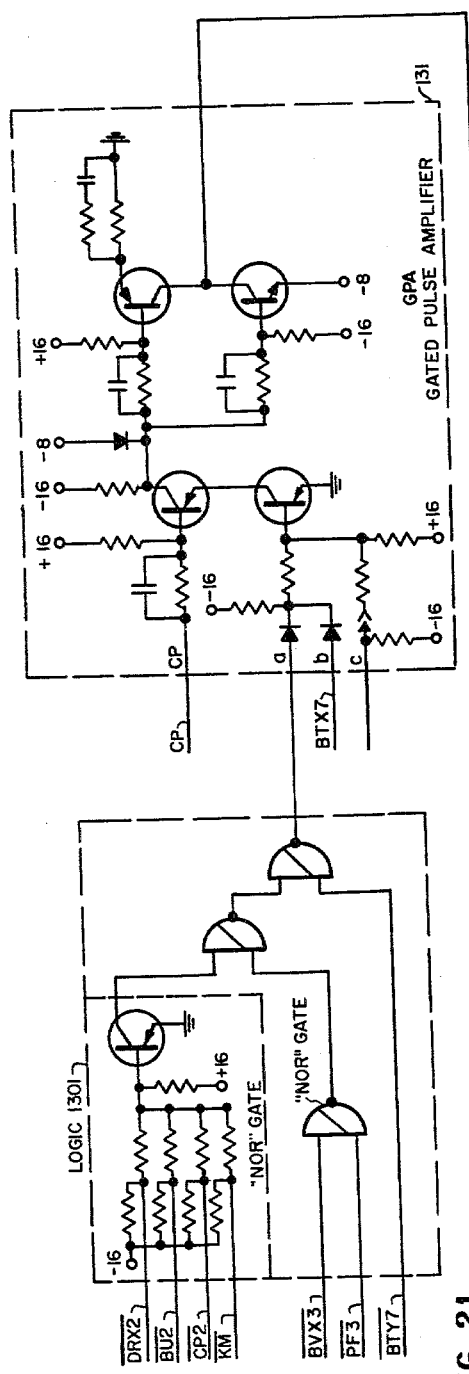
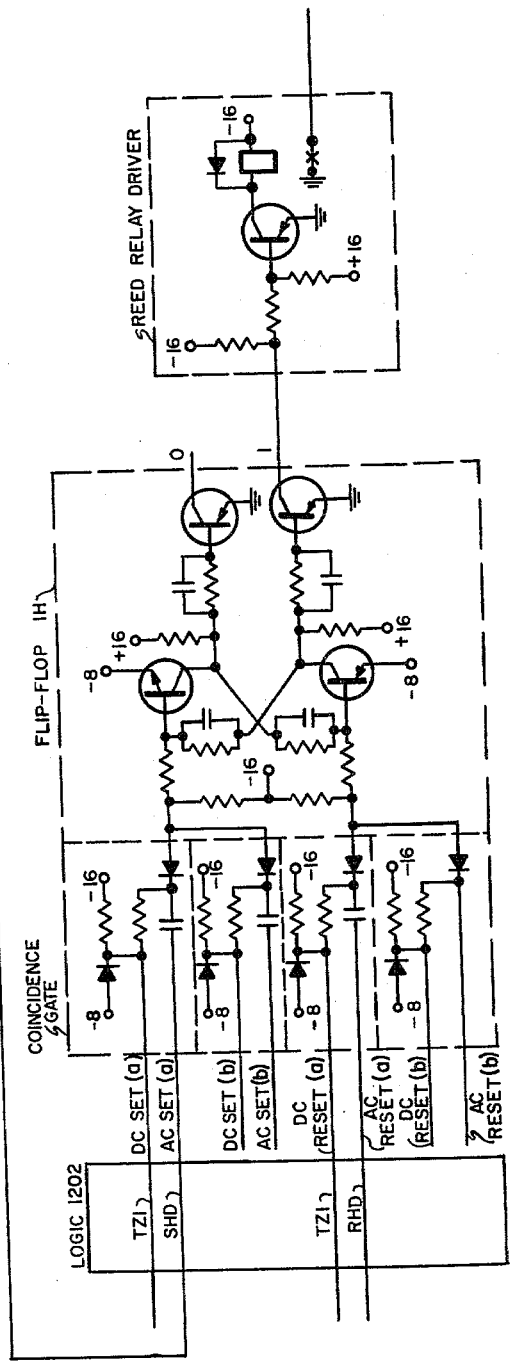
FIG. 21

United States Patent Office 3,173,994
Patented Mar. 16, 1965

3,173,994
COMMUNICATION SWITCHING SYSTEM
COMMON CONTROL
Kenneth E. Prescher and Ronald E. Schauer, Chicago, and John G. Van Bosse, Park Ridge, Ill., assignors to Automatic Electric Laboratories, Inc., Northlake, Ill., a corporation of Delaware
Filed Oct. 19, 1962, Ser. No. 231,625
11 Claims. (Cl. 179—7.1)

This invention relates to a communication switching system common control arrangement.

Many electronic automatic telephone switching systems have been developed in order to realize advantages such as fast operation, small size, and easy maintenance as compared to electromechanical systems. These electronic systems can be divided into two categories, those in which the voice path switching is accomplished by means of a common highway with time division multiplex sampling of the voice signals, and those using crosspoint switching devices connected in matrix form in one or more stages. The crosspoint type systems include small exchange types having approximately 100 lines in which control circuits such as registers and sequence swtiches are individual to connecting units such as links. In the larger crosspoint type systems the control circuits are time-shared by the connecting units. Furthermore, in order to permit non-decimal selections translation is usually provided in these systems. Translation permits conversion of called number information from the form in which it is received, for example as decimal dial pulses, to non-decimal forms for switch control and other purposes.

An object of this invention is the provision of an arrangement whereby the flexibility of telephone switching systems is increased in order to permit rapid and inexpensive rearrangements to meet changes in traffic and other environmental conditions and to facilitate the addition of new and unusual functions in telephone switching systems.

These and other objects of this invention are attained in one specific illustrative embodiment wherein the common control equipment includes a pool of registers, with each originating call using a register only until the connection to a called line or outgoing trunk is established; and with the pool of registers comprising electronic apparatus shared on a time division multiplex basis. The pool of registers is preferably divided into a plurality of register groups, each including a ferrite core coordinate array, used with the electronic apparatus in a recirculating arrangement. Senders are also included for transmitting switching information in response to information stored in the registers. A translator is provided for seizure by the register equipment for providing a translation between the equipment location numbers and the corresponding line directory numbers and for passing the translated information to the register.

According to one feature a register group includes a transceiver for communication with the translator in high speed serial binary code. The transceiver includes a shift register, a sender and a receiver. When a register requires service from a translator, during the time slot assigned to that register, if the transceiver is idle, it loads the shift register in a parallel manner from the memory; and supplies a request-for-service indication to the translator. The translator when ready acknowledges the request, and at a time unrelated to the time slot of the register, the information is shifted serially out of the shift register to modulate the sender, which thereby transmits the information to the translator. The translator then processes the information and transmits it back to the transceiver, where it is received, demodulated, and supplied and shifted into the shift register serially. Then during the next time slot of the register which had requested the translation, the information is supplied to the memory in a parallel manner from the shift register.

Figure 8:
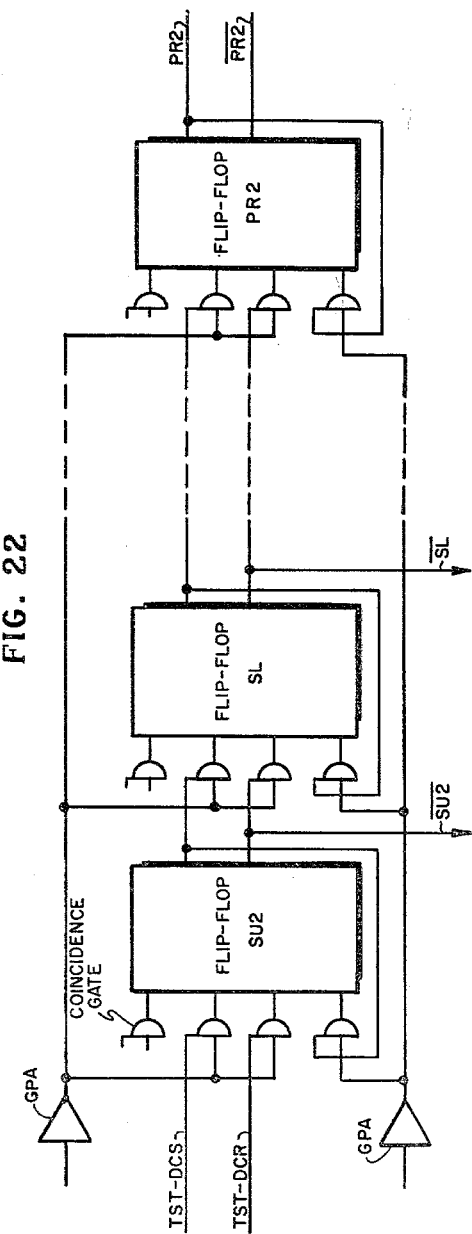
Figure 9:
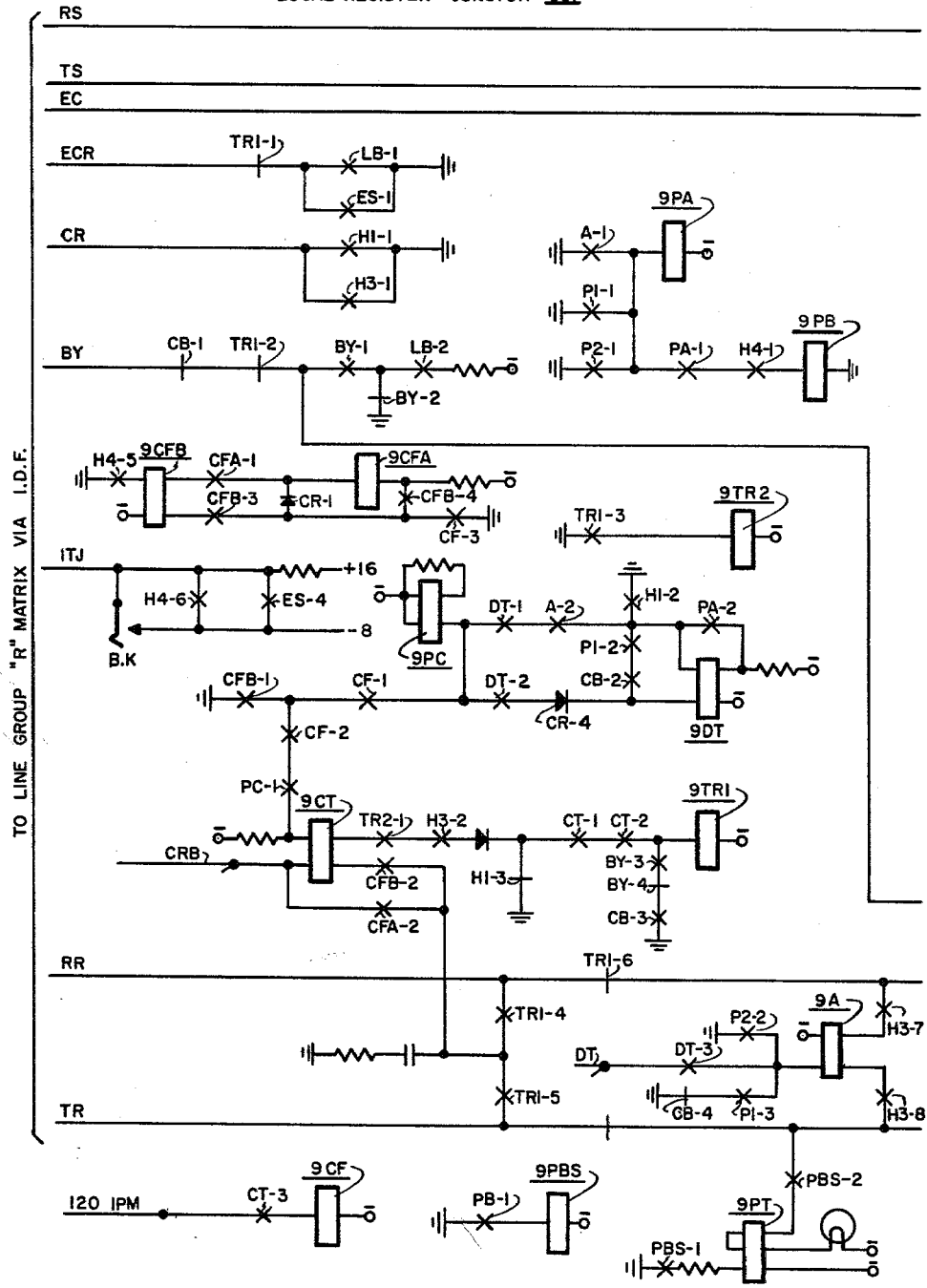
Figure 10:
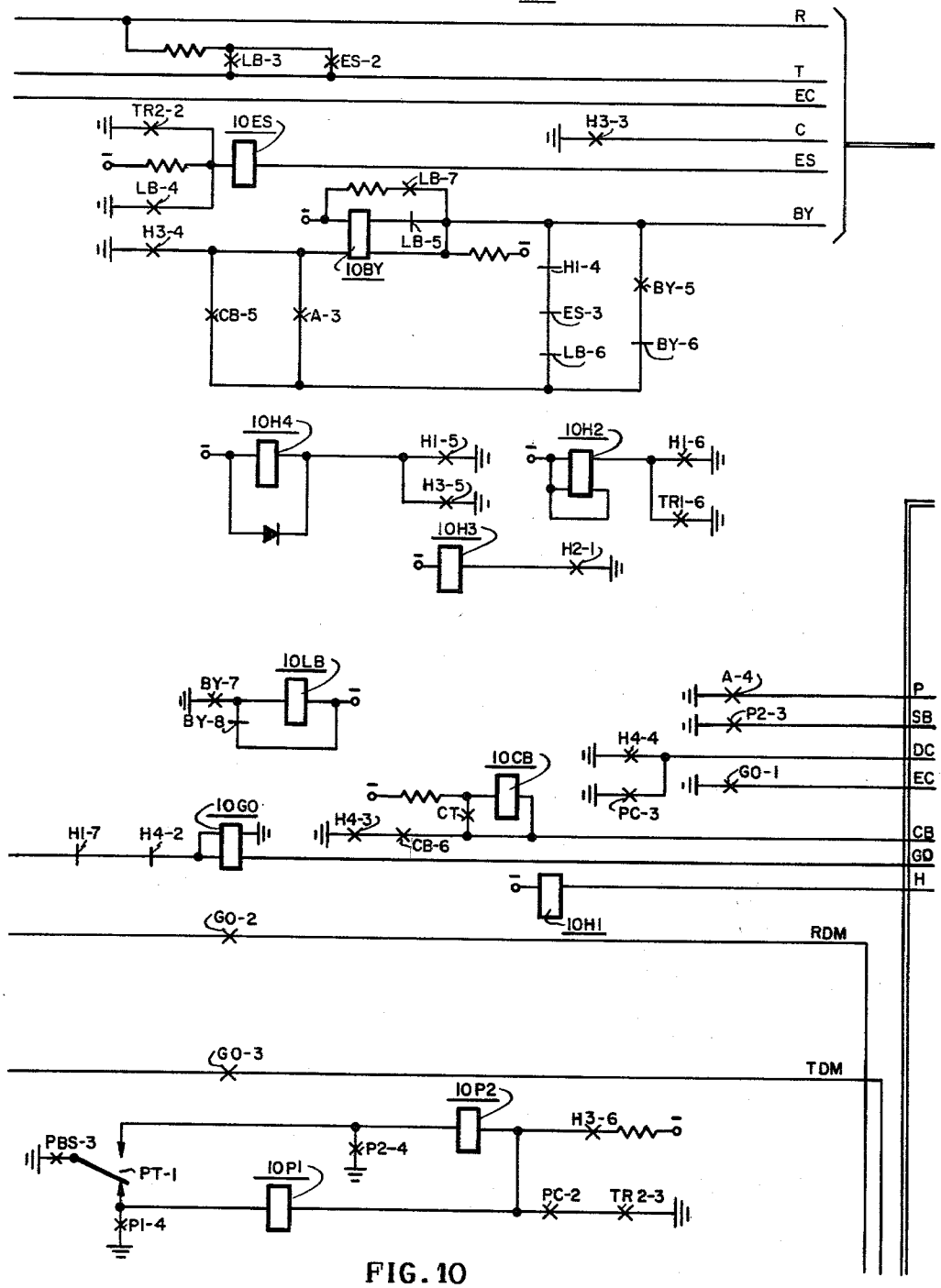
Figure 11:
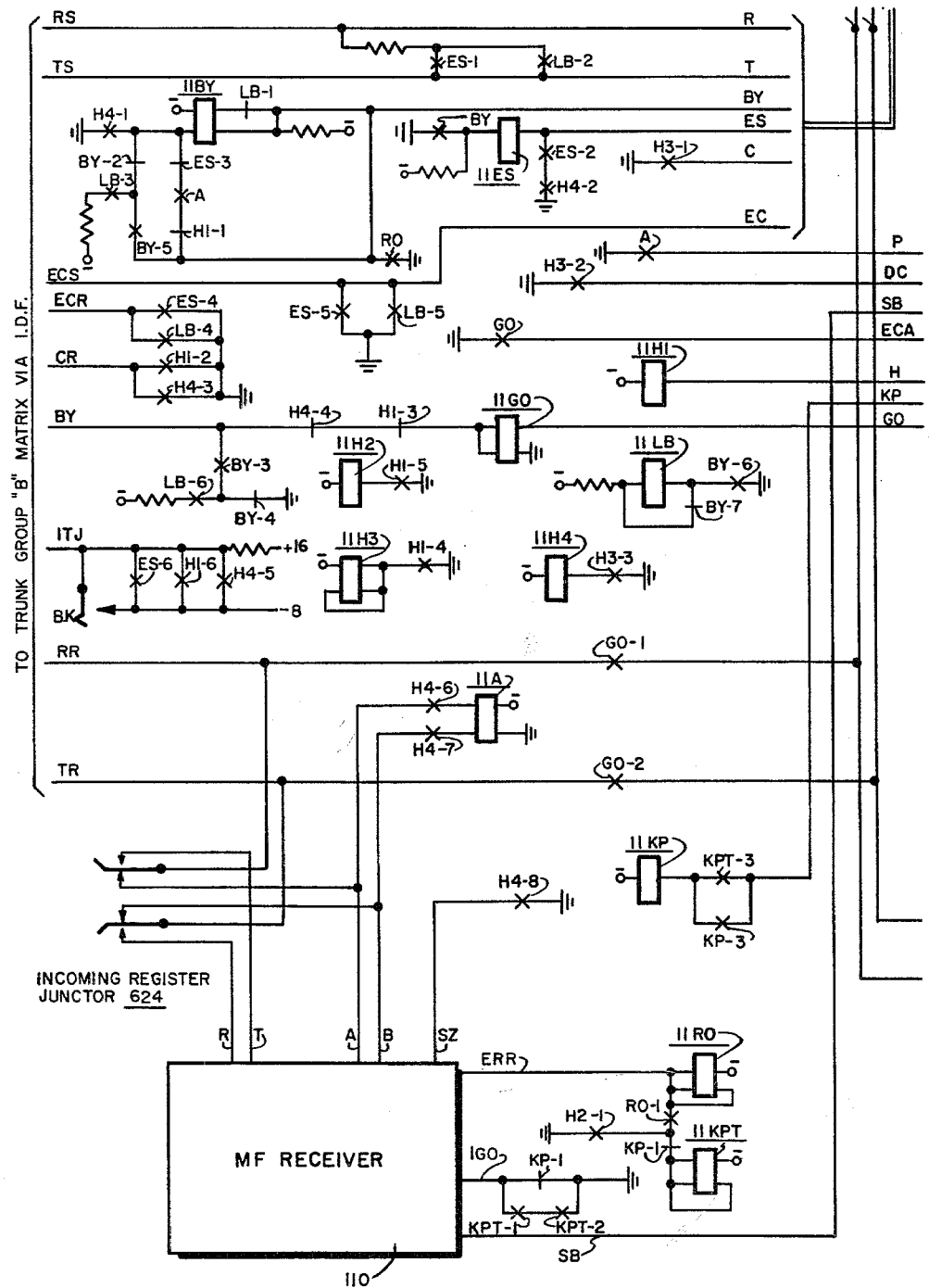
Figure 12:
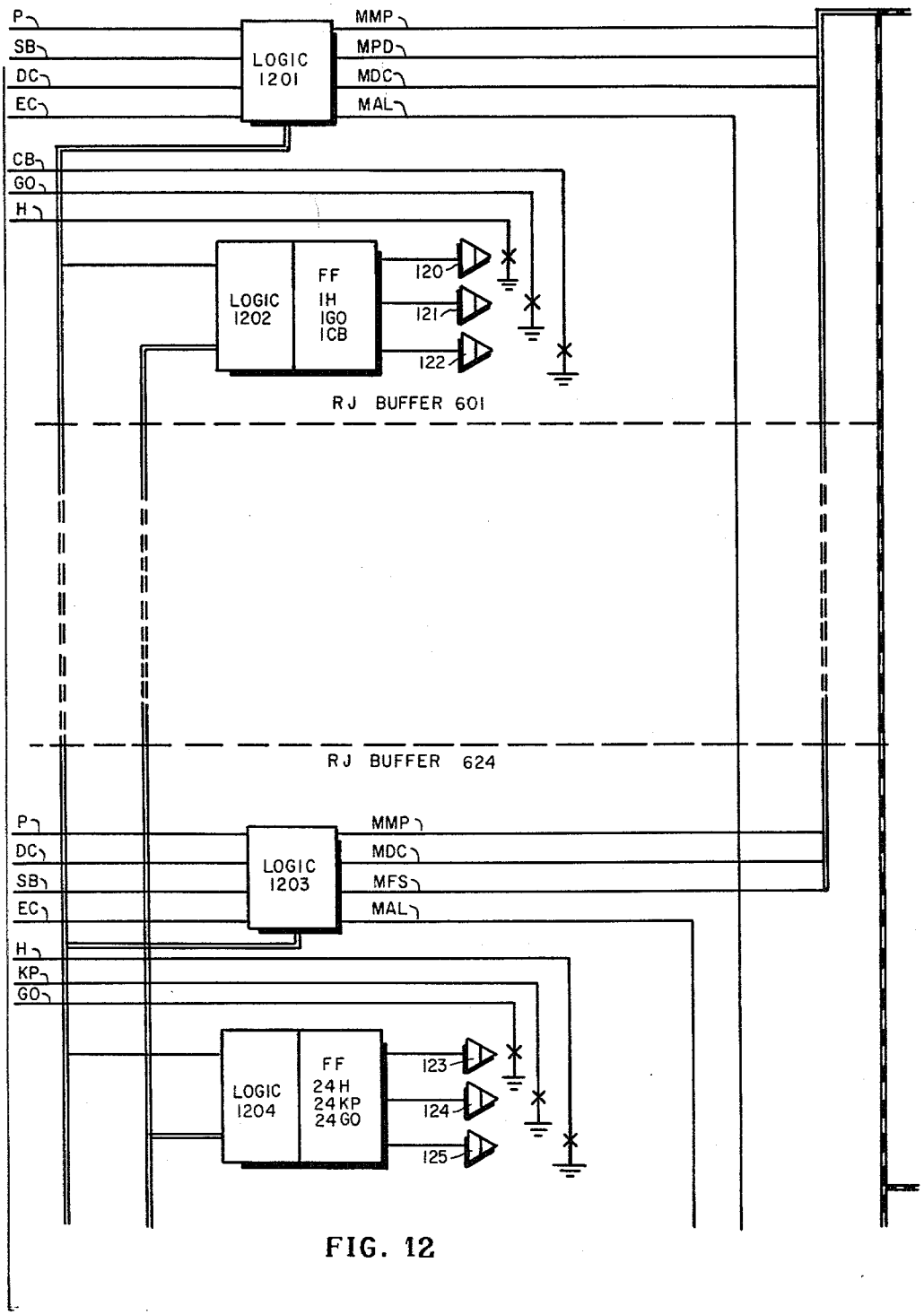
Figure 13:
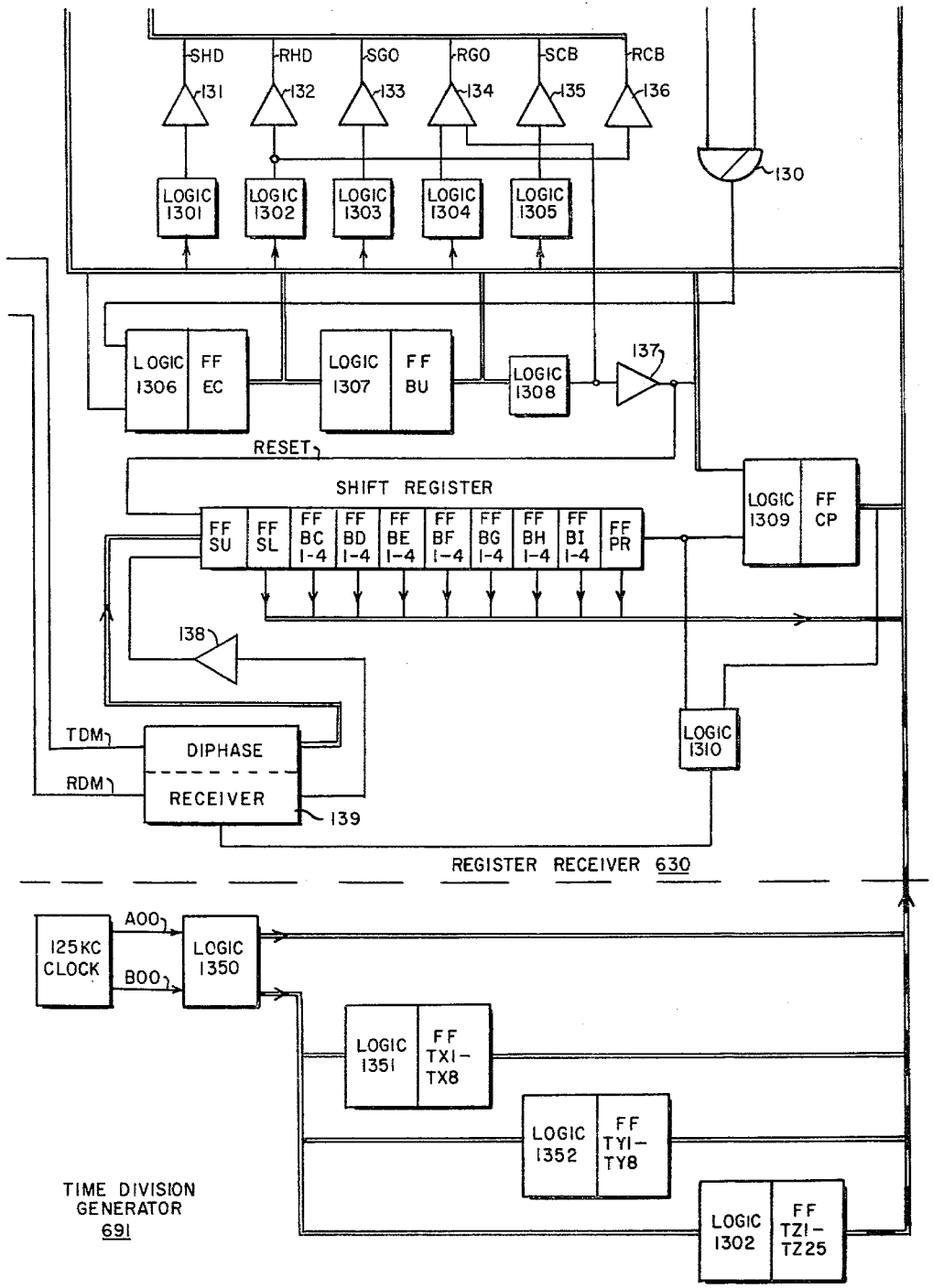
Figure 14:
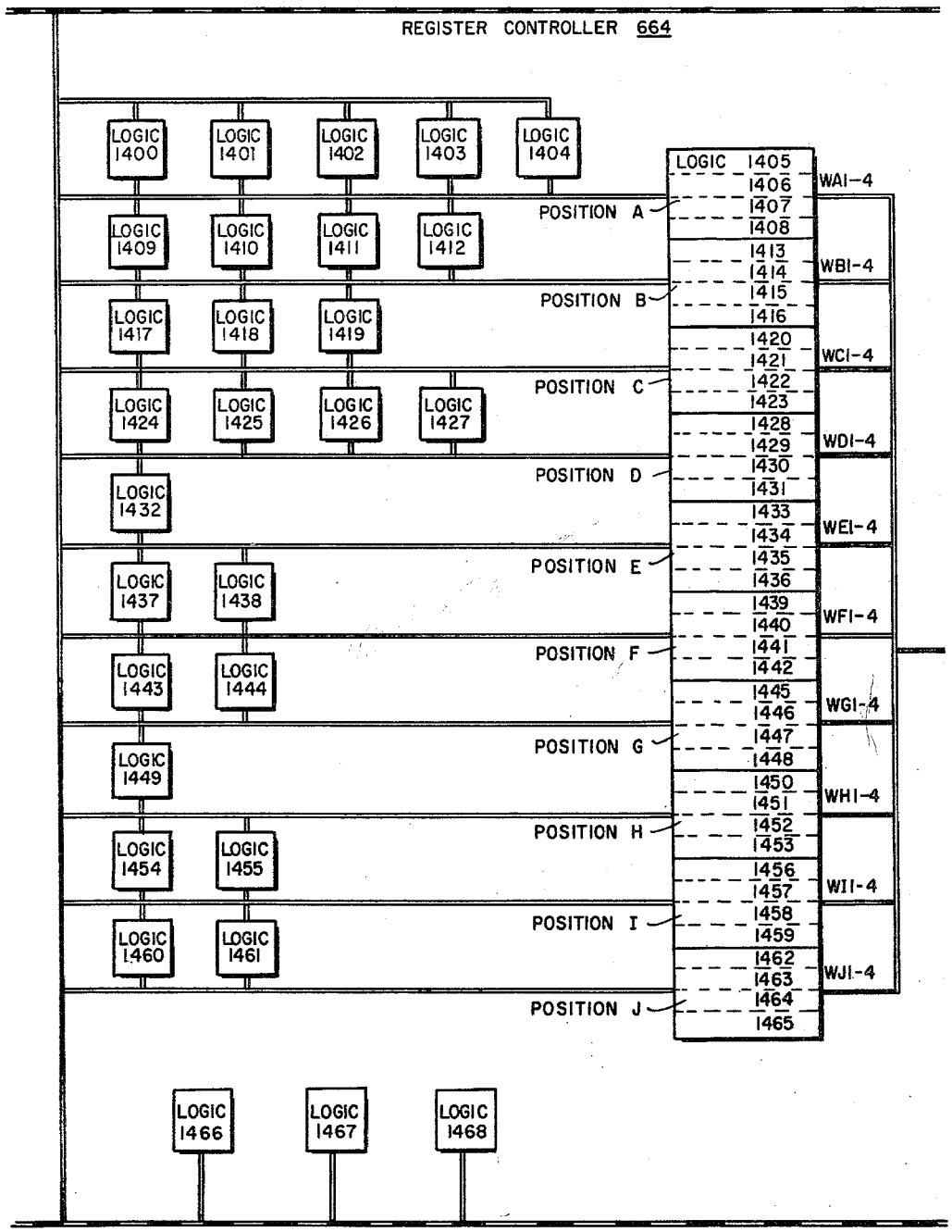
Figure 15:
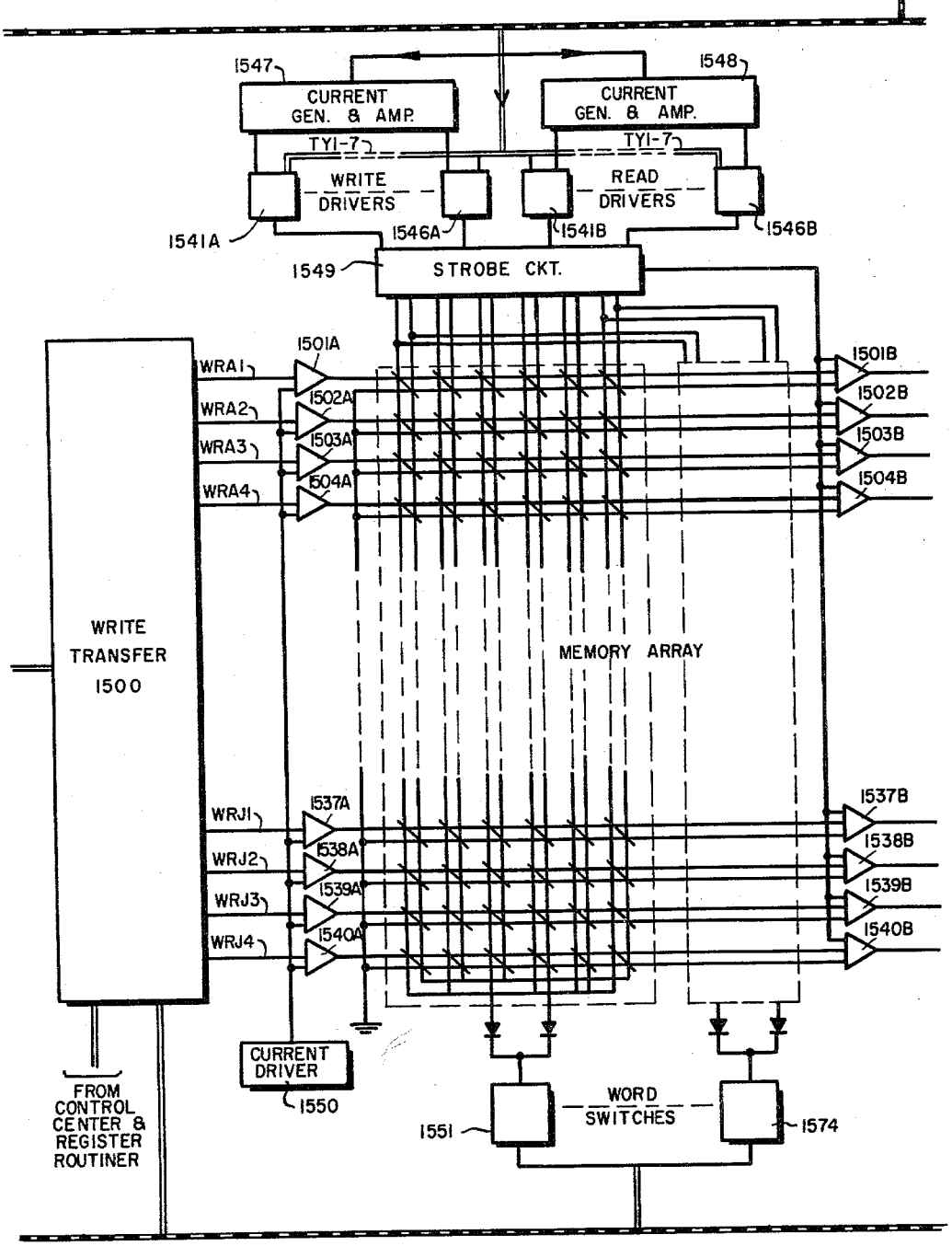
Figure 16:
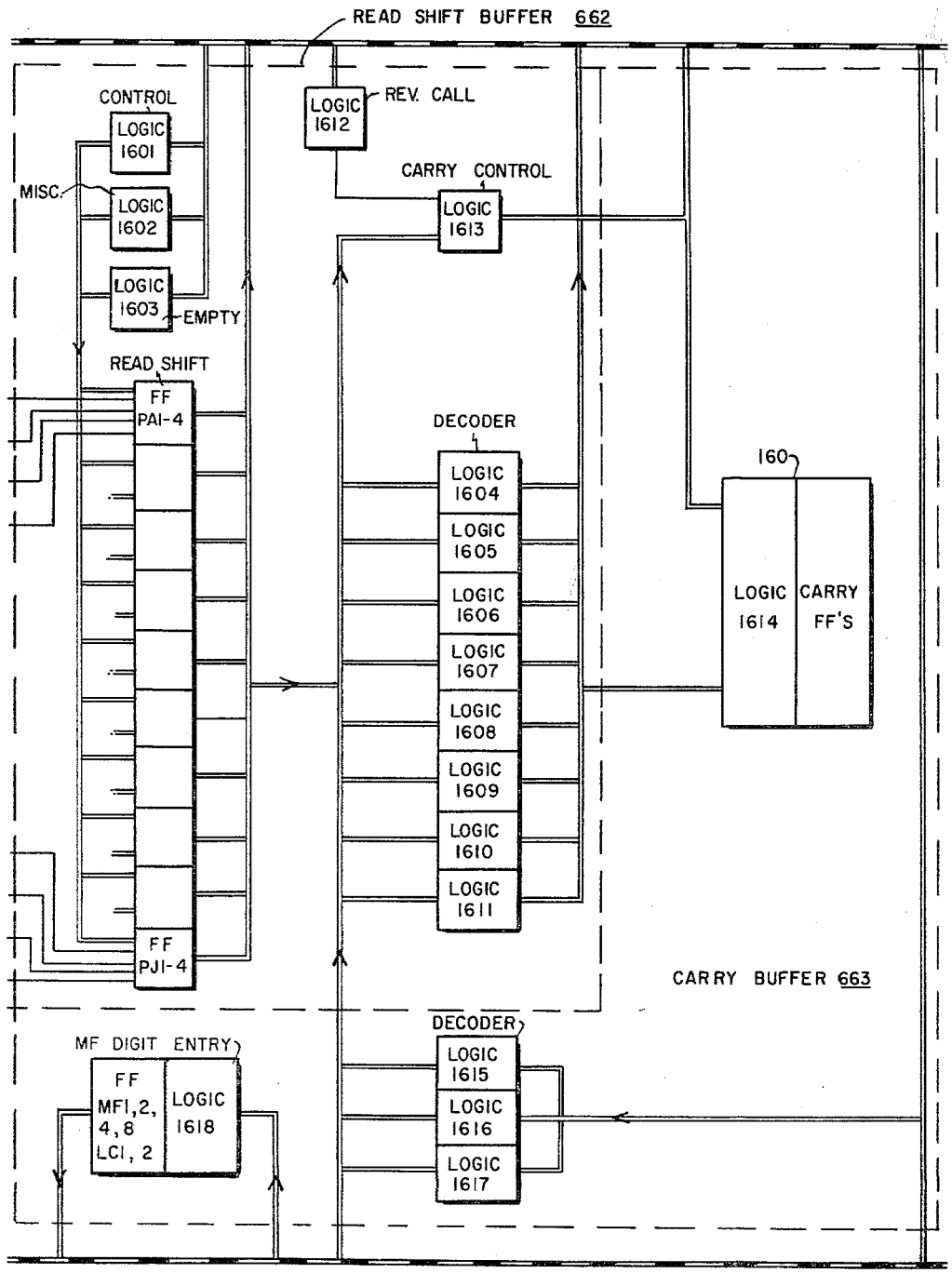
Figure 17:
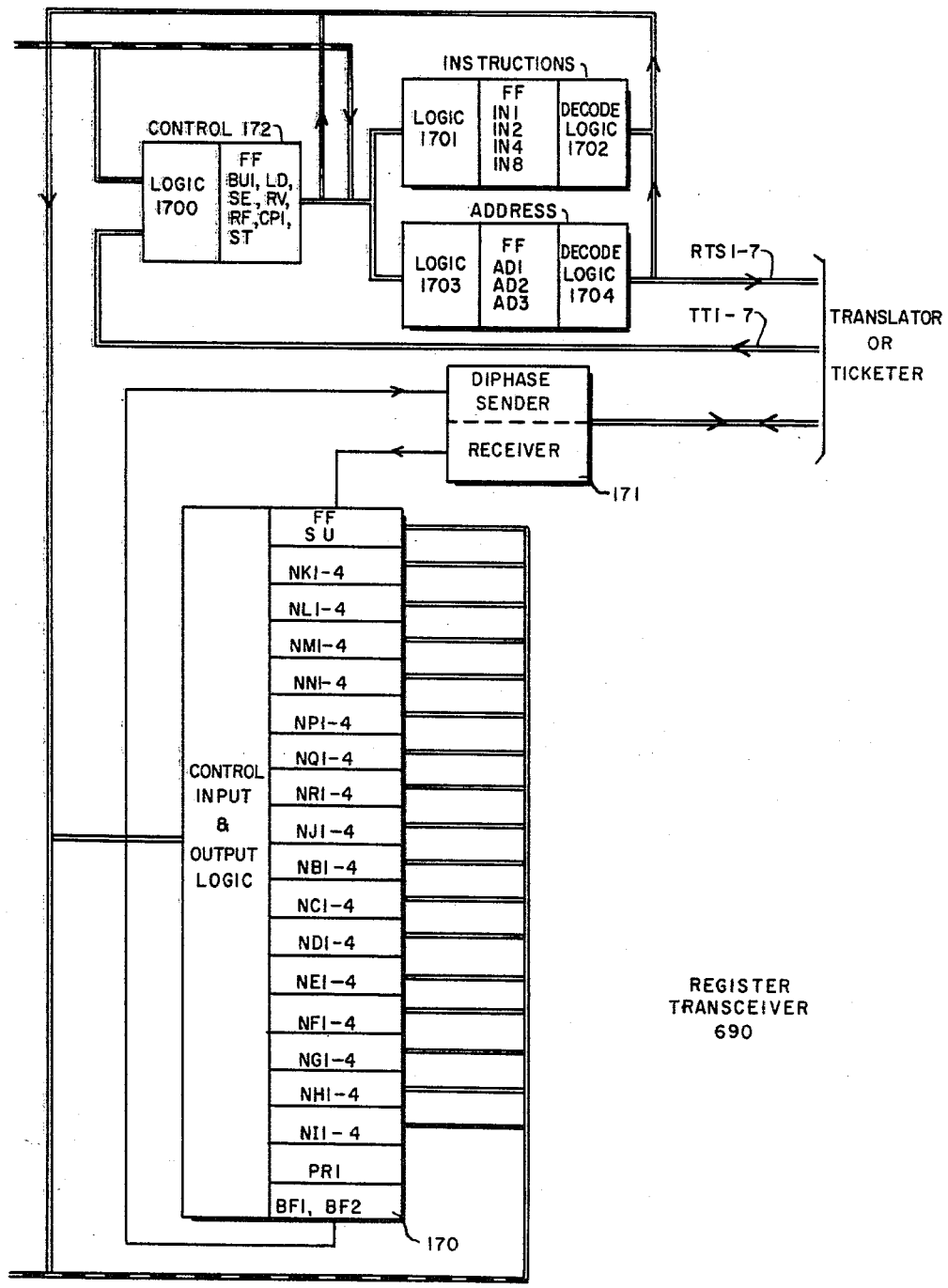
Figure 18:
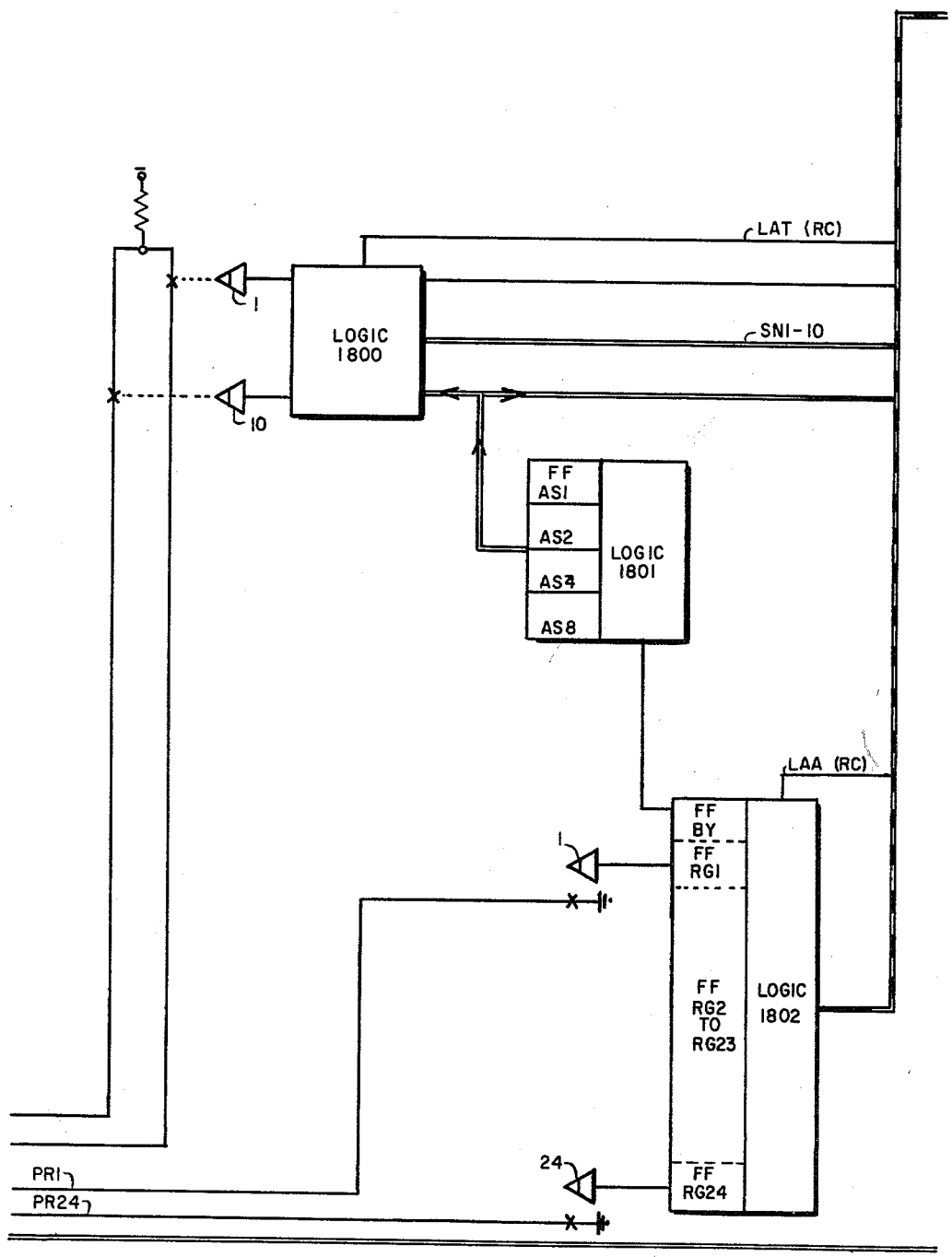
Figure 19:
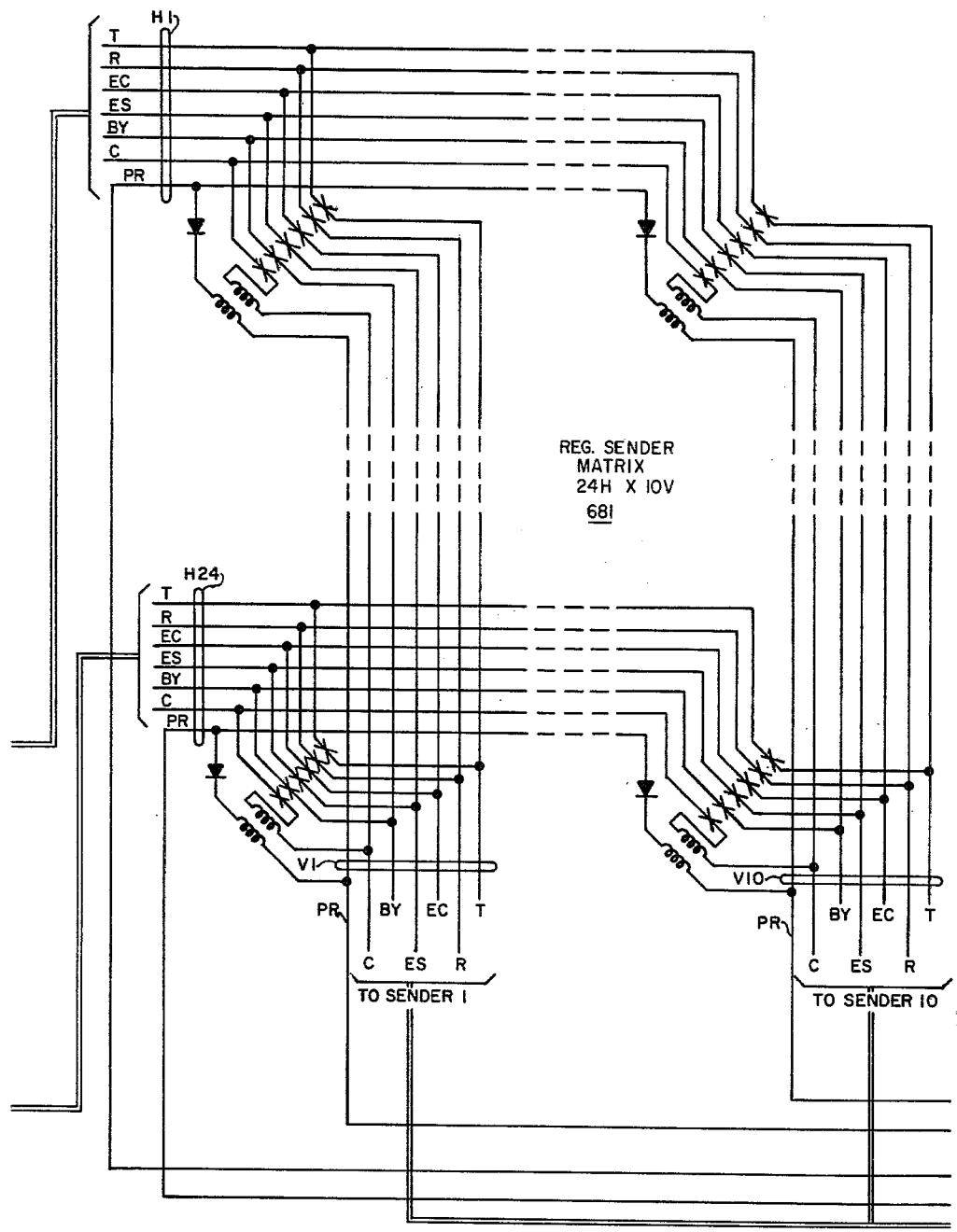
Figure 20:
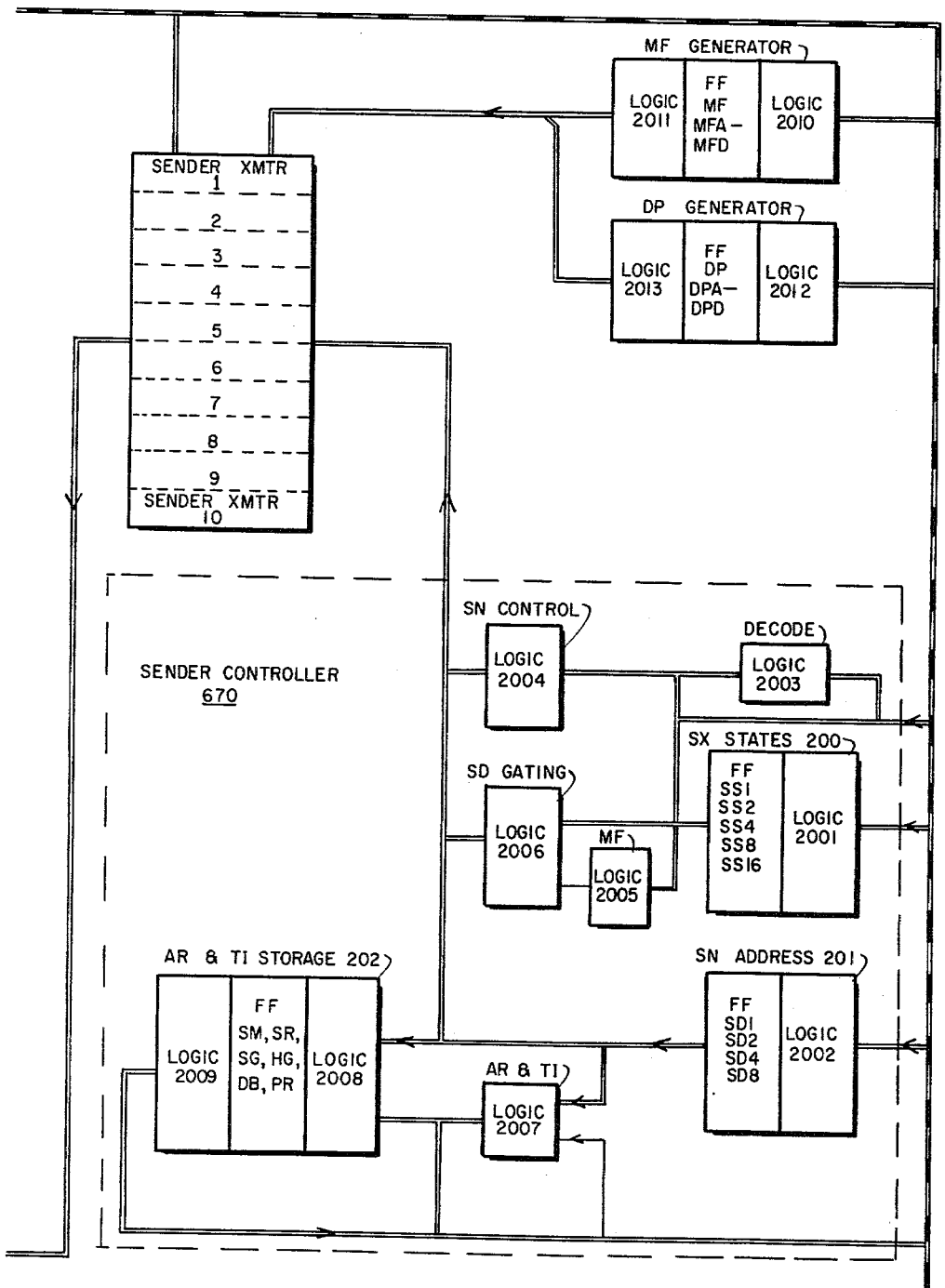

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–23 wherein:

FIGS. 1 to 7 when arranged as shown in FIG. 8 comprise a block diagram of a telephone switching exchange;
FIG. 8 shows how FIGS. 1 to 7 are to be arranged;
FIGS. 9–10 are schematic representations of a local register junctor;
FIG. 11 is a schematic diagram of an incoming register junctor;
FIG. 12 is a symbolic block diagram of the register junctor buffer and lead multiplexer;
FIG. 13 is a symbolic block diagram of the receiver and the time division generator;
FIG. 14 is a symbolic block diagram of the register controller;
FIG. 15 is a symbolic block diagram of the write transfer, memory write control, ferrite-core memory array, and the memory read control;
FIG. 16 is a symbolic block diagram of the read shift buffer and the carry buffer;
FIG. 17 is a symbolic block diagram of the register transceiver;
FIG. 18 is a symbolic block diagram of the sender assigner;
FIG. 19 is a schematic diagram of the register sender matrix;
FIG. 20 is a symbolic block diagram of the sender controller, the multi-frequency and dial pulse generator, and the sender transmitters;
FIG. 21 is a schematic diagram of logic 1301, gated pulse amplifier 131, logic 1202, flip-flop 1H, and reed relay driver 120;
FIG. 22 is a symbolic block diagram of a shift register, using a block-diagram representation of the flip-flops as shown in schematic form in FIG. 21; and
FIG. 23 shows how FIGS. 9–20 are to be arranged.

The system is explained according to the following outline:

PART 1. System Organization
PART 2. Typical Call
PART 3. General Description of the Register Sender
    A. Components
    B. Operation
PART 4. Detailed Description of the Register Sender
    A. Components
        (1) Symbolism
        (2) Register sender logic
            2a. LM, register junctor buffer and lead multiplexer
            2b. RR, register receiver
            2c. RC, register controller
            2d. RB, read shift buffer
            2e. CA, carry buffer
            2f. RT, register transceiver
            2g. SA, sender assigner
            2h. SC, sender controller
            2i. PG, multi-frequency and dial pulse generator
            2j. Time division generator
        (3) Register junctor
            3a. Local
            3b. Incoming PART 4. Detailed Description of the Register Sender—
    Continued
    A. Components—Continued
        (4) Register junctor buffer and lead multiplexer
        (5) Register receiver
        (6) Register controller
        (7) Write transfer
        (8) Memory write, ferrite core memory array, and memory read
        (9) Read shift buffer
        (10) Carry buffer
        (11) Register transceiver
        (12) Sender assigner
        (13) Register sender matrix
        (14) Sender controller
        (15) Multi-frequency and dial pulse
        (16) Time division generator
    B. Operation
        (1) Local call
        (2) Trunk call
            2a. Local
            2b. Incoming

PART 1.—SYSTEM ORGANIZATION

The system consists of the line group 100, group selector 300, register-sender group 600, and the translator 700. There is also a trunk group 500 which provides access from incoming trunks to the registers, and a control center 790 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semi-conductor circuitry is employed throughout the system. A ferrite core memory 660 is used for temporary storage whereas the magnetic drum 730 is used for semi-permanent storage.

The space division switching elements of the system consists of reed relay matrix assemblies in configurations of 10×6, 10×5 and 10×4. The crosspoints are made up of reed capsules and having normally two windings. They are mounted on a two layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and crosspoint matrix assemblies the following pending United States patent applications may be referred to:

E. J. Glenner and K. K. Spellnes, Crosspoint Switching Arrays, Serial No. 127,237, filed July 27, 1961.

G. S. Lychyk and A. Taliste, Dry Reed Relays, Serial No. 127,648, filed July 28, 1961.

P. K. Gerlach, G. J. David and R. O. Stoehr, Printed Matrix Board Assembly, Serial No. 132,897, filed August 21, 1961.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards, 6 inches by 5½ inches.

The two switching stages, the line group and group selector may not necessarily be installed in the same building. The line group may be remotely located and will then operate as a satellite office. No register-senders will be needed in the satellite, but a transceiver will provide for sending and receiving of switching information between the markers of the satellite and the register-senders in the main office.

The method of signaling between the system groups is accomplished by a technique called di-phase. This method employs a phase shift technique for serial sending and receiving of pulses.

The group selector may, in connection with the register-sender group and the translator, operate as a trunk tandem office and for this purpose the line group is not necessary. By using matrices with six reed capsules per crosspoint, this group selector marker may accommodate 4-wire switching.

The reason for this flexible operation of the system lies in the fact that the register-sender group, in connection with the storage in the translator, has sufficiently built-in features for the above described operation.

PART 2.—TYPICAL CALL

As an introduction to the system operation, a brief description of a typical local call as processed through the system is now presented. The block diagram may be followed for tracing the call.

When a subscriber lifts the handset, the line group marker 200 goes into action first by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders 671-680 and the originating junctor 120 of the originating line group to the group selector 300. In the group selector 300, the instructions are analyzed by the marker 400, an idle terminating junctor 130 in the terminating line group is located, and a path established to that line group via the A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control paths are released for further service while only the talking paths are held through the switching matrices and junctors.

PART 3.—GENERAL DESCRIPTION OF THE REGISTER SENDER

The register sender is a time shared, common control unit with the ability to register and process twenty-four simultaneous calls. The preferred embodiment consists of twenty-four registers and ten senders.

The registers operate in a time division mode. There is one register junctor for every register in the group. Real time to time division entry is provided by the register junctor. Each register consists of two main sections, the first being the common control unit. These time divided circuits are shared by all twenty-four registers. These circuits are used by each register in turn and are organized to provide the needed registration and process control for the registers. The second section consists of a temporary storage facility for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using di-phase.

A. COMPONENTS

Figure 6:
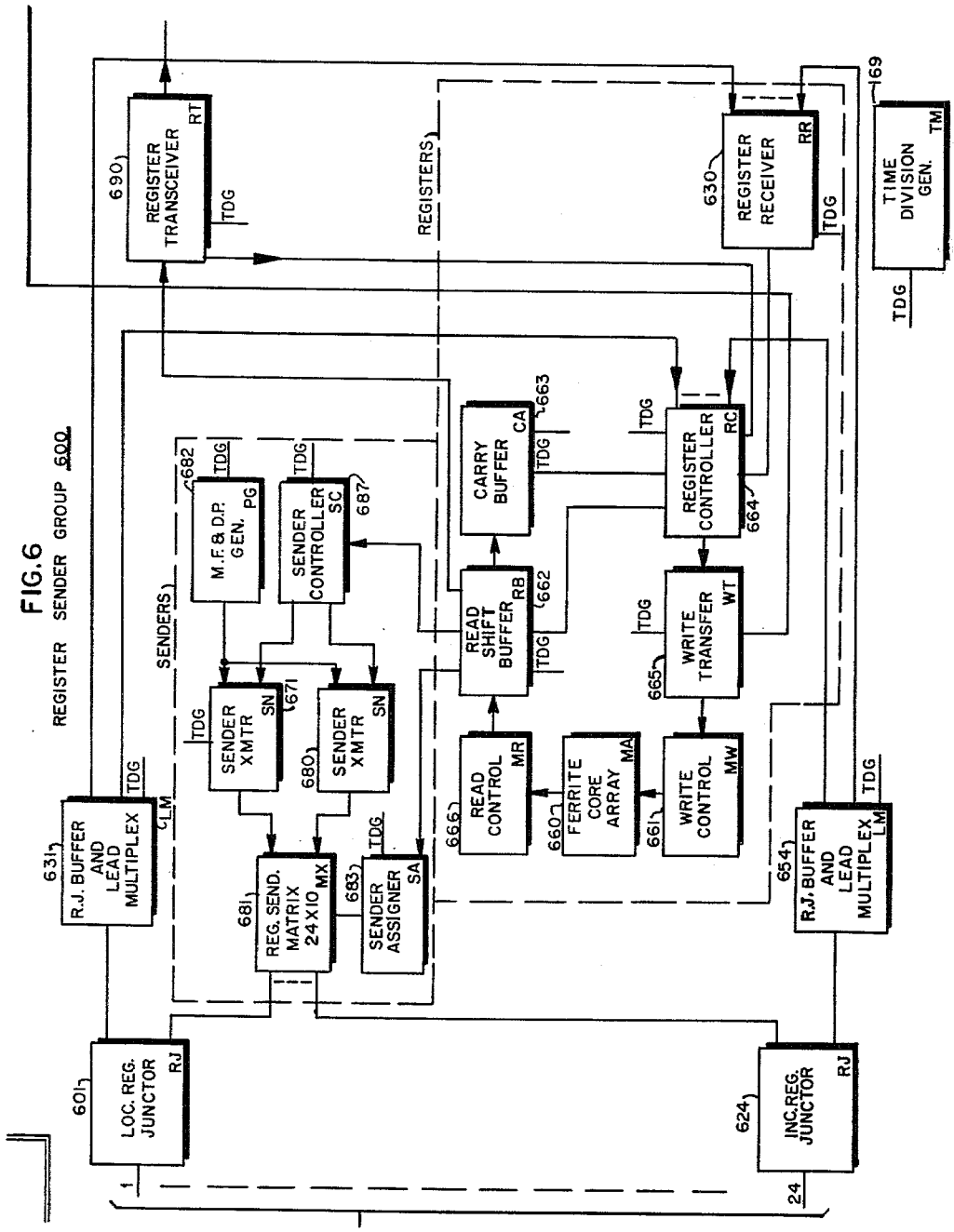
Figure 7:
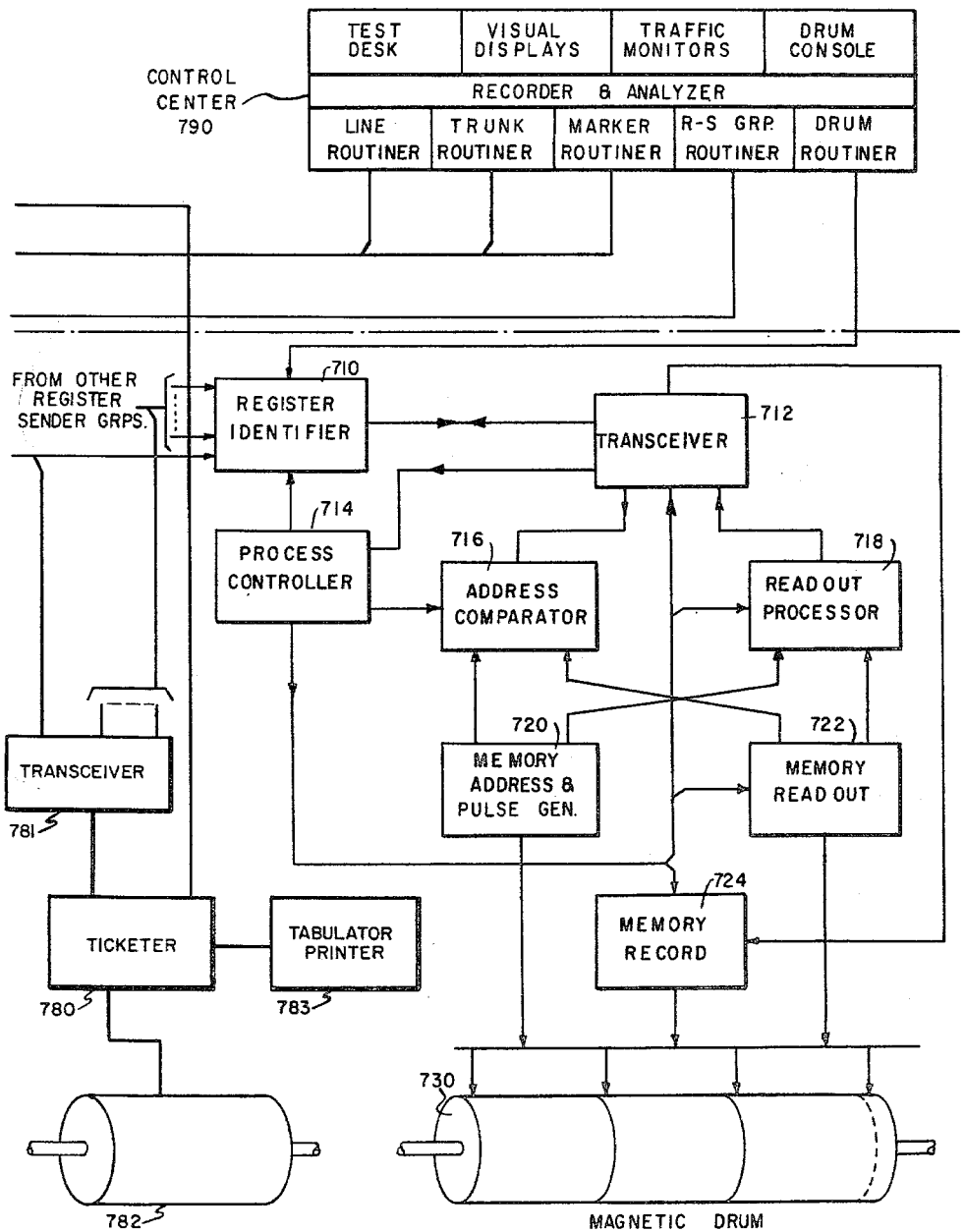

In order to facilitate understanding, the following brief description of each of the circuits within the register sender is given, reference being made to FIG. 6.

The primary function of the register junctor, 601–24, is to provide a buffer between the electronic equipment and the outside plant facilities. As such, the circuit employs reed relays for all switching functions, performing all those functions that require direct connection to the calling line or trunk. These include dial pulse repeating, dial tone control, battery feed for the calling line or trunk, calling station identification on party lines, test for coin deposit, coin refund, and test for coin refund. The circuit also controls the switch train and provides for multi-frequency and dial pulse.

The sender circuit, 671–80, provides means for transferring information (dialed digits or switching instruction) over the voice transmission path from the register sender to the office markers or to distant offices. The sender is a universal sender inasmuch as it provides all modes of sending required by the system. Di-phase sending is employed for transmission of switching instructions to the office markers. The di-phase part of the circuit is actually a transceiver since it provides a means of receiving instructions from the markers as well as sending to the markers.

For outgoing calls, the sender provides for both dial pulse and multi-frequency signaling. The circuit operates in conjunction with sender controller 670 which is common to all senders in the register sender group. The sender controller supplies the sender with the digits to be sent out and indicates the mode of sending to be employed.

The sender is mainly an electronic circuit except for outgoing loop supervisory equipment where reed relays are used.

The register receiver 630 is seized by the register controller and assigned to serve the register junctor on a hold-til-finished basis. The circuit receives either the line number identification generated by the line markers or the trunk number identification generated by the trunk markers. On seizure of the circuit, a di-phase link is established to the marker being served. When all the digits have arrived in the register receiver, the information is presented to the register controller for storage in the area of the ferrite core array associated with the register being served. Upon completion of this storage process, the register receiver is released for use by the next register requiring service.

The time division generator generates the time slot pulses, sub-time slot pulses, and control pulses that allow the common equipment to operate in a time division mode.

The time slot pulses create a unique time slot for each of the registers in the group. In association with a group of cores in the core array, they allow a true time division multiplex mode of operation.

The sub-time slot pulses allow the use of a folded word memory; wherein each sub-time slot accesses a section of the information stored in those cores accessed by a particular time slot. The control pulses allow the controlled generation of decisions while in a particular sub-time slot.

The register controller 664, operating on a time division multiplex basis, controls the progress of each call being processed. Within a particular time slot, this circuit up-dates the information in storage in the section of the core array associated with the time slot register. This up-dating takes place on a sub-time slot basis and is the result of changes in the information presented since the time slot was served last. All information entering the register sender is available to the register controller for proper arrangement and interpretation.

The memory read 661 and memory write 666 control generates the proper current pulses needed to read and write the cores of the ferrite core array.

The ferrite core array 660 is a sequential access, time slot oriented, temporary storage facility. Each register is assigned a group of cores, which only the time slot with which it is associated can access. This group of cores is accessed in sections by the sub-time slots. Each section of the cores stores part of the total available information. The first section contains registration and translation control information. The second contains sender control information. The third and fourth provide for storage of as many as thirteen dialed digits. The fifth contains the line or trunk identity unless a line number translation has been performed. If a line number translation is performed, the calling party's directory number is stored in these cores. The sixth section contains the translated switching digits.

Since each section contains forty cores and each time slot accesses six sections, the total number of cores per register is two hundred and forty. The total ferrite core memory size per register-sender group is 6,600 cores, wherein one complete register storage is reserved for routining and trouble analysis.

The read shift buffer 662 provides a buffer storage for the memory readout. The read shift buffer is also utilized to shift information, in a particular sub-time slot, from one core position to another. The read shift buffer, by temporarily holding the contents of a section of the memory word, provides a means for this information to be transferred to other circuits within the register sender group.

The carry buffer 663 provides a place where information read from the memory during different sub-time slots can be accumulated until a time is reached, within the time slot, when a decision can be generated on the basis of this information. As a result, by accessing the cores containing the registration and translation control before the time slot is over, an up-dating process is accomplished based on the decisions made during the time slot.

The register transceiver 690 operates as the communication device for information transfer between the register sender group and the system translators. It, like the register receiver, operates on a hold-until-finished basis. This circuit provides two-way di-phase serial communication between the translators and the register sender group. The organization of this circuit is such that the transfer of information from the read shift buffer to the register controller is in a parallel manner. Seizure is dependent on the condition of the control information available in the carry buffer.

The sender controller 670 utilizing information available to it in the read shift buffer, controls the flow of information to be sent by the sender in use. It forwards control signals to the proper senders such as mode of send signals, end of send signals, and release signals. It presents to the senders the appropriate switching, and if necessary, dialed digits for proper routing of the subscriber's call. These digits are obtained from the read shift buffer under the control of the register controller. The sender controller circuit operates in a time division mode and thus serves all registers during each system cycle.

The sender assigner 683, on request of the register controller, will connect an idle sender to the register junctor requiring service. The connection established by the assigner is the beginning of the terminating switch train, which will be extended by the system switching stages on information received from the sender. The sender assigner operates on a hold-til-finished basis.

B. Operation

The register sender is a combined local and incoming unit and will handle and process calls of all types of which this call is one of many possibilities.

Upon removal of the handset by the calling subscriber, the line marker identifies the line and searches for an idle register junctor. After finding an idle register junctor, the line marker determines if a path can be established from the calling line to that register junctor. If so, the line marker extends a call signal through the register junctor and into the register. This signal is recognized by the register controller during the time slot permanently associated with the register junctor requesting service.

This request for service command causes the register receiver to be attached to the register junctor as soon as it is available. Once the register receiver is seized, a "GO" command is extended to the line marker awaiting service. The line marker then forwards the line identity to the register receiver for storage in the register's core storage area.

As soon as the line identity information is successfully stored, the register receiver is released and a hold signal is sent to the register junctor. This signal causes a release of the line marker and the extension of dial tone to the calling subscriber.

The subscriber dialed digits are repeated by the register junctor on to the time division multiplex "pulse highway." As each pulse is recognized by the register controller, it causes the dialed digit storage information, associated with the register, to be up-dated. As the digits accumulate, they are stored and shifted to their proper location within the register's storage area.

As soon as the first three dialed digits have arrived, a request for the register transceiver is generated and the process digits are coded. The series of digits, called the processing digits, that are contained in the registration and translation control storage area, are given the binary coded decimal values that initiates the translation operation.

This preliminary coding of the process digits will be used by the system translators to select the proper mode of translation. It should be noted that from this point on, in the processing of the call, the register controller will never generator any further coding of the process digits. Each time the system translators return information to the register sender group, the process digits will also be returned. The register controller, on the basis of changes made in the binary coding of the process digits by the translators, will proceed to the next step in the handling of the call. The register controller is organized in a manner that allows it to obey any of the possible instructions and sequence commands inherent in the process digits.

Since a request for the register transceiver has been written, this unit will be seized as soon as it is available.

The three dialed digits, the class of service digits, the process digits, will all be loaded in a parallel manner into the register transceiver, from the read shift buffer. The register transceiver requests the service of an idle system translator and as soon as one is attached transmits this information, via a di-phase link, to the translator. For the local call being made the translator will upgrade the process digits and return them to the register transceiver. They are then forwarded to the register controller for storage and the register transceiver is released. In this particular instance they will cause the register controller to wait. They will contain the address of the system translator that must be accessed in order to locate the directory number of the particular local subscriber being called. Since both number group and code translations are located on the same drum, the process digits will indicate that a number group translation is to be performed. The register transceiver as soon as it is seized will receive the seven digits of the called directory number, the class of service of the originating line, and the process digits. The system translator, upon receiving this information, will in this instance, locate the proper switching digits and sender instruction digits. This information in addition to an upgraded set of process digits will be returned to the register transceiver. The information in the register transceiver is forwarded to the register controller for storage. As soon as storage is accomplished, the register transceiver is released for use by any other register requiring service.

The register controller, re-acting to the new coding of the processing digits will, in this instance, cause a request for the sender assigner. As soon as the sender assigner is seized, it will assign an idle sender to the register junctor requiring service. With the sender attached, the sender instruction digits that have been stored with the switching digits now come into play. The sender sequence state control, accessed by the second sub-time slot of the register being served, now forwards the sender control instructions to the sender controller. The sender controller, utilizing the sender control information, forwards the switching digits to the sender. The sender transmits this translated switching information to the proper markers. Two-way communication exists between the system markers and the senders, therefore, the action of the sender will be dependent upon the instructions returned from the markers. The markers are presently arranged to send four different instructions to the sender. These instructions are line idle, line busy, trunk busy, and resend. If line idle is encountered, the signal is repeated to the register junctor which signals the originating junctor to switch through the signals and releases the sender.

The recognition of a sender release signal, by the register controller, causes the register controller to extend a disconnect signal to the register junctor and returns the register's storage area to the idle condition.

If line busy or trunk busy is encountered by the system markers, the disconnect sequence is the same as for the line idle, but in addition, the busy signal is extended to the originating end.

If the resend signal is returned to the sender, the sender will release the terminating switch train and the register controller will cause the initial send state to be introduced. A second attempt to establish the call will then be made. Only one resend signal will be obeyed. If a second resend signal is received, trunk busy will be returned to the calling subscriber.

PART 4.—DETAILED DESCRIPTION OF THE REGISTER SENDER

A. Components

(1) Symbolism

In various parts of the system flip-flops are used as registers. Each of these flip-flops includes two transistors in a bistable circuit configuration. Each flip-flop has eight input terminals and two output terminals. To set a flip-flop to state one, producing a true indication, requires coincidence of a signal on the D.C. input and a trigger pulse on the A.C. input; and in like manner to reset it to state zero, indicating a false condition, requires coincidence of a D.C. input and an A.C. input.

Gated pulse amplifiers are transistor circuits having a direct-coupled gating input terminal and a capacitively-coupled trigger-pulse input terminal. When the two inputs coincide, an output pulse is produced. A typical circuit is shown by R. K. Richards in "Digital Computer Components And Circuits" (D. Van Nostrand Company, Inc., 1957) at page 176.

The logical circuits use NOR gates, each of which is a one-transistor logical element whose output is an AND function of the negations of its inputs. The inputs are coupled through individual resistors to the base electrode, and the output is taken from the collector electrode. A NOR gate having all of its inputs false produces a true output signal; and if any one of the inputs is true, the output is false. Throughout this system a true signal condition is indicated by a negative potential, and a false condition by ground.

A typical interconnection of these circuit elements is illustrated in FIG. 21. This drawing describes in detail the circuit configuration that is represented in simplified block-diagram form in FIGS. 12–13. FIG. 21 describes logic 1301, gated pulse amplifier 131, logic 1202, flip-flop 1H, and reed relay driver 120.

A shift-register is another circuit element which is represented in simplified form and consists of a plurality of flip-flops connected in series. FIG. 22 illustrates the interconnection in detail of the shift-register comprising flip-flops SU2, SL, BC1–4, BD1–4, BE1–4, BF1–4, BG1–4, BH1–4, BI1–4, and PR2, which was previously shown in FIG. 13 in diagrammatic form.

(2) Register sender logic

The equations of the various logic units are given in combined form in this section. The logic circuitry is direct-coupled (DC), that is, signals are represented by steady-state voltages. Two levels are employed. The first level is usually —5 volts, although other negative voltages are used in a few places, and represents the binary 1, true, on or active condition. The second level, ground potential, represents the binary 0, false, off or inactive condition. Flip-flops are used as registers with double-rail output signals to drive the logic circuits. A double-rail output is one in which both the logical 1 and 0 conditions are represented by active signals on separate leads. Only one of the two leads, however, has an active signal at any time. Logic circuits are included in each unit for controlling the setting of the flip-flops, which may be set 1 or set 0. "Set" when used alone means "set 1," and "reset" is synonymous with "set 0." These logic circuits may comprise diode type AND and OR gates.

In describing the logical operations performed by the circuits, Boolean algebra equations are used. In this notation the addition symbol signifies OR, the multiplication symbol, expressed or implied, signifies AND, and overlining signifies the inverted condition.

2a. LM, RJ BUFFER AND LEAD MULTIPLEXER

Logic 1201:
$$1MMP = \overline{P}\ \overline{TZ1}$$
$$1MAL = \overline{ECA}\ \overline{TZ1}$$
$$1MDC = \overline{DC}\ \overline{TZ1}$$
$$1MPD = \overline{SB}\ \overline{TZ1}$$

Logic 1202:
1H ac set=SHD
1H ac reset=RHD
1GO ac set=SGO
1GO ac reset=RGO
1CB ac set=SCB
1CB ac reset=RCB
All dc set and reset=TZ1

Logic 1203:
$$24MMP = \overline{P}\ \overline{TZ24}$$
$$24MAL = \overline{ECA}\ \overline{TZ24}$$
$$24MDC = \overline{DC}\ \overline{TZ24}$$
$$24MPD = \overline{SB}\ \overline{TZ24}$$

Logic 1204:
24H ac set=SHD
24H ac reset=RHD
24GO ac set=SGO
24GO ac reset=RGO
24H and 24GO dc set and reset=TZ24
KP dc set=KPD
KP dc reset=$\overline{KPD}$
KP ac set and reset=B77

2b. RR, REGISTER RECEIVER

Logic 1301 and SHD:
$$Logic\ 1301 = BTY7[(DRX2\ BU2\ CP2\ KM) + (DVX3\ \overline{PF3})]$$
$$SHD = B00\ (Logic\ 1301\ BTX7)$$

Logic 1302, RHD, and RCB:
$$Logic\ 1302 = (DVX2 + DRX1)\ BTY7$$
$$RHD = RCB = B00\ (Logic\ 1302\ BTX7)$$

Logic 1303 and SGO:
$$Logic\ 1303 = BU2\ KM$$
$$SGO = B71\ Logic\ 1303$$

Logic 1304 and RGO:
$$Logic\ 1304 = \overline{KM}\ DRX1$$
$$RGO = B77\ (Logic\ 1304 + Logic\ 1308)$$

Logic 1305 and SCB:
$$Logic\ 1305 = LCB\ DRX2$$
$$SCB = B00\ Logic\ 1305\ BTX7$$

Logic 1306:
EC dc set=$(MAL1 + MAL2 + \ldots + MAL24)$
EC ac set=B21
EC ac reset=B77

Logic 1307:
BU2 "a" dc set=$SKM - B = DRX1\ DVX0\ \overline{BU2}\ EC$
BU2 "a" ac set=B41
BU2 "b" dc set=$SKM - A$
BU2 "b" ac set=B71
BU2 "a" dc reset=BU2
BU2 "a" ac reset=B77

Logic 1308 and Reset:
$$Logic\ 1308 = BU2\ (CP2 + TE2)\ HDS2\ PE3$$
$$Reset = B77\ (Logic\ 1308 + SW)$$

Logic 1309:
CP2 dc set=$PE3\ \overline{BP2}\ BU2\ PR2$
CP2 ac set=B71
CP2 dc reset=$KM\ CP2$
CP2 ac reset=B77

Logic 1310:
$$Logic\ 1310 = BU2\ \overline{PR2}$$

2c. RC, REGISTER CONTROLLER

Logic 1400, Add Command Common Quantities:
$$\overline{1400a} = DMX0 + (DMX1\ LC1) + (DMX2\ LLC2) + (DMX3\ LLC2)$$
$$1400b = \overline{BPB4}\ \overline{PP}\ DVX0\ \overline{TDS}$$
$$1400c = BPB4\ PP\ DVX0$$

Logic 1401, Add Commands:
$$1401a = BFD\ \overline{ACC7}\ LLC2\ BTY5\ TB$$
$$1401b = [(1400b + 1400c)\ \overline{FD}\ DRX3 + DVX2\ \overline{1404a}\ \overline{TDS} + DRX2\ \overline{1400b}\ \overline{CP2}]BTY7\ \overline{1400a}$$
$$1401c = (TY3\ \overline{DCX0} + BTY4\ DCX0)\ \overline{FD}\ AC$$
$$1401d = (RT + KE)\ LC1\ BTY6\ \overline{TDS}$$
$$1401e = (\overline{DQX0}\ \overline{DQX5}\ \overline{DQX6})\ BTY2\ \overline{TDS}\ \overline{1400a}$$
$$1401 = 1401a + 1401b + 1401c + 1401d + 1401e$$

Logic 1402, Start Commands Common Quantity:
$$1402a = DPA15\ \overline{DMX3} + DPA0$$
$$1402b = TY7\{(DVX2\ \overline{1404}\ \overline{1402a}) + [(\overline{PB4}\ PP + 1402a + PB4\ \overline{PP})\ DVX0\ \overline{FD}\ DRX2] + [DRX2\ DVX0\ (1402a + CP2)]\}$$

2c. RC, REGISTER CONTROLLER—Continued $1402c = (\overline{DCX0}\ TY3 + DCX0\ BTY4)\ AC\ DPA0\ \overline{FD}$
$1402d = DPA0\ BTY6\ RT$
$1402e = (\overline{DQX0}\ \overline{DQX5}\ \overline{DQX6})\ \overline{1402a}\ BTY2$
$1402f = FD\ TB\ ACC7\ DPA0\ BTY5\ \overline{TDS}$
$1402 = 1402b + 1402c + 1402d + 1402e + 1402f$ Logic 1403, Clear Commands:

$1403a = BTY7\ DVX0\ (\overline{FD}\ DRX3 + DRX2\ \overline{BPB4}\ PP)$
$1403b = (BTY3 + BTY4)(FP + FD)$
$1403c = DQX5\ BTY2$
$1403d = CP1\ KE\ BTY6$
$1403e = FD\ TB\ ACC7\ BTY5 + 1403a$
$\qquad\qquad + 1403b + 1403c + 1403d$ Logic 1404, Multiplex of Down Check Leads:

$1404 = \overline{(MDC1 + MDC2 + \ldots + MDC24)}$

Logic 1405, Common Entry, Pos A, Bit 1:

$MWA1 = \overline{CE}\ \overline{TWR-A}\ \overline{1403}[(\overline{PA1}\ \overline{1401}$
$\qquad\qquad + 1402 + PA1\ \overline{1401})]$ Logic 1406, Common Entry, Pos A, Bit 2:

$MWA2 = \overline{CE}\ \overline{1403}\ \overline{1402}TWRA\ [\overline{1401}\ (\overline{PA2}$
$\qquad PA1 + \overline{PA1}\ PA2)[+\overline{1401}\ PA2$ Logic 1407, Common Entry, Pos A, Bit 3:

$MWA3 = \overline{CE}\ \overline{TWR-A}\ \overline{1402}\ \overline{1403}\ [\overline{1401}\ (\overline{PA1}\ PA3$
$\qquad + PA1\ PA2\ \overline{PA3} + \overline{PA2}\ PA3) + (\overline{1401}\ PA3)]$ Logic 1408, Common Entry Pos A, Bit 4:

$MWA4 = \overline{CE}\ \overline{TWR-A}\ \overline{1403}\ \overline{1402}\ (\overline{1401}\{[PA4$
$\qquad (PA1 + PA2 + PA3)] + [(\overline{PA1}\ \overline{PA2}\ \overline{PA3})$
$\qquad\qquad PA4]\} + \overline{1401}\ \overline{PA4})$ Logic 1409, Mode of Count:

$1409a = (PB1 + DPA15\ DMX0 + DPA15\ DMX2)$
$\qquad\qquad [\overline{1403e}\ (\overline{DPA15 + DMX1})]$
$1409b = (BTY2 + BTY7)\ [(DPA15\ DMX1)$
$\qquad\qquad + PB2]\ \overline{1403e}$ Logic 1410, Sender Sequence State, Preliminary Control, Bit 1:

$1410 = TY2\ [\{DSX4\ [\overline{BPI2}\ \overline{BPI4}(MPI1 + BPI3)$
$\qquad + \overline{BPI1}\ \overline{BPI3}\ (BPI2\ \overline{BPI4} + \overline{BPI2}\ BPI4)]$
$\qquad + DSX8\ (BPI1 + BPI3)\ (\overline{BPI1} + \overline{BPI2} + \overline{BPI4})\}$
$\qquad \overline{SEQ}\ \overline{BPB4}\ [(SEQ\ \overline{BPB4} + DQX3\ \overline{LAT}\ DSX0)$
$\qquad + BPB4]\ (BPE1 + BPE2 + BPE3 + BPE4)\ 1432f]$ Logic 1411, Multiplex of Subscribers Loop, Pulse Highway:

$1411 = MPP = (MMP1 + MMP2 + \ldots + MMP24)$

Logic 1412, Miscellaneous Controls:

$1412a = BTY2\ (DQZ0\ BDQ + DQX5$
$\qquad\qquad + TS + PB3 + DPA12\ DMX3)$
$1412b = RT\ BTY7$
$1412c = PP\ BTY7$ Logic 1413, Common Entry, Pos B, Bit 1:

$MWB1 = \{[(BG1\ \overline{1466f} + NL1\ \overline{1466d} + NB1\ \overline{1466c}$
$\qquad + \overline{1466h}\ SGR\ MGR1 + \overline{1466h}\ \overline{SGR}\ PB1)\ \overline{1466g}$
$\qquad\qquad \overline{1467t}] + \overline{1409a}\}\ \overline{CE}\ \overline{TWR-A}$ Logic 1414, Common Entry, Pos B, Bit 2:

$MWB2 = \{[(BG2\ \overline{1466f} + NL2\ \overline{1466d} + NB2\ \overline{1466c}$
$\qquad + \overline{1466h}\ SGR\ MGR2 + \overline{1466h}\ \overline{SGR}\ BPB2)$
$\qquad\qquad \overline{1466g}\ \overline{1467t}] + \overline{1409b}\}\ \overline{CE}\ \overline{TWR-A}$ Logic 1415, Common Entry, Pos B, Bit 3:

$MWB3 = \{[(BG3\ \overline{1466f} + NL3\ \overline{1466d} + NB3\ \overline{1466c}$
$\qquad + \overline{1466h}\ SGR\ MGR4 + \overline{1466h}\ \overline{SGR}\ BPB3)$
$\qquad\qquad \overline{1466g}\ \overline{1467t}] + 1412a + 1412b\}\ \overline{CE}\ \overline{TWR-A}$ Logic 1416, Common Entry, Pos B, Bit 4:

$MWB4 = \overline{CE}\ \overline{TWR-A}\ \{[(BG4\ \overline{1466f} + NL4\ \overline{1466d}$
$\qquad + NB4\ \overline{1466c} + \overline{1466h}\ SGR\ MGR8 + \overline{1466h}\ \overline{SGR}$
$\qquad\qquad PB4)\ \overline{1466g}\ \overline{1467d}] + 1412c + 1410$ Logic 1417, Sender Sequence States, Preliminary Control:

$1417a = (DSX5\ \overline{BPI1}\ BPI2\ \overline{BPI3}\ BPI4)$
$\qquad \{SEQ\ BPB4\ BPC1 + [DSX4\ \overline{BPI4}\ (BPI1 + \overline{BPI3}$
$\qquad + BPI4)\ (BPI1 + BPI2 + DSX8\ BPI1)]\}$
$\qquad \{[DSX4\ \overline{BPI4}\ (BPBI1 + BPI3 + BPI4)\ (BPI1$
$\qquad + BPI2 + BPI4) + DSX8\ BPH1]$
$\qquad + SEQ\ BPB4\ \overline{BPC1} + BPC1\}\overline{1417f}\ TY2$ $1417b = [DSX4\ (BPI1\ \overline{BPI3}\ \overline{BPI4}\ \overline{PBI1}\ BPI2$
$\qquad BPI3\ \overline{BPI4} + \overline{BPI1}\ \overline{BPI2}\ \overline{BPI3}\ BPI4 + 1417c]$
$\qquad [\overline{SEQ}\ \overline{BPB4}\ \overline{BPC1}\ \overline{BPC2} + DSX8\ BPI3\ (BPI4$
$\qquad + \overline{BPI2})]\ [DSX8\ BPI3\ (BPI1 + BPI2) + SEQ$
$\qquad BPB4\ BPC1\ \overline{BPC2} + BPC2]\ \overline{1417f}\ TY2$ $1417c = DSX5\ \overline{BPI1}\ BPI2\ BPI3\ BPI4$ $1417d = DSX8\ \overline{BPI1}\ BPI2\ BPI3\ BPI4\ [SEQ\ BPB4$
$\qquad \overline{BPC1}\ \overline{BPC2}\ \overline{BPC3} + DSX4\ BPI4\ (BPI1 + BPI3)$
$\qquad + 1417c]\ [DSX4\ \overline{BPI4}\ (BPI1 + BPI3) + 1417c$
$\qquad + SEQ\ BPB4\ BPC1\ BPC2\ \overline{BPC3}\ BPC3]\ \overline{1417f}\ TY2$ $1417e = (\overline{SEQ}\ \overline{BPB4}\ \overline{BPC1}\ \overline{BPC2}\ \overline{BPC3}\ \overline{BPC4}$
$\qquad + DSX4\ \overline{BPI1}\ \overline{BPI2}\ \overline{BPI3}\ BPI4 + 1417g)\ (DSX4$
$\qquad \overline{BPI1}\ \overline{BPI2}\ \overline{BPI3}\ BPI4 + 1417g + SEQ\ BPB4$
$\qquad BPC1\ BPC2\ BPC3\ \overline{BPC4} + BPC4)\ 1417f\ TY2$ $1417f = \overline{BPE1}\ BPE2\ BPE3\ BPE4 + 1427f$ $1417g = DSX8\ \overline{PI1}\ BPI2\ BPI3\ \overline{PI4}$ Logic 1418, Totals Digits, Processing—TL:

$1418a = (HE + PP)\ DPC0$
$1418b = TL8\ TY7$
$1418c = TY7\ (TL1 + HE)$
$1418d = TY7\ (TL2 + RP)$
$1418e = TY7\ TL4$

Logic 1419, MF Entry Control:

$1419a = (TY4\ \overline{FD}\ DCX0 + TY3\ \overline{FD}\ DCX0$
$\qquad + TY5\ FD\ TB)\ DMF0\ DPC0\ \overline{FM}\ DMF12$
$1419b = MF1\ 1419a$
$1419c = MF2\ 1419a$
$1419d = MF4\ 1419a$
$1419e = MF8\ 1419a$ Logic 1420, Common Entry, Pos C, Bit 1:

$MWC1 = \overline{CE}\ \overline{TWR-B}\ [1417a + \overline{1420a}\ \overline{1467s}\ (BC1$
$\qquad \overline{1466f} + NN1\ \overline{1466b} + NC1\ \overline{1466c} + (1417c + 1419b)$
$\qquad\qquad \overline{1466j} + \overline{1466j}\ (\overline{1417c + 1419b})\ BPC1]$
$1420a = \overline{BTY7}\ \overline{BTY1}\ \overline{BTY3}\ \overline{BTY4}\ \overline{BTY5}\ \overline{BTY6}$ Logic 1421, Common Entry, Pos C, Bit 2:

$WMC2 = \overline{CE}\ \overline{TWR-B}\ [1417b + \overline{1467s}\ \overline{1420a}\ (PC2$
$\qquad \overline{1466f} + NN2\ \overline{1466b}) + NC2\ \overline{1466c} + (1417d +$
$\qquad 1419c)\ \overline{1466j} + \overline{1466j}\ (\overline{1417d + 1419c})\ BPC2]$ Logic 1422, Common Entry, Pos C, Bit 3:

$MWC3 = \overline{CE}\ \overline{TWR-B}\ [1417d + \overline{1423d}\ \overline{1467s}\ (BC3$
$\qquad \overline{1466f} + NN3\ \overline{1466b} + NC3\ \overline{1466c} + (1417e + 1419d)$
$\qquad\qquad \overline{1466j} + \overline{1466j}\ (\overline{1417e + 1419d})\ BPC3]$ Logic 1423, Common Entry, Pos C, Bit 4:

$MWC4 = \overline{CE}\ \overline{TWR-B}\ [1417e + \overline{1423a}\ \overline{1467s}\ (BC4$
$\qquad \overline{1466f} + NN4\ \overline{1466b} + NC4\ \overline{1466c} + (1417b + 1419e)$
$\qquad\qquad \overline{1466j} + \overline{1466j}\ (\overline{1417b + 1419e})\ BPC4]$
$1423a = \overline{BTY7}\ \overline{BTY1}\ \overline{BTY3}\ \overline{BTY4}\ \overline{BTY5}\ \overline{BTY6}$ Logic 1424, Register Disconnect States, Preliminary Control:

$1424a = \overline{DR}\ \overline{DS}\ [DVX2\ (BPF1 + DLX2 + BPF2$
$\qquad + BPF3) + DRX3\ \overline{DVX2}\ (DR + DS) + BPD1]\ TY7$
$1424b = (DVX1\ DS\ DR + BPD2 + DRX2\ BPF1)\ TY7$ Logic 1425, Sender Assigner Sequence States:

$1425a = \overline{DQX1}\ LAA + DQX5 + \overline{LAT}\ DQX3$
$\qquad [DQX2 + BPD1 + DQX4\ (\overline{SR} + DR + DPA15$
$\qquad\qquad DMX3) + DQX0\ DR\ RQ]\ TY2$
$1425b = \overline{DQX3}\ (LAA\ DQX1 + DQX5 + BPD2)\ TY2$
$1425c = TY2\ (DQX3 + BPD3)$ Logic 1426, Multiplex of Party Digit (Party 2):

$PD = MPD1 + MPD2 + \ldots + MPD24$

Logic 1427, Miscellaneous Controls, Pos D and E:

$1427a = DTLO\ \overline{1427b}\ TY5\ \overline{DPJ0}\ DPB0$
$1427b = \overline{TL8\ 1426\ 1427a}$
$1427c = \overline{TL8\ 1426\ 1427a}$ 2c. RC, REGISTER CONTROLLER—Continued
1427d = PR TY7
1427e = MFS DMFO TY7
1427f = (KE+BPE1) TY7 GRS1
1427g = (RQ+$\overline{DLXO}$) TY7
1427h = (KM+BPE3) TY7 GRS2
1427j = TY7 (DS DVX1 $\overline{KE}$ RT)+DR+BPE4

Logic 1428, Common Entry, Pos D, Bit 1:
MWD1 = $\overline{CE}$ $\overline{TWR-B}$ [1424a+1425d+$\overline{1466g}$
  $\overline{1427c}$ $\overline{1467r}$ (BD1 $\overline{1466e}$+ND1 $\overline{1466c}$+$\overline{1466k}$
    $\overline{1427b}$+$\overline{1466k}$ 1427b BPD1)]

Logic 1429, Common Entry, Pos D, Bit 2:
MWD2 = $\overline{CE}$ $\overline{TWR-B}$ [1424b+1425b+$\overline{1466g}$
  $\overline{1427b}$ $\overline{1467r}$ (BD2 $\overline{1466e}$+ND2 $\overline{1466c}$+$\overline{1466k}$ $\overline{1427c}$
    +$\overline{1466k}$ 1427c BPD2)]

Logic 1430, Common Entry, Pos D, Bit 3:
MWD3 = $\overline{CE}$ $\overline{TWR-B}$ [1425c+1427e+$\overline{1466g}$ $\overline{1467r}$
  (BD3 $\overline{1466e}$+ND3 $\overline{1466c}$+$\overline{1466k}$ BPD3)]

Logic 1431, Common Entry, Pos D, Bit 4:
MWD4 = $\overline{CE}$ $\overline{TWR-B}$ [1427d+LHG+$\overline{1466g}$ $\overline{1467r}$
  (BD4 $\overline{1466e}$+ND4 $\overline{1466c}$+$\overline{1466k}$ BPD4)]

Logic 1432, Alternate Route Digit Storage and Control, Prelim.:
1432a = HG DB+HG DPE0
1432b = SN1+SN2+ ... +SN10
1432c = $\overline{1432a}$ $\overline{1432b}$ TY2 (BPE1+$\overline{HG}$ DB MAR1)
1432d = $\overline{1432a}$ $\overline{1432b}$ TY2 (BPE2+$\overline{HG}$ DB MAR2)
1432e = $\overline{1432a}$ $\overline{1432b}$ TY2 (BPE3+$\overline{HG}$ DB MAR4)
1432f = $\overline{1432a}$ $\overline{1432b}$ TY2 (BPE3+$\overline{HG}$ DB MAR8)

Logic 1433, Common Entry, Pos E, Bit 1:
MWE1 = $\overline{CE}$ $\overline{TWR-C}$ [1427f+1432c+$\overline{1466g}$
  $\overline{1468d}$ $\overline{1467g}$ (BE1 $\overline{1466e}$+NE1 $\overline{1466c}$+$\overline{1468c}$
    $\overline{1466k}$+$\overline{1466k}$ $\overline{1468c}$ BPE1)]

Logic 1434, Common Entry, Pos E, Bit 2:
MWE2 = $\overline{CE}$ $\overline{TWR-C}$ [1427g+1432d+$\overline{1466g}$ $\overline{1467g}$
  $\overline{1468c}$ (BE2 $\overline{1466e}$+NE2 1466c+$\overline{1468d}$
    $\overline{1466k}$+$\overline{1466k}$ $\overline{1468d}$ BPE2)]

Logic 1435, Common Entry, Pos E, Bit 3:
MWE3 = $\overline{CE}$ $\overline{TWR-C}$ [1427h+1432e+$\overline{1466g}$ $\overline{1467g}$
  $\overline{1468b}$ (BE3 $\overline{1466e}$+NE3 $\overline{1466c}$+$\overline{1466k}$ BPE3)]

Logic 1436, Common Entry, Pos E, Bit 4:
MWE4 = $\overline{CE}$ $\overline{TWR-C}$ [1427j+1432f+$\overline{1466g}$ $\overline{1467g}$
  $\overline{1468d}$ (BE4 $\overline{1466e}$+NE4 $\overline{1466c}$+$\overline{1468c}$
    $\overline{1466k}$+$\overline{1466k}$ $\overline{1468c}$ BPE4)]

Logic 1437, Miscellaneous Controls, Pos F:
1437a = TY7 [DRX2 (DPA15 DMX0 MEC+DPA15
  DMXI $\overline{MEC}$)+TE1 BPE1+TE2 BPE3
    +DRXO+BPF1+TR]
1437b = (TS+BPF2) TY7
1437c = TY7 (DVX2 DPA15 DMX1 1404 BPF3)
1437d = TY7 (FD+BPF4)

Logic 1438, Sender Address, Pos F.:
1438a = TY2 (AS1 DQX3+BPF1)
1438b = TY2 (AS2 DQX3+BPF2)
1438c = TY2 (AS4 DQX3+BPF3)
1438d = TY2 (AS8 DQX3+BPF4)

Logic 1439, Common Entry, Pos F, Bit 1:
MWF1 = $\overline{CE}$ $\overline{TWR-C}$ [1437a+1438a+$\overline{1466g}$ $\overline{1467p}$
  (BF1 $\overline{1466e}$+NF1 $\overline{1466c}$+$\overline{1466m}$ BPF1)]

Logic 1440, Common Entry, Pos F, Bit 2:
MWF2 = $\overline{CE}$ $\overline{TWR-C}$ [1437b+1438b+$\overline{1466g}$ $\overline{1467p}$
  (BF2 $\overline{1466e}$+NF2 $\overline{1466c}$+$\overline{1466m}$ BPF2)]

Logic 1441, Common Entry, Pos F, Bit 3:
MWF3 = $\overline{CE}$ $\overline{TWR-C}$ [1437c+1438c+$\overline{1466g}$ $\overline{1467p}$
  (BF3 $\overline{1466e}$+NF3 $\overline{1466c}$+$\overline{1466m}$ BPF3)]

Logic 1442, Common Entry, Pos F, Bit 4:
MWF4 = $\overline{CE}$ $\overline{TWR-C}$ [1437d+1438d+$\overline{1466g}$ $\overline{1467p}$
  (BF4 $\overline{1466e}$+NF4 $\overline{1466c}$+1466m BPF4)]

Logic 1443, Register Sequence States, Pos G:
1443a = TY7 $\overline{DRX1}$ $\overline{EC}$ $\overline{KM}$ (CE+DRX2
  $\overline{BPB4}$ PP $\overline{BPF1}$+BPF1)
1443b = TY7 [BPG2+DRX1 (EC KM+1411)]

Logic 1444, Coin Box and Mode Digit Controls, Pos G:
1444a = TY7 BPG3
1444b = TY7 CP2 KM BC1 BC2 $\overline{BC3}$ $\overline{BC4}$
  $\overline{BD1}$ $\overline{BD2}$ $\overline{BD3}$ $\overline{BD4}$
1444c = TY2 (BPE1 BPE2 $\overline{BPE4}$+BPE1
  $\overline{BPE2}$ $\overline{BPE3}$ $\overline{BPE4}$ $\overline{1432b}$ $\overline{1432a}$
1444d = TY2 ($\overline{BPE1}$ BPE3 $\overline{BPE4}$+$\overline{BPE2}$ $\overline{BPE3}$
  $\overline{PBE4}$) $\overline{1432b}$ $\overline{1432a}$ Logic 1445, Common Entry, Pos G, Bit 1:
MWG1 = $\overline{TWR-D}$ [1443a+$\overline{CE}$ $\overline{1467n}$ $\overline{1444c}$
  (BG1 $\overline{1466e}$+NP1 $\overline{1466d}$+NG1 $\overline{1466c}$+$\overline{1444c}$ $\overline{1466n}$
    +$\overline{1444c}$ $\overline{1466n}$ BPG1) (1466g+TY2)]

Logic 1446, Common Entry, Pos G, Bit 2:
MWG2 = $\overline{CE}$ $\overline{TWR-D}$ [1443b+$\overline{1444c}$ $\overline{1467n}$
  (BG2 $\overline{1466e}$+NP2 $\overline{1466d}$+NG2 $\overline{1466c}$+$\overline{1444c}$ $\overline{1466n}$
    +$\overline{1444c}$ $\overline{1466n}$ BPG2) (1466g+TY2)]

Logic 1447, Common Entry, Pos G, Bit 3:
MWG3 = $\overline{CE}$ $\overline{TWR-D}$ [1444a+1444b
  +$\overline{1467n}$ $\overline{1444c}$ $\overline{1444d}$ (BG3 $\overline{1466e}$+NP3 $\overline{1466d}$
    +NG3 $\overline{1466c}$+$\overline{1466m}$ BPG3) (1466g+TY2)]

Logic 1448, Common Entry, Pos G, Bit 4:
MWG4 = $\overline{CE}$ $\overline{TWR-D}$ {$\overline{1467n}$ [PG4 $\overline{1466e}$
  +NP4 $\overline{1466d}$+NG4 $\overline{1466c}$+$\overline{1444c}$ $\overline{1444d}$
    +1443b) $\overline{1466k}$+$\overline{1444k}$ BPG4 ($\overline{1444c}$ $\overline{1444d}$+$\overline{1443b}$)]
      1466g+TY2)}

Logic 1449, Miscellaneous Controls, Pos H and I:
1449a = TA TY7
1449b = TY7[TA+$\overline{DD}$ TD+DPCO (RP+HE)]

Logic 1450, Common Entry, Pos H, Bit 1:
MWH1 = $\overline{CE}$ $\overline{TWR-D}$ $\overline{1467m}$ $\overline{1468a}$ $\overline{1468d}$ $\overline{1468e}$
  [GH1 $\overline{1466e}$+NQ1 $\overline{1466d}$+NK1 $\overline{1466b}$
    +NH1 $\overline{1466c}$+$\overline{1466p}$ (1449a+1468c)
      +$\overline{1466p}$ ($\overline{1449a}$+$\overline{1468c}$) BPH1]

Logic 1451, Common Entry, Pos H, Bit 2:
MWH2 = $\overline{CE}$ $\overline{TWR-D}$ $\overline{1467m}$ $\overline{1468e}$
  [BH2 $\overline{1466e}$+NQ2 $\overline{1466d}$+NK2 $\overline{1466b}$+NH2 $\overline{1466c}$
    +$\overline{1466p}$ (1449a+1468a+1468b)
      +$\overline{1466p}$ ($\overline{1449a}$+$\overline{1468a}$+$\overline{1468b}$) BPH2]

Logic 1452, Common Entry, Pos H, Bit 3:
MWH3 = $\overline{CE}$ $\overline{TWR-D}$ $\overline{1467m}$ $\overline{1468a}$ $\overline{1468b}$ $\overline{1468e}$
  (BH3 $\overline{1466e}$+NQ3 $\overline{1466d}$+NK3 $\overline{1466b}$+NH3 $\overline{1466c}$
    +$\overline{1449a}$ $\overline{1466p}$+$\overline{1449a}$ $\overline{1466p}$) BPH3)

Logic 1453, Common Entry, Pos H, Bit 4:
MWH4 = $\overline{CE}$ $\overline{TWR-D}$ $\overline{1467m}$ $\overline{1468a}$ $\overline{1468b}$
  [BH4 $\overline{1466e}$+NQ4 $\overline{1466d}$+NK4 $\overline{1466b}$
    +NH4 $\overline{1466c}$+$\overline{1466p}$
      (1449b+1468e)+$\overline{1466p}$ ($\overline{1449b}$+$\overline{1468c}$) BPH4]

Logic 1454, Address Insertion, Pos I, Control:
1454b = TY7[DPCO (HE+RP)+CT]
1454c = $\overline{CT}$ TY7

Logic 1455, Modification of Skip Digit, Pos I:
1455a = ($\overline{BPE3}$+$\overline{BPE4}$) (BPE2+BPE3+BPE4)
  (BPE1+BPE3+BPE4)
1455b = [$\overline{BPE3}$ (BPE1+BPE4)+BPE1 BPE2
  +BPE3 BPE4] $\overline{1432b}$ $\overline{1432g}$ TY2
1455c = $\overline{1455a}$ $\overline{1455b}$
1455d = $\overline{BPE3}$ BPE4 ($\overline{BPE1}$ $\overline{BPE2}$)
1455e = $\overline{1455a}$ $\overline{1455d}$
1455f = $\overline{1455a}$ $\overline{1455g}$
1455g = BPE1 $\overline{BPE2}$ BPE3 $\overline{BPE4}$ Logic 1456, Common Entry, Pos I, Bit 1:
MWI1 = $\overline{CE}$ $\overline{TWR-E}$ $\overline{1467k}$ $\overline{1454a}$ $\overline{1455a}$
  (BI1 $\overline{1466e}$+NR1 $\overline{1466a}$+NM1 $\overline{1466b}$+NI1 $\overline{1466c}$
    +$\overline{1454a}$ $\overline{1466p}$+$\overline{1454a}$ $\overline{1466p}$ BPI1)

2c. RC, REGISTER CONTROLLER—Continued

Logic 1457, Common Entry, Pos I, Bit 2:
MWI2=$\overline{TWR-E}$ $\overline{CE}$ $\overline{1467k}$ $\overline{1454a}$ $\overline{1555d}$ [BI2 $\overline{1466e}$
  +NR2 $\overline{1466a}$+NM2 $\overline{1466b}$+NI2 $\overline{1466c}$+$\overline{1466p}$
  (1454a+1455e)+1466p ($\overline{1454a+1455e}$) BPI2]

Logic 1458, Common Entry, Pos I, Bit 3:
MWI3=$\overline{CE}$ $\overline{TWR-E}$ $\overline{1467k}$ $\overline{1454a}$ $\overline{1455b}$
  [BI3 $\overline{1466e}$+NR3 $\overline{1466a}$+NM3 $\overline{1466b}$
  +NI3 $\overline{1466c}$+$\overline{1466p}$ (1454a+1455c+1468f)
    +$\overline{1466p}$ ($\overline{1454a+1455c+1468f}$) BPI3]

Logic 1459, Common Entry, Pos I, Bit 4:
MWI4=$\overline{CE}$ $\overline{TWR-E}$ $\overline{1467k}$ $\overline{1455f}$ $\overline{1454b}$
  [BI4 $\overline{1466e}$+NR4 $\overline{1466a}$+NM4 $\overline{1466b}$
  +NI4 $\overline{1466c}$+$\overline{1466p}$ (1454c+1455g)
    +$\overline{1466p}$ ($\overline{1454c+1455g}$) BPI4]

Logic 1460, LX Commands, Pos J:
  1460a=TY7 (LX2+RC+BPJ2)
  1460b=TY7 (BPJ1+LX1+RC)

Logic 1461, CX Commands, Pos J:
  1461a=CX1 TY7
  1461b=CX2 TY7

Logic 1462, Common Entry, Pos J, Bit 1:
MWJ1=$\overline{CE}$ $\overline{TWR-E}$ [1460b+TA1+$\overline{1466g}$ $\overline{1467u}$
  (BI1 SL $\overline{1466e}$+NJ1 $\overline{1466e}$+BC1 $\overline{SL}$ $\overline{1466e}$
    +MTU1 STU 1466m+$\overline{STU}$ $\overline{1466m}$ BPJ1)]

Logic 1463, Common Entry, Pos J, Bit 2:
MJW2=$\overline{CE}$ $\overline{TWR-E}$ [1460a+TA2+$\overline{1466g}$ $\overline{1467u}$
  (BI1 SL $\overline{1466e}$+NJ1 $\overline{1466e}$+BC1 $\overline{SL}$ $\overline{1466e}$
    MTU2 STU $\overline{1466m}$+$\overline{1466m}$ $\overline{STU}$ BPJ2)]

Logic 1464, Common Entry, Pos J, Bit 3:
MWJ3=$\overline{CE}$ $\overline{TWR-E}$ [1461a+TA3+$\overline{1466g}$ $\overline{1467u}$
  (BI3 SL $\overline{1466e}$+NJ3 $\overline{1466c}$+BC3 SL $\overline{1466e}$
    +MTU3 STU $\overline{1466m}$ $\overline{STU}$ BPJ3)]

Logic 1465, Common Entry, Pos J, Bit 4:
MWJ4=$\overline{CE}$ $\overline{TWR-E}$ [1461b+TA4+$\overline{1466g}$ $\overline{1466u}$
  (BI4 SL $\overline{1466e}$+NJ4 $\overline{1466c}$+BC4 $\overline{SL}$ $\overline{1466e}$
    +MTU4 STU $\overline{1466m}$+$\overline{1466m}$ $\overline{STU}$ BPJ4)]

Logic 1466, Common Transfer and Timing Commands:
  1466a=TY2 CP1 KE ULC
  1466b=TY7 CP1 KE ULC
  1466c=CP1 KE (TY5 DIN2+TY6 ULC)
  1466d=CP1 KE TY4 CT1
  1466e=CP2 KM TY5
  1466f=SL CP2 KM TY5
  1466g=TY1+TY3+TY4+TY5+TY6
  1466h=$\overline{1466e}$ SL+1466c+1466d
  1466j=$\overline{1466e}$ SL+1466c+1466b
  1466k=1466e+1466c
  1466m=1466k
  1466n=1446e+1466c+1466a
  1466p=1466e+1466c+1466a+1466b Logic 1467, Common Delete Commands:
  1467a=TY5 MFS FD ACC7 BPG1 BPG3 BPG4 BPI1
  1467b=TY4 DDE4
  1467c=1467b+TY4 DDE3
  1467d=TY6 (DLX1+DLX2)
  1467e=TY2 (DLX1+DLX2)
  1467f=DDE2 TY4
  1467g=TY6 DLX3
  1467h=TY4 $\overline{DDE0}$
  1467j=CB $\overline{1426}$ $\overline{DPI0}$ TY4
  1467k=1467e+1467j+1467a+1467v+1467c+1467f
  1467m=1467a+1467c+1467f
  1467n=1467a+1467c+1467e+1467w
  1467p=1467a+1467b+1467w
  1467q=1467a+1467g
  1467r=(1467a+1467w+$\overline{TL8}$ TY5) (BPJ1 $\overline{BPJ2}$
    $\overline{BPJ3}$ $\overline{BPJ4}$ $\overline{BPB1}$ $\overline{BPB2}$ $\overline{BPB3}$ $\overline{BPB4}$)
  1467s=1467a+1467w
  1467t=1467h+1467d
  1467u=DLX0 TY6
  1467v=TY4 DDE1
  1467w=TY6 DLX0

Logic 1468, LX Translator Common Logic:
  1468a=$\overline{DLX0}$ TY2
  1468b=TY6 (DLX1+DLX2)
  1468c=$\overline{TY6}$ $\overline{DLX1}$
  1468d=$\overline{TY6}$ $\overline{DLX2}$
  1468e=TY6 DLX3
  1468f=TY6 $\overline{DLX0}$
  1468g=TY2 DLX3

2d. RB, READ SHIFT BUFFER

1601a=DCX2 $\overline{1603d}$ $\overline{BTY4}$
  1601b=($\overline{DCX0}$ BTY3+DCX0 BTY4) FD $\overline{1603d}$
  1601c=(TY3+TY4) $\overline{FD}$ $\overline{MFS}$+1612b 1612e
    [$\overline{FD}$ (TY3+TY4)+FD TY5]
  1601d=TX1+TX2
  1601e=TY3+TY4+TY5
  1601f=TY3 DCX2 (CY1 CY2 CY3 CY4)

Logic 1602, Shift Miscellaneous Control:
  1602a=A00 TX4 $\overline{TWR}$
  1602b=(TX1+TX2) (SA1+SA2+ ... +SA12)
  1602c=[(TX1+TX2) SA13]+(CY1 $\overline{1601a}$
    +$\overline{1602b}$ PA1) 1602a
  1602d=[(TX1+TX2) SA14]+(CY2 $\overline{1601a}$
    +$\overline{1601b}$ PA2) 1601a
  1602e=[(TX1+TX2) SA15]+(CY3 $\overline{1601a}$
    +$\overline{1601b}$ PA3) 1602a
  1602f=[(TX1+TX2) SA16]+(CY4 $\overline{1601a}$
    +$\overline{1601b}$ PA4) 1602a
  1602g=[(TX1+TX2) SA17]+($\overline{1601c}$ 1602a PC1)
  1602h=[(TX1+TX2) SA18]+($\overline{1601c}$ PC2 1602a)
  1602j=[(TX1+TX2) SA19]+$\overline{1601c}$ PC3 1602a)
  1602k=[(TX1+TX2) SA20]+($\overline{1601c}$ PC4 1602a)
  1602m=[(TX1+TX2) SA21]+($\overline{1601e}$ $\overline{1603e}$ PD1) 1602a
  1602n=[(TX1+TX2) SA22]+($\overline{1601e}$ $\overline{1603e}$ PD2) 1602a
  1602p=[(TX1+TX2) SA23]+($\overline{1601e}$ $\overline{1603e}$ PD3) 1602a
  1602q=[(TX1+TX2) SA24]+($\overline{1601e}$ $\overline{1603e}$ PD4) 1602a
  1602r=[(TX1+TX2) SA25]+($\overline{1601e}$ $\overline{PF1}$ $\overline{PF2}$ $\overline{PF3}$ $\overline{PF4}$ PE1) 1602a
  1602s=[(TX1+TX2) SA26]+($\overline{1601e}$ $\overline{PF1}$ $\overline{PF2}$ $\overline{PF3}$ $\overline{PF4}$ PE2) 1602a
  1602t=[(TX1+TX2) SA27]+($\overline{1601e}$ $\overline{PF1}$ $\overline{PF2}$ $\overline{PF3}$ $\overline{PF4}$ PE3) 1602a
  1602u=[(TX1+TX2) SA28]+($\overline{1601e}$ $\overline{PF1}$ $\overline{PF2}$ $\overline{PF3}$ $\overline{PF4}$ PE4) 1602a
  1602v=[(TX1+TX2) SA29]+($\overline{1601e}$ $\overline{PG1}$ $\overline{PG2}$ $\overline{PG3}$ $\overline{PG4}$ PF1) 1602a
  1602w=[(TX1+TX2) SA30]+($\overline{1601e}$ $\overline{PG1}$ $\overline{PG2}$ $\overline{PG3}$ $\overline{PG4}$ PF2) 1602a
  1602x=[(TX1+TX2) SA31]+($\overline{1601e}$ $\overline{PG1}$ $\overline{PG2}$ $\overline{PG3}$ $\overline{PG4}$ PF3) 1602a
  1602y=[(TX1+TX2) SA32]+($\overline{1601e}$ $\overline{PG1}$ $\overline{PG2}$ $\overline{PG3}$ $\overline{PG4}$ PF3) 1602a
  1602aa=[(TX1+TX2) SA33]+($\overline{1601e}$ $\overline{1603g}$ PG1) 1602a
  1602ab=[(TX1+TX2) SA34]+($\overline{1601e}$ $\overline{1603g}$ PG2) 1602a
  1602ac=[(TX1+TX2) SA35]+($\overline{1601e}$ $\overline{1603g}$ PG3) 1602a
  1602ad=[(TX1+TX2) SA36]+($\overline{1601e}$ $\overline{1603g}$ PG4) 1602a 2d. RB, READ SHIFT BUFFER—Continued $1602ae = [(TX1+TX2)\ SA37] + (\overline{1601e}\ \overline{1603f}\ PH1)\ 1602a$ $1602af = [(TX1+TX2)\ SA38] + (\overline{1601e}\ \overline{1603f}\ PH2)\ 1602a$ $1602ag = [(TX1+TX2)\ SA39] + (\overline{1601e}\ \overline{1603f}\ PH3)\ 1602a$ $1602ah = [(TX1+TX2)\ SA40] + (\overline{1601}\ \overline{1603f}\ PH4)\ 1602a$ $1602aj = \overline{1601f}\ PI1\ 1602a$ $1602ak = \overline{1601f}\ PI2\ 1602a$ $1602am = \overline{1601f}\ PI3\ 1602a$ $1602an = \overline{1601f}\ PI4\ 1602a$ $1602ap = A00\ TX8$ $1602aq = A00\ TX8\ (PA1, PA2, \ldots, PJ, \ldots, PB4)$ $1602ar = A00\ TX8\ (PC1, PC2, \ldots, PD1, \ldots, PE1, \ldots, PF1, \ldots, PG1, \ldots, PH1, \ldots, P14) + (1602g, 1602h, \ldots, 1602an)$ $1602as1 = 1602a\ \overline{1601a}\ CY1$ $1602as2 = 1602a\ \overline{1601a}\ CY2$ $1602as3 = 1602a\ \overline{1601a}\ CY3$ $1602as4 = 1602a\ \overline{1601a}\ CY4$ Logic 1603, Register Empty Indicators:

$1603a = \overline{PA1}\ \overline{PA2}\ \overline{PA3}\ \overline{PA4}$ $1603b = \overline{PJ1}\ \overline{PJ2}\ \overline{PJ3}\ \overline{PJ4} = DPJ0$ $1603c = \overline{PB1}\ \overline{PB2}\ \overline{PB3}\ \overline{PB4} = DPB0$ $1603d = \overline{PD1}\ \overline{PD2}\ \overline{PD3}\ \overline{PD4} = DPD0$ $1603e = \overline{PE1}\ \overline{PE2}\ \overline{PE3}\ \overline{PE4} = DPE0$ $1603f = \overline{PI1}\ \overline{PI2}\ \overline{PI3}\ \overline{PI4} = DPI0$ $1603g = \overline{PH1}\ \overline{PH2}\ \overline{PH3}\ \overline{PH4} = DPH0$ $1603h = \overline{PD1}\ \overline{PD2}\ \overline{DP3}\ \overline{PD4} = DPD0$ $1603j = \overline{PF1}\ \overline{PF2}\ \overline{PF3}\ \overline{PF4} = DPF0$ $1603k = \overline{PG1}\ \overline{PG2}\ \overline{PG3}\ \overline{PG4} = DPG0$ $1603m = \overline{CY1}\ \overline{CY2}\ \overline{CY3}\ \overline{CY4} = DPCY0$ Logic 1604, Pos A Counter Advance Commands:

$1604a = \overline{PB1}\ \overline{PB2} = DMX0$ $1604b = PB1\ \overline{PB2} = DMX1$ $1604c = \overline{PB1}\ PB2 = DMX2$ $1604d = PB1\ PB2 = DMX3$ Logic 1605, Register Disconnect Sequence States, VX:

$1605a = \overline{PD1}\ \overline{PD2} = DVX0$ $1605b = PD1\ \overline{PD2} = DVX1$ $1605c = \overline{PD1}\ PD2 = DVX2$ $1605d = PD1\ PD2 = DVX3$ Logic 1606, Register Sequence States and Control, RX:

$1606a = \overline{PG1}\ \overline{PG2} = DRX0$ $1606b = PG1\ \overline{PG2} = DRX1$ $1606c = \overline{PG1}\ PG2 = DRX2$ $1606d = PG1\ PG2 = DRX3$ Logic 1607, Sender Assigner Sequence States, QX:

$1607a = \overline{PD1}\ \overline{PD2}\ \overline{PD3} = DQX0$ $1607b = PD1\ \overline{PD2}\ \overline{PD3} = DQX1$ $1607c = \overline{PD1}\ PD2\ \overline{PD3} = DQX2$ $1607d = PD1\ PD2\ \overline{PD3} = DQX3$ $1607e = \overline{PD1}\ \overline{DP2}\ PD3 = DQX4$ $1607f = PD1\ \overline{PD2}\ PD3 = DQX5$ $1607g = \overline{PD1}\ PD2\ PD3 = DQX6$ $1607h = PD1\ PD2\ PD3 = DQX7$ Logic: 1608, Accumulation in Rows 3 and 4:

$1608a = \overline{1603f} = ACC1$ $1608b = \overline{1603f}\ \overline{1603g} = ACC2$ $1608c = \overline{1603f}\ \overline{1603g}\ \overline{1603k} = ACC3$ $1608d = \overline{1603f}\ \overline{1603g}\ \overline{1603k}\ \overline{1603j} = ACC4$ $1608e = \overline{1603f}\ \overline{1603g}\ \overline{1603k}\ \overline{1603j}\ \overline{1603e} = ACC5$ $1608f = \overline{1603f}\ \overline{1603g}\ \overline{1603k}\ \overline{1603j}\ \overline{1603e}\ \overline{1603h} = ACC6$ $1608g = \overline{1603f}\ \overline{1603g}\ \overline{1603k}\ \overline{1603j}\ \overline{1603e}\ \overline{1063h}\ \overline{1603d} = ACC7$ Logic 1609, Sender Sequence State Control, SX:

$1609a = \overline{PB4}\ \overline{PC1}\ \overline{PC2}\ \overline{PC3}\ \overline{PC4} = DSX0$ $1609b = \overline{PB4}\ \overline{PC1}\ PC2\ \overline{PC3}\ \overline{PC4} = DSX4$ $1609c = PB4\ \overline{PC1}\ PC2\ \overline{PC3}\ \overline{PC4} = DSX5$ $1609d = \overline{PB4}\ \overline{PC1}\ \overline{PC2}\ PC3\ \overline{PC4} = DSX8$ Logic 1610, Delete Commands:

$1610a = \overline{PB1}\ \overline{PB2}\ \overline{PB3} = DDE0$ $1610b = PB1\ \overline{PB2}\ \overline{PB3} = DDE1$ $1610c = \overline{PB1}\ PB2\ \overline{PB3} = DDE2$ $1610d = PB1\ PB2\ \overline{PB3} = DDE3$ $1610e = \overline{PB1}\ \overline{PB2}\ PB3 = DDE4$ Logic 1611, Position Content:

$1611a = \overline{PA1}\ \overline{PA2}\ \overline{PA3}\ \overline{PA4} = DPA15$ $1611b = \overline{PB1}\ \overline{PB2}\ PB3\ \overline{PB4} = DPB4$ $1611c = \overline{PB1}\ PB2\ PB3\ \overline{PB4} = DPB6$ $1611d = \overline{PB1}\ \overline{PB2}\ \overline{PB3}\ PB4 = DPB8$ $1611e = PG1\ \overline{PG2}\ \overline{PG3}\ \overline{PG4} = DPG1$ $1611f = PH1\ \overline{PH2}\ \overline{PH3}\ \overline{PH4} = DPH1$ $1611g = \overline{PH1}\ PH2\ \overline{PH3}\ \overline{PH4} = DPH2$ $1611h = \overline{PH1}\ \overline{PH2}\ \overline{PH3}\ PH4 = DPH8$ $1611j = \overline{PH1}\ PH2\ \overline{PH3}\ PH4 = DPH10$ $1611k = PH1\ PH2\ PH3\ PH4 = DPH15$ $1611m = PI1\ \overline{PI2}\ \overline{PI3}\ \overline{PI4} = DPI1$ $1611n = \overline{PI1}\ PI2\ \overline{PI3}\ PI4 = DPI10$ $1611p = PJ1\ \overline{PJ2}\ \overline{PJ3}\ \overline{PJ4} = DPJ1$ $1611q = \overline{PJ1}\ PJ2\ \overline{PJ3}\ PJ4 = DPJ10$ Logic 1612, Reverting Call Check:

$1612a = (NG1\ \overline{PI1} + \overline{NG1}\ PI1 + NG2\ \overline{PI2} + \overline{NG2}\ PI2 + NG3\ \overline{PI3} + \overline{NG3}\ PI3 + NG4\ \overline{PI4} + \overline{NG4}\ PI4)\ TY5$ $1612b = (NF1\ \overline{PH1} + \overline{NF1}\ PH1 + NF2\ \overline{PH2} + \overline{NF2}\ PH2 + NF3\ \overline{PH3} + \overline{NF3}\ PH3 + NF4\ \overline{PH4} + \overline{NF4}\ PH4)\ TY5$ $1612c = (NE1\ \overline{PG1} + \overline{NE1}\ PG1 + NE2\ \overline{PG2} + \overline{NE2}\ PG2 + NE3\ \overline{PG3} + \overline{NE3}\ PG3 + NE4\ \overline{PG4} + \overline{NE4}\ PG4)\ TY5$ $1612d = (ND1\ \overline{PF1} + \overline{ND1}\ PF1 + ND2\ \overline{PF2} + \overline{ND2}\ PF2 + ND3\ \overline{PF3} + \overline{ND3}\ PF3 + ND4\ \overline{PF4} + \overline{ND4}\ PF4)\ TY5$ $1612e = (NC1\ \overline{PE1} + \overline{NC1}\ PE1 + NC2\ \overline{PE2} + \overline{NC2}\ PE2 + NC3\ \overline{PE3} + \overline{NC3}\ PE3 + NC4\ \overline{PE4} + \overline{NC4}\ PE4)\ TY5$ $1612f = \overline{1612a}\ \overline{1612b}\ \overline{1612c}\ \overline{1612d}\ \overline{1612e}$ Logic 1613, Control Commands for Carry Buffer:

$1613a = [TL8\ BTY3\ (\overline{1608f}\ DTL1 + \overline{1608c}\ DTL2 + \overline{1608a}\ DTL0 + DTL1\ TD)] + [TL8\ \overline{1604c}\ (\overline{1608a}\ DTL1 + \overline{1608b}\ DTL2)] + [TL8\ \overline{1604c}\ (\overline{1608c}\ DTL3 + \overline{1608d}\ DTLA + \overline{1608c}\ DTLS + \overline{1608f})\ DTL6] + (TD\ \overline{1604c}\ \overline{1608b}) + ST\ BTY3$ $1613b = [BTL8\ DTL0\ \overline{1604c}\ (\overline{1608d}\ \overline{1608b} + \overline{1608b}\ \overline{1608c} + \overline{1608c}\ \overline{1608d}\ FUT + \overline{1608g}\ FUT\ DD)]$
$[(\overline{1608g}\ DTL1\ TL8\ BTY3) + (\overline{1608f}\ DTL1\ TL8\ BTY3) + [\overline{1611c}\ DD\ TY5\ (1611p + 1611q)]$ $1613c = PI4 + TCT$ $1613d = PJ3 + TCX1$ $1613e = \overline{1608g}\ (DCX0 + DCX2)$ $1613f = \overline{1608g}\ DCX1$ $1613g = PJ4 + TCX2$ $1613h = \overline{1608g}\ DCX1$ $1613j = \overline{1608c}\ TD\ \overline{FUT}$ $1613k = PF4 + TF0$ $1613m = \overline{1606d}\ PB4\ \overline{1611d}\ \overline{1604d}\ PP$ $1613n = \overline{1608a}\ \overline{1608b}\ DTL0\ \overline{BTL8}\ TD$ $1613p = PE1 + \overline{BU1}\ TKE$ $1613q = \overline{BU1}\ PE4\ PB3$ $1613r = PE3 + \overline{BU2}\ TKM$ $1613s = PJ1 + TLX1$ $1613t = PJ2 + TLX2$ $1613u = \overline{1612f}\ REV\ KE$ $1613v = 1608b\ 1608c\ DTL0\ BTL8\ TD$ $1613w = PE2 + TRQ$ $1613x = (\overline{TB} + 1608a)\ (EP + HS\ FD)$ $1613y = (DPH2 + DPH8 + DPH15)\ \overline{PE1} + SRT$

2e. CA, CARRY BUFFER—Continued $1613z = (\overline{1608c}\ DTL3 + \overline{1608d}\ DTL4 + \overline{1608e}\ DTL5$
$\quad + \overline{1608f}\ DTL6 + \overline{1608g}\ DTL7)\ \overline{KE}\ \overline{BTL8}\ \overline{1610a}$
$1613aa = DMF12\ \overline{FM}$
$1613ab = PH4\ \overline{DQX5}$
$1613ac = \overline{DPA15}\ \overline{DMX2}\ \overline{DRX3}$
$1613ad = \overline{DPA15}\ RT$
$1613ae = \overline{DQX7}\ LAT$
$1613af = MDC\ \overline{DVX2}\ \overline{PF1}\ \overline{PF2} + \overline{DRX1}\ \overline{EC}\ PP$
$\quad + TRG + RRG + TCE$
$1613ag = DD\ TD\ \overline{1613bf} + 1613ap + 1613ar + 1613ag$
$\quad + 1613av + 1613aw + 1613au + 1613am + 1613an$
$1613ah = \overline{DVX3}\ \overline{DVX0}\ \overline{PB4}\ PP$
$1613aj = \overline{DRX3}\ \overline{PB4}\ \overline{DPA15}\ \overline{DMX0}\ PP + PF1 + \overline{PE4}$
$\quad + DPH10 + TDR$
$1613ak = \overline{PH1}\ \overline{PH2}\ \overline{PH3}$
$1613am = (TD\ FUT\ DTL0\ \overline{BTL8}\ BTY4)\ \overline{1608g}\ \overline{DD}$
$1613an = (TD\ FUT\ DTL0\ BTL8\ BTY4)\ \overline{1608c}\ \overline{1608d}$
$1613ap = 1613am$
$1613aq = (\overline{1611m}\ \overline{1611e} + \overline{1611n}$
$\quad \overline{1603k})\ \overline{1611f}\ \overline{1611j}\ \overline{1613at}$
$1613ar = \overline{1613as}\ \overline{1613at}\ \overline{1613aq}$
$1613as = \overline{1611m}\ \overline{1611j}\ \overline{1611f}\ \overline{1611e}$
$1613at = BTY4 + \overline{DTL0} + BTL8 + \overline{1608c}$
$1613au = DTL0\ TY5\ \overline{TL8}\ (1611p$
$\quad + 1611q)\ (PB2\ PB3\ \overline{PB4} + 1611d)$
$1613av = (\overline{1611b}\ \overline{PJ1})\ DTL0\ TY5\ TL8\ TN$
$1613aw = (\overline{1611b}\ \overline{PJ1})\ TN\ (DTL0\ TY5\ \overline{TL8})$
$1613ax = PC1 + TTL1$
$1613ay = 1613AM + 1613an + 1613ar + 1613au + 1613av$
$1613az = PC2 + TTL2$
$1613ba = 1613au + 1613aq + 1613am + 1613an + 1613ap$
$\quad + 1613ar$
$1613bb = PC3 + TTL4$
$1613bc = 1613ap + 1613aq + 1613aw$
$1613bd = [(\overline{PB4}\ \overline{PC1}\ PC4 + \overline{PC4} + \overline{PC3})\ (\overline{PB4}\ \overline{PC1}$
$\quad PC2 + \overline{PC3} + PC4) + FD + PR]\ \overline{1607e}\ SM\ SR$
$1613be = MFS\ DMF0\ FM\ \overline{1606d}$

2e. CA CARRY BUFFER

Logic 1614, Carry Buffer Registers:
   $AC$ set $= SAC$-$A\ B71 + SAC$-$B\ B71$
   $CB$ set $= BPG3\ B71 + SCB$-$B\ B71$
   $CE$ set $= SCE\ B71$
   $CT$ set $= SCT$-$A\ B71 + SCT$-$B\ B70$
   $CX1$ set $= SCX1$-$A\ B71 + SCX1$-$B\ B74$
   $CX1$ "b" reset $= RCX1$-$B\ B74$
   $CX2$ set $= SCX2$-$A\ B71 + SCX2$-$B\ B74$
   $DD$ set $= ACC1\ (B73 + B74)$
   $DD$ "b" reset $= \overline{ACC1}\ B74$
   $DR$ set $= SDR$-$A\ B71 + SDR$-$B\ B74$
   $DS$ set $= PB3\ B72 + SDS$-$B\ B72$
   $EP$ set $= PB4\ B74 + SEP\ B74$
   $FD$ set $= SFD$-$A\ B71 + SFD$-$B\ B70$
   $FM$ set $= PD3\ B71 + SFM$-$B\ B71$
   $FP$ set $= SFP$-$A\ B71 + SFP$-$B\ B71$
   $FT$ set $= SFT$-$A\ B70 + SFT$-$B\ B71$
   $HE$ set $= SHE$-$A\ B74 + SHE$-$B\ B74$
   $HS$ set $= SHS$-$A\ B72 + SHS$-$B\ B72$
   $KE$ set $= SKE$-$A\ B71 + SKE$-$B\ B41$
   $KM$ set $= SKM$-$A\ B71 + SKM$-$B\ B41$
   $LX1$ set $= SLX1$-$A\ B71$
   $LX2$ set $= SLX2\ B71 + DPA15\ B75$
   $PP$ set $= MPP\ B41 + SPP$-$B\ B41$
   $RA$ set $= BPG4\ B71 + SRA$-$B\ B71$
   $RC$ set $= SRC$-$A\ B75 + SRC$-$B\ B75$
   $RP$ set $= SRP$-$A\ B74 + SRP$-$B\ B74$
   $RQ$ set $= SRQ$-$A\ B75 + SRQ$-$B\ B75$
   $RT$ set $= SRT$-$A\ B71 + SRT$-$B\ B74$
   $ST$ set $= SST$-$A\ B71 + SST$-$B\ B71$
   $TA$ set $= STA$-$A\ B72 + STA$-$B\ B72$
   $TA$ "b" reset $= \overline{ACC7}\ B75$
   $TB$ set $= PH4\ B72 + STB$-$B\ B72$
   $TD$ set $= STD$-$A\ B71 + STD$-$B\ B71$
   $TL1$ set $= STL1$-$A\ B71 + STL1$-$B\ B70$
   $TL2$ set $= STL2$-$A\ B71 + STL2$-$B\ B70$
   $TL4$ set $= STL4$-$A\ B71 + STL4$-$B\ B70$
   $TL8$ set $= PC4\ B71 + STL8$-$B\ B71$
   $TS$ set $= STS$-$A\ B72 + STS$-$B\ B72$
   $TR$ set $= STR$-$A\ B76 + STR$-$B\ B76$
   $TN$ set $= STN$-$A\ B74 + STN$-$B\ B71$
   All ac "a" resets $= B77$
   $B70 = B00\ TX7$
   $B41 = B00\ TX4\ TY1$
   $B71 = B00\ TX7\ TY1$
   $B72 = B00\ TX7\ TY2$
   $B73 = B00\ TX7\ TY3$
   $B74 = B00\ TX7\ TY4$
   $B75 = B00\ TX7\ TY5$
   $B76 = B00\ TX7\ TY6$
   $B77 = B00\ TX7\ TY7$ Logic 1615, Transfer Commands:
   $1615a = \overline{CX1}\ \overline{CX2} = DCX0$
   $1615b = CX1\ \overline{CX2} = DCX1$
   $1615c = \overline{CX1}\ CX2 = DCX2$ Logic 1616, Operator, PS, or Rev. Call Instructions:
   $1616a = \overline{LX1}\ \overline{LX2} = DLX0$
   $1616b = LX1\ \overline{LX2} = DLX1$
   $1616c = \overline{LX1}\ LX2 = DLX2$
   $1616d = LX1\ LX2 = DLX3$ Logic 1617, Totals Digits:
   $\overline{1617a} = \overline{TL1}\ \overline{TL2}\ \overline{TL4}\ \overline{TL4} = DTL0$
   $\overline{1617b} = TL1\ \overline{TL2}\ \overline{TL4} = \overline{DTL1}$
   $\overline{1617c} = \overline{TL1}\ TL2\ \overline{TL4} = \overline{DTL2}$
   $\overline{1617d} = TL1\ TL2\ \overline{TL4} = \overline{DTL3}$
   $\overline{1617e} = \overline{TL1}\ \overline{TL2}\ TL4 = \overline{DTL4}$
   $\overline{1617f} = TL1\ \overline{TL2}\ TL4 = \overline{DTL5}$
   $\overline{1617g} = \overline{TL1}\ TL2\ TL4 = \overline{DTL6}$
   $\overline{1617h} = TL1\ TL2\ TL4 = \overline{DTL7}$ Logic 1618, Long Count Logic:
$LC1$ dc set $= \overline{LC1}\ AS1\ \overline{TZ1}$
$LC1$ dc reset $= LC1\ TZ1$
$LC2 =$ dc set $= \overline{LC2}\ AS2\ TZ1$
$LC2$ dc reset $= LC2\ TZ1$
ac sets and resets $= B41$
$\overline{LC2} = LC2 + TY7(FT + FST)$
$MFS = \overline{1MFS} + \overline{2MFS} + \ldots + \overline{24MFS}$
$MF1$ set $= \overline{MFS}\ (MF1$-$MFD1 + MF2$-$MFD1$
$\quad + \ldots + MF24$-$MFD1)$
$MF2$ set $= \overline{MFS}\ (MF1$-$MFD2 + MF2$-$MFD2$
$\quad + \ldots + MF24$-$MFD2)$
$MF4$ set $= \overline{MFS}\ (MF1$-$MFD4 + MF2$-$MFD4$
$\quad + \ldots MF24$-$MFD4)$
$MF8$ set $= \overline{MFS}\ (MF1$-$MFD8 + MF2$-$MFD8$
$\quad + \ldots MF24$-$MFD8)$
Where MF1—MFD1, 2, 4, and 8, MF2—MFD1, 2, 4 and 8, ... , MF24—1, 2, 4, and 8 are signals being generated by 24 multi-frequency receivers, if needed.
ac sets of all $MF$ flip-flops $= B00\ TX2\ TY1 = B21$
ac resets of all $MF$ flip-flops $= B00[(BTX7\ BTY2)$
$\quad (\overline{MF1}\ \overline{MF2}\ MF4\ MF8) + BTX7\ BTY7]$
$1618b = \overline{MF1}\ \overline{MF2}\ \overline{MF4}\ \overline{MF8} = DMF0$

2f. RT, REGISTER TRANSCEIVER

Logic 1700, Control Commands:
$BU1$ dc "a" set $= SKE$-$A$
$BU1$ ac "a" set $= B00\ BTX7\ BTY1 = B71$
$BU1$ dc "b" set $= SKE$-$B$
$BU1$ ac "b" set $= B41$
$BU1$ dc "a" reset $= BU1\ (CP1 + TE1 + SWS)$
$BU1$ ac "a" reset $= B00\ BTX7\ BTY7 = B77$
$LD$ dc "a" set $= \overline{LD}\ BPE1\ \overline{CP1}\ \overline{TE1}$
$LD$ ac "a" set $= B77$
$LD$ dc "a" reset $= LD$ 2f. RT, REGISTER TRANSCEIVER—Continued LD ac "a" reset=B77+B71
SE dc "a" set=BPE1 $\overline{1705s}$ $\overline{LD}$ $\overline{RV}$
SE ac "a" set=B00 TX6 BTY7=B67
SE dc "a" reset=AE SE
SE ac "a" reset=SSH
SE dc "b" reset=CP1+TE1+SWS
SE ac "b" reset=B77
RV dc "a" set=$\overline{RV}$ LD $\overline{SE}$ $\overline{1705s}$
RV ac "a" set=B00
RV dc "a" reset=RF RV
RV ac "a" reset=B00
RV dc "b" reset=CP1+TE1+SWS
RV ac "b" reset=B77
RF dc "a" set=RV PR1
RF ac "a" set=B00
RF dc "a" reset=RF
RF ac "a" reset=B77+B71
CP1 dc "a" set=PE1 RF $\overline{BPI1}$ (1702a+1702c) ($\overline{NL1}$ $\overline{NL2}$ $\overline{NL3}$ $\overline{NL4}$)+1702d 1702a 1702e
CP1 ac "a" set=B71
CP1 dc "a" reset=CP1 BPE1
CP1 ac "a" reset=B77
TE1 dc "a" set=(BP1+$\overline{NL1}$ NL2 NL3 $\overline{NL4}$ RF BPE1 ER
TE1 ac "a" set=B71
TE1 dc "b" set=BPE1 DPA15
TE1 dc "b" set=B00 BTX7 BTY6=B76
TE1 dc "a" reset=CP1+TE1+SWS
TE1 ac "a" reset=B77
ST dc "a" set=$\overline{ST}$ $\overline{STS}$ (GO1 $\overline{1704a}$+GO2 $\overline{1704b}$+GO3 $\overline{1704c}$+GO4 $\overline{1704d}$+GO5 $\overline{1704e}$+GO6 $\overline{1704f}$+GO7 $\overline{1704g}$ LD SE
ST ac "a" set=B00
ST dc "a" reset=SE AE ST
ST ac "a" reset=SSH
ST dc "b" reset=CP1+TE1+SWS
ST ac "b" reset=B77

Logic 1701, Storage of Instruction Digits:
IN1 dc "a" set=PH1
IN1 dc "a" reset=IN1
IN2 dc "a" set=PH2
IN2 dc "a" reset=IN2
IN2 dc "b" reset=DIN15
IN4 dc "a" set=PH3
IN4 dc "a" reset=IN4
IN4 dc "b" reset=DIN13
IN8 dc "a" set=PH4
IN8 dc "a" reset=IN8
all ac sets=B00 (BPE1 BU1 PB3)(BTX7 TY1)=B71
all ac resets=B00 1705d
IN2 and IN4 ac "b" resets
    =B00 1705c (BTX7 TY1 PE1 RF)

Logic 1702, Decoding of Instruction Digits:
1702a=$\overline{IN1}$ IN2 $\overline{IN4}$ $\overline{IN8}$=DIN2
1702b=$\overline{IN1}$ $\overline{IN2}$ $\overline{IN4}$ IN8=DIN8
1702c=IN1 $\overline{IN2}$ $\overline{IN4}$ IN8=DIN9
1702d=IN1 $\overline{IN2}$ IN4 IN8=DIN13
1702e=IN1 IN2 IN4 IN8=DIN15
1702f=BTY7 BTX4 ($\overline{LD}$ BPE1 $\overline{CP1}$ $\overline{TE1}$)
1702g=TY4 BTX4 $\overline{1702p}$
1702h=TY7 TX4 $\overline{1702p}$ $\overline{1702c}$ $\overline{1702d}$
1702j=$\overline{1702e}$ TY4 BTX4 $\overline{1072p}$
1702k=TY4 $\overline{1702b}$ BTX4 $\overline{1702p}$
1702m=BTX4 ($\overline{1702e}$ $\overline{1702d}$ TY5+TY3 $\overline{1702e}$) $\overline{1702p}$
1702p $\overline{LD}$ BPE1 $\overline{CP1}$ $\overline{TE1}$
1702n=BTX4 [TY3 $\overline{1702c}$+TY4 $\overline{1702a}$ $\overline{1702e}$ $\overline{1702e}$ $\overline{1702b}$+TY5 (1702a+1702b+1702e)] $\overline{1702p}$ Logic 1703, Translator Address Storage:
AD1 dc "a" set=BPI1+PI4
AD1 dc "b" set=$\overline{AD1}$
AD1 dc "a" reset=AD1
AD1 dc "b" reset=AD1
AD2 dc "a" set=BPI2
AD2 dc "b" set=AD1 $\overline{AD2}$ $\overline{AD4}$
AD2 dc "a" reset=AD2
AD2 dc "b" reset=AD1 AD2 $\overline{AD4}$
AD1, AD2, AD4 ac "a" sets=B71
AD1, AD2, AD4 ac "b" sets and resets
    =B00 (1705b BTX7 TY7 PE1 RF)
AD1, AD2, AD4 ac "a" resets=B77

Logic 1704, Translator Address Decoding:

1704a=($\overline{ST}$ SE) (AD1 $\overline{AD2}$ $\overline{AD4}$) $\overline{1702a}$
1704b=($\overline{ST}$ SE) ($\overline{AD1}$ AD2 $\overline{AD4}$) $\overline{1702a}$ Logic 1705, Shift Register Control:
1705a=$\overline{NL1}$+NL2+$\overline{NL3}$+NL4
1705b=(AD1+$\overline{AD2}$+AD4) $\overline{1702a}$ $\overline{1705a}$ $\overline{BP1}$
1705c=(1702c+1702d+1702e) ($\overline{NL1}$ $\overline{NL2}$ $\overline{NL3}$ $\overline{NL4}$)
1705d=[BTX7 (CP1+TE1+$\overline{SWB}$) BTY7] HDS1
1705e=BTX7 BTY1 PE1 RF
    (1702b+BP1+1702c+$\overline{NL1}$ NL2 NL3 $\overline{NL4}$)
1705f=1705c HDS1
1705g=(DCS+BF2) BP1=BP1 dc "b" set
1705h=(DCS+BF2) BP1=BP1 dc "b" reset
BP1 ac "b" set and reset=SSH
BP1 ac "a" reset=B77+B71
1705j=(BF2+$\overline{1705i}$+BP1) BF1 ($\overline{BP1}$+$\overline{1705i}$+BF2)
1750k=$\overline{1705j}$
1705m=NK1+NK2+NK3+NK4+NL1+NL2
    +NL3+NL4+NM1+NM2+NM3+NM4+NN1
    +NN2+NN3+NN4+NP1+NP2+NP3+NP4
1705n=NQ1+NQ2+NQ3+NQ4+NS1+NR2
    +NR3+NR4+NJ1+NJ2+NJ3+NJ4+NB1
    +NB2+NB3+NB4+NC1+NC2+NC3+NC4
1705p=ND1+ND2+ND3+ND4+NE1+NE2
    +NE3+NE4+NF1+NF2+NF3+NF4+NG1
    +NG2+NG3+NG4+NH1+NH2+NH3+NH4
1705q=NI1+NI2+NI3+NI4+PR1+SU1
1705r=BF1+BF2
1705s=$\overline{1705m}$ $\overline{1705n}$ $\overline{1705p}$ $\overline{1705q}$ $\overline{1705r}$
1705t=$\overline{1705m}$ $\overline{1705n}$ $\overline{1705p}$ $\overline{1705q}$
BF1 dc "b" set=PR1
BF1 dc "b" reset=$\overline{PR1}$
BF1 dc "a" reset=BF1
BF2 dc "b" set=1705j
BF2 dc "b" reset=1705k
BF2 dc "a" reset=BF2
BF1 and BF2 ac sets and resets=SSH
dc "a" sets of shift register flip-flops=Information from read shift buffer, address, and instruction flip-flops
ac "a" sets of shift register flip-flops=Time slot commands required for the different groups of information as shown below:
Process digits:
    B47=B00 1702f Instructions
    B44=B00 1702g Totals digits
    B47=B00 1702h Translator addr.
    B47=B00 1702h Code translation
    B47=B00 1702h Delete
Sender Instructions:
B44=B00 1702j Mode
B44=B00 1702k End of send
B44=B00 1702k Skip
B43+B45=B00 1702m {Class of service / Party digit
B43+B44+B45=B00 1702n {Dialed digits / Switching digits
ac "b" sets and resets for all shift register flip-flops=SSH
ac "a" resets of shift register flip-flops=B00 1705d +1705e 2g. SA, SENDER ASSIGNER Logic 1801, Sender Selection Control and Counter:
1801a=B00 [TX7 (TY2 DQ3+TY2 TX7 $\overline{BY}$ $\overline{SAV}$)]

2g. SA, SENDER ASSIGNER—Continued $1801b = \overline{AS1}\ 1801a$ $1801c = (\overline{AS2} + \overline{AS8})\ AS1\ 1801a$ $1801d = AS1\ \overline{AS2}\ 1801a$ $1801e = AS1\ AS2\ 1801a$ $1801f = AS2\ \overline{AS4}\ \overline{AS8}\ 1801a$ $1801g = AS2\ AS4\ 1801a$ $1801h = AS1\ AS2\ AS4\ 1801a$ $1801j = AS1\ AS2\ AS8\ 1801a$ Logic 1802, Control and RJ Identifying Register:

$1802a = B00\ (TX7\ TY2\ DQX1\ \overline{BY}\ SAV)$ $1802b = 1802\ (TZ1 + TZ2 + TZ3 + \ldots + TZ24)$ $1802c = B00\ [TX7\ (TY2\ DQ3 + SWB)]\ BY$ $1802d = 1802c\ (RG1 + RG2 + \ldots + RG24)$ $1802e = SAV\ DQX3\ TY2 = LAT$ $1802f = \overline{BY}\ SAV = LAA$ $1802g = DAS11\ SSS$ Logic 1803, Sender Available Command:

$1803a = 1802g + 1803b + 1803c = SAV$ $1803b = (\overline{AS2}\ \overline{AS4}\ \overline{AS8})\ SN1\text{–}IDL$ $\quad + (\overline{AS1}\ \overline{AS4}\ \overline{AS8})\ SN2\text{–}IDL$ $\quad + (AS1\ AS2\ \overline{AS4})\ SN3\text{–}IDL$ $\quad + (\overline{AS1}\ \overline{AS2}\ \overline{AS8})\ SN4\text{–}IDL$ $\quad\quad\quad + (AS1\ \overline{AS2}\ AS4)\ SN5\text{–}IDL$ $1803c = (\overline{AS1}\ AS2\ AS4)\ SN6\text{–}IDL$ $\quad + (AS1 + AS2 + \overline{AS4})\ SN7\text{–}IDL$ $\quad + (\overline{AS1}\ \overline{AS2}\ AS8)\ SN8\text{–}IDL$ $\quad + (AS1\ \overline{AS2}\ AS8)\ SN9\text{–}IDL$ $\quad\quad + (\overline{AS1}\ AS2\ AS8)\ SN10\text{–}IDL$ $1803d = (\overline{AS2}\ \overline{AS4}\ \overline{AS8})\ BY1 = SHL$ for $SN1$

2h. SC, SENDER CONTROLLER

Logic 2001, Sender Sequence State Storage:

$SS1$ dc set $= PB4$ $SS1$ dc reset $= SS1$ $SS2$ dc set $= PC1$ $SS2$ dc reset $= SS2$ $SS4$ dc set $= BPC2$ $SS4$ dc reset $= SS4$ $SS8$ dc set $= PC3$ $SS8$ dc set $= SS8$ $SS16$ dc set $= BPC4$ $SS16$ dc set $= SS16$ all ac set $= (B00\ TX5\ BTY2)\ BTY2\ (DQX4 + DQX5)\ SR\ SM$ all ac reset $= (B00\ BTX7\ BTY7)\ (TY7\ [DQX4 + DQX5])$ Logic 2002, Sender Address Storage and Decoding:

$SD1$ dc set $= BPF1$ $SD1$ dc reset $= SD1$ $SD2$ dc set $= BPF2$ $SD2$ dc reset $= SD2$ $SD4$ dc set $= BPF3$ $SD4$ dc reset $= SD4$ $SD8$ dc set $= BPF4$ $SD8$ dc reset $= SD8$ all ac set $= (B00\ TX3\ BTY2)\ (DQX4 + DQX5)$ all ac reset $= (B00\ BTX7\ BTY7)\ (TY7\ [DQX4 + DQX5])$ $DSD1 = SD1\ \overline{SD2}\ \overline{SD4}\ \overline{SD8}$ $DSD2 = \overline{SD1}\ SD2\ \overline{SD4}\ \overline{SD8}$ $DSD3 = SD1\ SD2\ \overline{SD4}$ $DSD4 = \overline{SD1}\ \overline{SD2}\ SD4$ $DSD5 = SD1\ \overline{SD2}\ SD4$ $DSD6 = \overline{SD1}\ SD2\ SD4$ $DSD7 = SD1\ SD2\ SD4$ $DSD8 = \overline{SD1}\ \overline{SD2}\ SD8$ $DSD9 = SD1\ \overline{SD2}\ SD8$ $DSD10 = \overline{SD1}\ SD2\ SD8$ Logic 2003, Sender Sequence States Decoded, MF Inst.:

$\overline{2003a} = SS1\ SS2\ \overline{SS4}\ \overline{SS8}\ \overline{SS16}$ $2003b = \overline{SS1}\ \overline{SS2}\ SS4\ \overline{SS8}\ \overline{SS16}$ $2003c = \overline{SS1}\ \overline{SS2}\ \overline{SS4}\ SS8\ \overline{SS16}$ $2003d = \overline{SS1}\ \overline{SS2}\ \overline{SS4}\ \overline{SS8}\ SS16$ $2003e = \overline{SS1}\ \overline{SS2}\ SS4\ \overline{SS8}\ SS16$ $2003f = \overline{SS1}\ \overline{SS2}\ \overline{SS4}\ SS8\ SS16$ $2003g = SS1\ \overline{SS2}\ \overline{SS4}\ SS8\ SS16$ $2003h = \overline{SS1}\ SS2\ SS4\ SS8\ SS16$ $2003j = \overline{SS1}\ \overline{SS2}\ \overline{SS4}\ \overline{SS8}\ \overline{SS16}$ $2003k = BPH1\ BPH2\ \overline{BPH3}$ $2003m = \overline{BPH1}\ BPH2\ BPH3$ $2003n = \overline{BPH1}\ \overline{BPH2}\ \overline{BPH3}$ Logic 2004, Sender Control Signals:

$2004a = TY2\ (BPH1\ \overline{BPH2}\ \overline{BPH3}\ \overline{2003a}$ $\quad + \overline{BHP1}\ BPH2\ \overline{BPH3}\ \overline{2003c}$ $\quad + \overline{BPH1}\ BPH2\ \overline{BPH3}\ \overline{2003d}$ $\quad + \overline{BPH1}\ \overline{BPH2}\ BPH3\ \overline{2003e}$ $\quad + BPH1\ \overline{BPH2}\ BPH3\ \overline{2003f}$ $\quad + \overline{BPH1}\ BPH2\ BPH3\ \overline{2003j}$ $\quad\quad + BPH1\ BPH2\ BPH3\ \overline{2003g}) = LES$ $2004b = BPD1\ \overline{BPD2}\ BPD3\ TY2 = LHR$ $2004c = BPH4\ TY2 = LTK$ $2004d = TY2\ (BPG2\ BPG4\ \overline{2003b} + BPG1\ \overline{BPG2}\ \overline{2003c}$ $\quad\quad + \overline{BPG1}\ BPG3\ \overline{2003g}) = LMF$ $2004e = TY2\ (\overline{BPG2}\ BPG4\ \overline{2003b} + \overline{BPG1}\ BPG2\ \overline{2003c}$ $\quad\quad + BPG1\ BPG3\ \overline{2003g}) = LDP$ Logic 2005, MF End of Send Entry Control:

$2005a = TY2\{[(BPG1\ \overline{BPG2}\ BPG3\ \overline{BPG4})\ \overline{2003m}\ \overline{2003f}]$ $\quad + [(BPG1 + BPG2 + \overline{BPG3}$ $\quad\quad + \overline{BPG4})\ BPG1\ \overline{BPG3}\ \overline{2003m}\ \overline{2003h}]$ $\quad + [(\overline{BPG1}\ BPG2\ BPG3\ BPG4)$ $\quad\quad \overline{BPG1}\ BPG3\ \overline{2003m}\ \overline{2003h}]$ $\quad + [(BPG1\ BPG2\ BPG3\ BPG4)\ \overline{2003k}\ \overline{2003c}]$ $\quad + [(BPG1 + BPG2 + \overline{BPG3}$ $\quad\quad + \overline{BPG4})\ BPG1\ \overline{BPG3}\ \overline{2003n}\ \overline{2003f}]$ $\quad\quad + BPG1\ BPG3\ BPG4\ \overline{2003m}\ \overline{2003f}\}$ $2005b = TY2\ (2005a + 2004d)$ Logic 2006, Switching Digit Gating Control:

$\overline{2006a} = SS1\ SS2\ SS4\ BTY6$ $\overline{2006b} = [(BTY6 + BTY4 + BTY3)\ SS1\ \overline{SS2}\ \overline{SS4}]$ $\quad\quad + \overline{SS1}\ SS2\ \overline{SS4}\ BTY5$ $\overline{2006c} = [\overline{SS1}\ SS2\ \overline{SS4}\ (BTY3 + BTY4 + BTY5)]$ $\quad\quad + SS1\ \overline{SS2}\ \overline{SS4}\ BTY6$ $\overline{2006d} = [(BTY3 + BTY4 + BTY3)\ SS1\ SS2\ \overline{SS4}]$ $\quad\quad + \overline{SS1}\ SS2\ \overline{SS4}\ BTY6$ $\overline{2006e} = \overline{SS1}\ SS2\ \overline{SS4}\ BTY6 + \overline{SS1}\ \overline{SS2}\ SS4\ BTY4$ $\quad\quad + SS1\ \overline{SS2}\ SS4\ BTY3 + SS1\ SS2\ \overline{SS4}\ BTY5$ $\overline{2006f} = SS1\ \overline{SS2}\ SS4\ BTY4 + \overline{SS1}\ SS2\ SS4\ BTY3$ $\quad\quad + \overline{SS1}\ \overline{SS2}\ SS4\ BTY5 + SS1\ \overline{SS2}\ SS4\ BTY6$ $\overline{2006g} = SS1\ \overline{SS2}\ SS4\ BTY6 + \overline{SS1}\ \overline{SS2}\ SS4\ BTY5$ $\quad\quad + \overline{SS1}\ SS2\ SS4\ BTY4 + SS1\ SS2\ SS4\ BTY3$ $\overline{2006h} = SS1\ SS2\ SS4\ BTY4$ $\quad\quad + SS1\ \overline{SS2}\ SS4\ BTY5 + \overline{SS1}\ SS2\ SS4\ BTY6$ $\overline{2006k} = \overline{SS1}\ SS2\ SS4\ BTY6$ $\overline{2006m} = TY2\ (2003b + 2003c + 2003f + 2003g$ $\quad\quad + 2003h) + BTY3\ \overline{SS8}\ SS16$ $\quad + BTY4\ SS8\ SS16 + BTY5\ SS8\ SS16$ $\quad\quad\quad + BTY6\ \overline{SS8}\ \overline{SS16}$ $2006A1 = \overline{2006m}\ (\overline{2006a}\ PJ1 + \overline{2006b}\ PI1$ $\quad + \overline{2006d}\ BPG1 + \overline{2006f}\ BPE1 + \overline{2006h}\ PC1)$ $2006A2 = \overline{2006m}\ (\overline{2006a}\ PJ2 + \overline{2006b}\ PI2$ $\quad + \overline{2006d}\ BPG2 + \overline{2006f}\ BPE2 + \overline{2006h}\ BPC2)$ $2006A4 = \overline{2006m}\ (\overline{2006a}\ PJ3 + \overline{2006b}\ BPI3$ $\quad + \overline{2006d}\ BPG3 + \overline{2006f}\ BPE3 + \overline{2006h}\ BPC3)$ $2006A8 = \overline{2006m}\ (\overline{2006d}\ PJ4 + \overline{2006b}\ PI4$ $\quad + \overline{2006d}\ BPG4 + \overline{2006f}\ BPE4 + \overline{2006h}\ PC4)$

2h. SC, SENDER CONTROLLER—Continued $2006B1 = \overline{2006m}\ (\overline{2006c}\ PH1 + \overline{2006e}\ PF1$
$\qquad + \overline{2006g}\ PD1 + \overline{2006k}\ PB1 + 2004d)$
$2006B2 = \overline{2006m}\ (\overline{2006c}\ BPH2 + \overline{2006e}\ PF2$
$\qquad + \overline{2006g}\ PD2 + \overline{2006k}\ PB2 + 2004d)$
$2006B4 = \overline{2006m}\ (\overline{2006c}\ BPH3 + \overline{2006e}\ PF3$
$\qquad + \overline{2006g}\ PD3 + \overline{2006k}\ PB3 + 2005a)$
$2006B8 = \overline{2006m}\ (\overline{2006c}\ BPH4 + \overline{2006e}\ PF4$
$\qquad + \overline{2006g}\ PD4 + \overline{2006k}\ PB4 + 2005b)$ Logic 2007, AR and Ticketer Identity Digits Entry:

$2007AR1 = \overline{HG}\ AT1$
$2007AR2 = \overline{HG}\ AT2$
$2007AR4 = \overline{HG}\ AT4$
$2007AR8 = \overline{HG}\ AT8$
$2007GR1 = \overline{HG}\ GU1$
$2007GR2 = \overline{HG}\ GU2$
$2007GR4 = \overline{HG}\ GU4$
$2007GR8 = \overline{HG}\ GU8$
$2007TU1 = BTY3\ AT1\ \overline{HG} + BTY4\ GU1\ \overline{HG}$
$2007TU2 = BTY3\ AT2\ \overline{HG} + BTY4\ GU2\ \overline{HG}$
$2007TU4 = BTY3\ AT4\ \overline{HG} + BTY4\ GU4\ \overline{HG}$
$2007TU8 = BTY3\ AT8\ \overline{HG} + BTY4\ GU8\ \overline{HG}$ Logic 2008, AR and TI Digits Storage and Control:

$SM$ dc set $= SM$
$SR$ dc set $= SR$
$DB$ dc set $=$ any combination of $AR$, $GR$, or $TU$ digits
ac set for above $= B00\ BTY2\ TX4$
ac reset for above $= B00\ BTX7\ BTY7$
$HG$ dc set $= PD4\ BTY2$
$HG$ ac set $= (B00\ TX3\ BTY2)\ (DQX4 + DQX5)$
$PR$ dc $A$ set $=$ (any digits send) $(BTY3 + BTY4)$
$PR$ dc $B$ set $= PD4\ TY1$
$PR$ dc $B$ reset $= BTY2$
ac set or reset $= B00\ BTX7$ for above conditions
ac $A$ reset $= B00\ BTX7\ BTY7$ Logic 2009, AR and TI Commands for Memory Storage—Transfer of AR and TI Commands to RC and RB for Storage:

$2009a = \overline{SM}$
$2009b = \overline{SR}$
$2009c = DB,\ \overline{DB}$
$2009d = \overline{PR}$
$2009e = HG,\ \overline{HG}$
$2009f = (BTY3 + BTY4)\ DB\ HG = STU$
$2009g = DB\ \overline{HG}\ BTY3\ (2007GR1 + 2007GR2$
$\qquad + 2007GR4 + 2007GR8) = SGR$
$2009h = BTY2\ [\overline{PD4}\ DB(2007GR1 + 2007GR2$
$\qquad + 2007GR4 + 2007GR8) + PD4\ \overline{DB}]$

2i. PG, MF AND DP GENERATOR

Logic 2010, MF Pulse Generator Control:
MFA, MFB, MFC, MFD dc "b" resets,
$MF$ dc "a" set $= MFD\ (MFB$
$\qquad + DPB\ DPA + MFC + MFA\ MFC$
$\qquad + MFB\ MFC + DPA\ DPB\ DPC\ DPD)$
$MF$ dc "a" reset $= (MFB\ MFA$
$\qquad + MFC + MFA\ MFC + MFB\ MFC$
$\qquad + MFA\ MFB\ MFC\ \overline{MFD} + MFD)\ (TZ3$
$\qquad + TZ5 + TZ7 + TZ10 + TZ13$
$\qquad + TZ16 + TZ19 + TZ21 + TZ23)$ MFA, MFB, MFC, MFD ac "b" resets,
$MF$ ac "a" set and reset $= B00\ TX7\ TY7$
MFA, MFB, MFC, MFD ac "a" sets and resets
$\qquad = B00\ TX4\ TY2\ TZ1$ Logic 2011, MF Generator, Counter Stepping Logic:
$MFA$ dc "a" set $= \overline{MFA}$
$MFA$ dc "a" reset $= MFA$
$MFB$ dc "a" set $= MFA\ \overline{MFB}$
$MFB$ dc "a" reset $= MFA\ MFB$
$MFC$ dc "a" set $= MFA\ MFB\ \overline{MFC}$
$MFC$ dc "a" reset $= MFA\ MFB\ MFC$
$MFD$ dc "a" set $= MFA\ MFB\ MFC\ \overline{MFD}$
$MFD$ dc "a" reset $= MFA\ MFB\ MFC\ MFD$ Logic 2012, Dial Pulse Generator Control:
DPA, DPB, DPC, DPD dc "b" resets,
$DP$ dc "a" set $= DPD\ (DPA + DPB + DPB\ DPA$
$\qquad + DPC + DPA\ DPC) + DPD$
$DP$ dc "a" reset $= (DPB + DPB\ DPA$
$\qquad + DPC + DPA\ DPC + DPB\ DPC$
$\qquad + DPA\ DPB\ DPC\ DPD)\ (TZ3$
$\qquad + TZ5 + TZ7 + TZ10 + TZ13$
$\qquad + TZ16 + TZ19 + TZ21 + TZ23)$ DPA, DPB, DPC, DPD ac "b" resets,
$DP$ ac "a" set and reset $= B00\ TX7\ TY7$
DPA, DPB, DPC, DPD ac "a" sets and resets
$\qquad = B00\ TX4\ TY2\ TZ1$ Logic 2013, DP Generator, Counter Stepping Logic:
$DPA$ dc "a" set $= \overline{DPA}$
$DPA$ dc "a" reset $= DPA$
$DPB$ dc "a" set $= DPA\ \overline{DPB}$
$DPB$ dc "a" reset $= DPB\ DPA$
$DPC$ dc "a" set $= DPA\ DPB\ \overline{DPC}$
$DPC$ dc "a" reset $= DPA\ DPB\ DPC$
$DPD$ dc "a" set $= DPA\ DPB\ DPC\ \overline{DPD}$
$DPD$ dc "a" reset $= DPA\ DPB\ DPC\ DPD$

2j. TM, TIME DIVISION GENERATOR

Logic 1300, Generator Pulse Control:
$\qquad A00 = A00\ SC$
$\qquad B00 = B00\ (\overline{SC}\ \overline{SB})$ Logic 1301, 8 μsec. Pulse Generator, TX ring counter:
ac "b" sets and resets $= A00\ \overline{TX8}$ Shift pulses
ac "a" resets $= A00\ TX8$ Reset pulses
$TX1$ dc "a" set $= \overline{TX1}\ \overline{TX2}\ \ldots\ \overline{TX7}$
$TX1$ ac "a" set $= B00$ Logic 1302, 57 μsec. Pulse Generator, TY ring counter:
ac "b" sets and resets $= A00\ TX8\ \overline{TY8}$ Shift pulses
ac "a" resets $= A00\ TX8\ TY8$ Reset pulses
$TY1$ dc "a" set $= \overline{TY1}\ \overline{TY2}\ \ldots\ \overline{TY8}$
$TY1$ ac "a" set $= B00\ TX7$ Logic 1303, 400 μsec. Pulse Generator, TZ ring counter:
ac "b" sets and resets $= A00\ TX8\ TY8\ \overline{TZ26}$ Shift pulses
ac "a" resets $= A00\ TX8\ TY8\ TZ26$ Reset pulses
$TZ1$ dc "a" set $= \overline{TZ1}\ \overline{TZ2}\ \ldots\ \overline{TZ25}$
$TZ1$ ac "a" set $= B00\ TX7\ TY7$

(3) Register junctor

3a. LOCAL REGISTER JUNCTOR

Referring now to FIGS. 9–10, the register junctor portion of a register-sender group comprises a maximum of 24 register junctors, local or incoming, in this preferred embodiment. An important function of the register junctor is the provision of a buffer between the electronic equipment and the outside facilities. As such, the register junctor employs reed relays for all switching and performs all functions of the register sender which require direct connection to the calling line. These functions include dial pulse repeating, dial tone control, battery feed to the calling line, calling station identification on party lines, test for coin deposit on calls from paystations, coin refund on busy or abandoned calls, and test for coin refund.

The local register junctor is intended primarily to be used by local lines. Upon seizure, the line marker connects low resistance battery over lead BY causing relay 10GO to operate and to connect ground via lead EC to the register receiver in the succeeding equipment. The register receiver then returns a ground signal over lead GO to hold relay 10GO operated. Furthermore, this ground is extended through the winding of relay 10GO to lead BY which causes the line group marker to connect the diphase sender to the TR and RR leads. After all of the diphase information is received by the register receiver in the succeeding equipment, the register receiver removes ground from lead GO, thereby causing relay 10GO to restore.

The dial tone is provided for all calls immediately upon seizure. Relay 10H1 operates in response to ground being connected to lead H by the register receiver. As a consequence, relay 9DT operates and locks by means of its first winding. Relay 10H2 operates and connects relay 9A to leads TR and RR. Relay 10H1 also causes relay 10H3 to operate. These H relays hold the register junctor operated and provide a time delay before the release of the register junctor.

Dial tone is thereby connected through winding 2 of relay 9A to the calling party under the control of relay 9DT. The tone is removed from the line upon the first on-hook signal from the line.

A call from a paystation causes relay 10CB to operate in response to ground being connected to lead 10CB by the succeeding common equipment. When calls originate from paystations which are not arranged to prevent dialing before coin deposit, dial tone is reconnected to the line if the calling party fails to deposit the coin. When calls originate from paystations which are arranged to prevent dialing before coin deposit, dial tone remains connected to the line until the coin is deposited. Deposit of the coin connects ground through the coin-control relay at the paystation via the preceding equipment to lead TR. When relay 9A restores on the first on-hook signal, the circuit is opened to relay 9PC and relay 9PB operates in series with relay 9PA, which connects sensitive polar relay 9PT to lead TR. If ground is connected to lead TR, relay 9PT operates. After approximately 20 ms., relay 10P2 operates, causing ground to be returned to the subsequent equipment over lead SB to indicate that the coin has been deposited. The operation of relay 10P2 also prepares relay 9A for the receipt of dial pulses.

The 20 ms. delay prevents registration of a momentary operation of the polar relay due to the discharge of ringers, or the discharge of line capacitance. The delay is accomplished by means of relay 9PC which produces a 20 ms. delay in restoration.

If the paystation subscriber had failed to deposit a coin, relay 9PT does not operate and relay 10P1 operates, instead of relay 10P2, after the 20 ms. delay, thereby causing relay 9DT to re-operate. Therefore, dial tone is re-connected to the line. On the next off-hook indication, relay 9PC re-operates and causes relay 10P1 to restore. This coin-test operation is repeated upon the receipt of each on-hook signal until either the coin is finally detected or the succeeding equipment causes the register junctor to release after a time-out period of approximately 35 seconds by the removal of ground from lead H to restore the hold relay 10H1.

The dial pulses are repeated by the register junctor to the common equipment as ground pulses over lead P under control of relay 9A.

If the call originates from a party line, ground being connected through a three thousand ohm register from the shunt springs of the dial, indicates that the call originates from party number 2 of that particular party line. Absence of ground indicates that the call originates from party number 1 of that particular line. Party identification is made in the same manner as the coin-deposit test, with the exception that relay 10CB is not operated. Relay 10P2 indicates to the succeeding equipment which party has originated the call.

After the sender has been coupled to the register junctor, three types of indications of the call progress may be sent from the sender to the register junctor: end of send, line busy, and trunk busy.

The end of send indication is transmitted upon the successful completion of the call. The junctor immediately returns a release signal to the sender and transmits a signal to the preceding equipment that the call has been successfully completed. This operation is accomplished upon the receipt of ground via lead ESV, causing relay 10ES to operate and to return ground over lead ESV for the release of the sender in the common equipment. Operation of relay 10ES also connects ground to lead ECR to signal the originating circuit. The junctor will continue holding the switch train for an additional 100 ms. to assure that the succeeding circuits have taken over control of the switch train.

The line busy indication is similarly performed with a few additional operations. Line busy indication is provided when −50 v. is received from the sender on lead BYV causing relay 10BY to operate. Thereupon relay 10LB operates and causes −50 v. to be repeated by lead BY to the preceding equipment.

The trunk busy indication is provided from the sender during all calls which cannot be successfully completed, other than the actual line busy condition. Ground is received from the sender via lead BYV, causing relay 10BY to operate only its make contacts and to transmit ground, instead of −50 v., to the preceding equipment via lead BY. Consequently the preceding equipment is able to distinguish the line busy indication from the trunk busy indication. As a result the register junctor signals the sender to release, repeats the trunk busy indication to the originating equipment, and then returns to idle.

If a call originates from a paystation, the sender is signalled to release, but the trunk busy indication is withheld from the originating equipment until the coin has been refunded. Operation of relay 10BY causes relay 9TR1 to operate and, when relay 10H1 releases in response to the removal of ground from lead H by the succeeding equipment, relay 9CT operates via its number one winding. Relay 10CB also releases in response to the operation of relay 9TR1. Operation of relay 9CT connects relay 9CF to the 120 i.p.m. impulses, thereby causing relay 9CF to follow the 120 i.p.m. and to cause relays 9CFA and 9CFB to operate and restore in a four state sequence.

During the first state, relay 9CFA is operated and relay 9CFB is restored. This condition allows −110 v. from lead CRB to be connected to lead TR, thereby enabling the coin-box to refund the coin.

During the next state relay 9CFB operates in series with relay 9CFA, maintaining the −110 v. on the line. The third state occurs when relay 9CF re-operates and relay 9CFA releases. If the coin has been successfully refunded, ground is removed from lead TR which causes the second winding of relay 9CT to be open-circuited. At the same time the first winding of relay 9CT becomes short-circuited, which allows relay 9CT to release.

However, if the coin had not been refunded due to the improper operation of the coin-return mechanism in the paystation, ground on lead TR holds relay 9CT operated. Then relay 9CFB restores, which creates the last state in the sequence, and −110 v. is removed from the line in order to re-transmit refund current on the next cycle. An impulse is needed for the operation of the coin-return release mechanism rather than steady current flow. The four-state cycle is then repeated until the coin is successfully refunded.

If the coin is not refunded within approximately five seconds, relay 10H1 is re-operated opening the circuit to the second winding of relay 9CT which eventually restores to normal. If the coin is successfully refunded, relay 9CT restores which causes the remainder of the relays in the register junctor to restore with the exception of relays 10H1 and 10BY. When relay 9TR1 restores, ground is transmitted via line BY to the preceding equipment. Thereupon, relays 10H1 and 10BY are eventually released by the succeeding equipment.

The trunk busy condition is also generated by the register junctor when the common equipment signals the register junctor to disconnect prior to the end of send indication from the sender. Relay 10H1 releases, thereby connecting ground to lead BYV. The remainder of the operation is performed as described above.

3b. INCOMING REGISTER JUNCTOR

Referring now to FIG. 11, the incoming register junctor is similar to the local register junctor with the following exceptions: dial tone control, coin control, and party identification apparatus have been omitted and optional provisions have been made for operation with MF receiver 110. The incoming register junctor in FIG. 11 is equipped to handle both multi-frequency and dial pulse calls.

When the register junctor is seized during a multi-frequency call, relay 11H1 operates and causes relay 11KPT to operate. The operation of relay 11KPT prepares a path to relay 11KP which operates when the KP signal, start signal, is received from the succeeding equipment via lead KP. When relay KP operates, the circuit to relay 11KPT is opened, and it restores after a 55 ms. delay which removes ground from lead IGO. Removal of ground from lead IGO allows the information to be transmitted to the succeeding equipment.

After all of the multi-frequency signals are received, ground is removed from lead KP and relay 11KP restore.

If an error in the multi-frequency code is present, ground on lead ERR operates relay 11RO after a 12 ms. delay, thereby causing relay 11BY to operate. Therefore ground is connected to lead BY indicating a trunk busy condition. Consequently an error that persists for approximately 12 ms. causes trunk busy indication to be transmitted by the register junctor to the incoming trunk. The incoming register junctor is then released.

(4) Register junctor buffer and lead multiplexer

Referring now to FIG. 12, the register junctor buffer and lead multiplexer provides means for a two-way transfer of information between all reed relays, space divided register junctors and electronic time divided register sender components. The circuit is provided per register junctor, either local or incoming. Since information is transferred from the fast-acting electronic equipment to the more slowly operated relay-controlled register junctors, the information is stored in flip-flops H, GO, CB, or KP before the register junctor relays are to operate, thereby allowing sufficient time for the relays to operate. All of the 24 sets of flip-flops respond to the commands on a time division multiplex basis from the single group of logic gates, logic 1301-1305 and 1308 in FIG. 13. Flip-flop H transmits ground via lead H to the register junctor to hold the register junctor. Flip-flop GO transmits ground via lead GO to the register junctor, indicating that the succeeding equipment is prepared to receive information from the register junctor. Flip-flop CB transmits ground via lead CB to the register junctor to indicate that the call was originated from a paystation. These three flip-flops are provided as buffer flip-flops for each local register junctor.

When this arrangement is associated with an incoming register junctor, flip-flop KP is substituted for flip-flop CB in order to provide the KP signal to the MF equipment associated with the incoming register junctors, preparing the equipment to receive the multi-frequency signals.

Information that is transferred from the register junctor to the electronic equipment is converted on a time division multiplex basis. The information from the first junctor is gated to the succeeding equipment by logic 1201. Lead P transfers the dialed information and is referred to as the pulse highway. Lead DC provides information to the succeeding equipment, indicating that the register junctor has returned to the idle condition. Lead SB, when connected to a local register junctor, provides information to the succeeding equipment, indicating which one of the parties of the two-way party line originated the call. Party one produces a true indication and party two produces a false indication. When a call is originated from a paystation, lead SB also indicates whether or not the subscriber has deposited a coin. A true indication represents that the coin has not been detected as yet, and a false indication represents that the coin has been deposited. When lead SB is connected to an incoming register junctor, information is transferred to the succeeding equipment, indicating whether or not MF equipment is utilized. The utilization of MF equipment produces a false indication and the absence of MF equipment produces a true indication.

(5) Register receiver

The register receiver in FIG. 13 provides a means to receive line or trunk number identification from the line or trunk markers. This equipment consists of a diphase receiver, a shift register, and the associated control logic and flip-flops.

The markers seize a register junctor which causes the register junctor to request the register receiver by providing a true indication from OR gate 130 to logic 1306. If the register receiver is idle, it sequences to the busy state by means of logic 1307 which sets flip-flop BU. Thereupon, a "go" command is extended to the proper register junctor by means of logic 1308 to set the GO flip-flop in the register junctor buffffer and lead multiplexer. This command causes the register junctor to send a signal to the LNI sender of the marker to start transmission to the diphase receiver in the register receiver.

The shift register, which comprises flip-flops SU2, SL, BC1-4, BD1-4, BE1-4, BF1-4, BG1-4, BH1-4, BI1-4, and PR2 that are interconnected to form a serial shift-register, is coupled to diphase receiver 139. Bits of information which are received in the diphase receiver are transferred serially into the shift register.

Upon receipt of the entire portion of information into the shift register, flip-flop PR2 is set causing logic 1309 to set flip-flop CP. With flip-flop PR2 being set, the register junctor signals the LNI sender of the marker to stop transmission. Furthermore, flip-flop PR2 causes logic 1310 to move the diphase receiver out of the receive mode. The LNI information being stored in the shift register is then parallel-transferred to the register controller for storage in the proper ferrite core memory row. The register receiver returns to idle and resets the GO flip-flop. The register receiver is then prepared to service another call.

(6) Register controller

The register controller in FIG. 14 comprises timing logic, information transfer logic, and decision control logic to arrange information from various parts of the system for presentation to the ferrite-core memory. These logic commands are generated entirely by electronic gates being utilized on a time division multiplex basis by the system.

This equipment in association with the read shift buffer arranges the dialed digits to be written into the memory. As many as thirteen dialed digits are capable of being arranged for presentation to the memory. These digits being transmitted to the register controller are in the form of either dial pulse, multi-frequency signalling, or code-pulse.

A maximum of seven digits of line or trunk number identification are also arranged for presentment. Two digits of originating class of service information are accumulated in connection thereto. Provision is also made for a maximum of nine digits of translated switching information with three digits of sender control instructions and four process digits for presentation to the memory. The sequence of operation of the registers for the process of a call is based upon these four digits of processing instructions, which are transmitted between the register sender and the translator.

If a call is originated locally and requires ticketing, the calling party's directory number is received from the translator. If a call originates from a tributary office for which ticketing is necessary, the calling party's directory number is forwarded from the tributary office by means of multi-frequency signals and later transferred to the ticketer. In both cases this information is prepared by the register controller for presentment. There are also three digits of ticketer identity information as well as one digit of alternate route instructions. The address of a sender having been assigned is also accumulated for presentation to the memory.

The above-mentioned logic transfers information from various portions of the system to the memory. However, the register controller also generates new commands which are also presented to the memory; i.e., timing control logic and decision control logic. The operation of each component is timed and a time-out signal is generated when a component remains in operation for an undesirable period of time. The timing control logic also analyzes the information received via the pulse highway.

The decision control logic comprises several groups of binary counter logic to provide sequence states for the sequential operation of the register sender group. The register sequence (RX), sender-outpulsing sequence (SX), sender-seizure sequence (QX), and register-disconnect sequence (VX) are generated by these counters. There are also sequence states for the transfer of dialed digits from row three of the memory to row four of the memory. The decision control logic further comprises several miscellaneous commands as follows: trouble indications from the senders, common control logic, and the register junctors; an internal translation, which is necessary for a reverting call or for a call to the CKO operator; information indicating that the identity of the group selector has been recognized, which is part of the ticketer-identity information; busy condition of the register receiver; request of service and busy condition of the register transceiver; request of service of the sender; trouble recorder information; disconnect of the sender; disconnect of the register; pulse highway information; recognition of MF interdigital pause; completion of dialing; coin-box call; early outpulse control; and trouble indications for the routiner.

Referring now to FIG. 14, information is transferred to the ten groups of logic which form ten positions, A–J, for presentation to the memory. Each of the groups of logic are divided into four sub-groups to generate four bits of information. For example, position A comprises four write commands, WA1–4, which are written into the ferrite core memory.

Since the register controller entirely utilizes logic gates, the ten positions are transferred on a time division multiplex basis to the memory, forming one memory row. The forty bits of information are transferred to the colums of the ferrite core array during each sub-time slot. Therefore, one memory row at a time is simultaneously written into the memory during a time slot. One register utilizes six rows, and one register sender group utilizes 24 registers. During a register's time slot, the first row of each register is enabled twice, once during the first sub-time slot of the register and once during the seventh sub-time slot of that particular register.

Each position being generated by the register controller has one or more groups of logic to decide whether or not information ought to be transferred from other portions of the system. Position A, for example, comprises five groups of decision control logic, logic 1400-04. There are also three groups of decision control logic, logic 1466–68, to provide miscellaneous signals to positions B–J.

(7) Write transfer

Referring now to FIG. 15, write transfer 1500 allows the forty bits of information from the register controller to be transferred to the write control. During normal operation the forty bits of information that are formed in the register controller pass though the write transfer without being altered in any way. It comprises gating logic to inhibit the flow of information for maintenance purposes, thereby allowing insertion of information into the ferrite core memory from the control center, register routiner, or the read shift buffer. The read shift buffer causes the information to be rewritten into the memory without being altered.

For purposes of maintenance one of the 24 registers is selected, and the forty write commands for one or all seven rows in that particular register are inhibited. The inhibited rows of that register then become static. Special information can then be written into the memory from external sources, for example the control center. This information is written during one register sender cycle.

(8) *Memory write control, ferrite core array, and memory read control*

Referring now to FIG. 15, the memory write control and the memory read control provide proper current pulses needed to transfer information to and from the cores of the ferrite core array. The write commands being generated by the register controller are sequentially accessed. The constant current generator and amplifier 1547 supply a fixed amount of current to the write drivers 1541A–1546A during the control pulse TX6 of each sub-time slot. The six write drivers are enabled during the sub-time slots TY1–7 respectively with write driver 1541A being enabled twice, during TY1 and TY7. The enabled write drivers pass current through the strobe circuit 1549. This current then passes through the memory cores and terminates in the word switches 1551–74 which are enabled during each time slot TX1–24. A row in the memory through which this current passes is determined by the proper selection of a word switch and a write driver.

When a binary one is written into the memory, the appropriate write driver, in coincidence with the appropriate word switch, determines the time slot and sub-time slot, thereby defining a register and a row in that particular register. The binary one is then written into the appropriate core during control pulse TX6 by means of the write command from the register controller.

The memory read control provides a source of constant current to read drivers 1541B–46B from current generator and amplifier 1548 during control pulse TX2 of each sub-time slot. The read current flows into strobe circuit 1549 causing the strobe cores in the strobe circuit to switch. The strobe ferrite cores cause a correct polarity pulse, after amplification, to act as a gate pulse for the sense amplifiers 1501B–40B. This strobe circuit thereby causes the information stored in a ferrite memory core to be accurately read from the memory. Stored information is therefore distinguished from a random noise voltage.

Whenever a binary one is stored in a ferrite core, a signal is sent to the sense amplifiers from the memory core during control pulse TX2 of one of the read drivers sub-time slots, TY1–7, thereby amplifying this signal and providing an output in coincidence with the strobe circuit pulse. This output sets the flip-flops in the read shift buffer.

The ferrite core memory array provides temporary storage for the register sender and is sequentially accessed and time slot oriented. Each register is assigned six rows of ferrite cores, each row comprising 40 cores. Each register is accessed during each time slot. Each row is accessed by sub-time slots TY1–7. The first row of each register is accessed during TY1 and TY7 of each time slot. The information contained in row one is selectively modified during TY7 and is rewritten during TY1, as modified, when that register's time slot next appears. This procedure allows the remaining five rows to collect information that ultimately will affect the storage of information in row one, because the information in row one mainly comprises request of service indications for register sender components, the translator, and other similar indications.

The total number of cores per register is 240. There are 24 registers to store information for 24 separate subscribers. There is an additional six rows of storage for maintenance by the register-sender routiner. Therefore the total number of ferrite cores in the ferrite core memory array is 6,000.

A position consists of four bits of information and therefore each row comprises ten positions of information. In row 1, position A provides storage for information from three counters: awaiting line-loop timer, line-loop timer, and the down check timer.

In position B the first two bits store counting information to control the counters in position A of row one. Bit 3 of position B stores the request for the register transceiver to send information to the translator. Bit 4 of position B stores the subscriber's line-loop indication, the P highway.

Position C stores the totals digit which is one of the four processing digits to be transmitted to the translator.

Position D, bits 1 and 2, store information from a counter to provide the disconnect sequence control VX. Bit 3 stores the multi-frequency interdigital pause. Bit 4 controls the sender out-pulse sequence states for early out-pulse.

In position E, bit 1 information is stored to indicate that this register is using the register transceiver. Bit 2 stores information to request the sender. Bit 3 indicates that this register is now using the register receiver. Bit 4 stores the disconnect register indication.

In position F, bit 1 stores the register equipment trouble indication. Bit 2 indicates that trouble has developed in either the sender assigner or the sender. Bit 3 is the register junctor trouble indication. Bit 4 is the finished dialing indication.

In position G, bits 1 and 2 comprise the register sequence states RX. Bit 3 indicates that a coinbox call is in progress. Bit 4 indicates that this register is using the control center.

Position H is the instruction digit which is one of the four processing digits.

In position I, bits 1-3 comprise the drum address digit which is one of the four processing digits. Bit 4 is the code translation indication which is used in conjunction with the four processing digits being sent to the translator.

In position J, bits 1 and 2 comprises an internal translation which is necessary for a reverting call or for a call to the CKO operator. Bits 3 and 4 comprise the sequence states for the transfer of dial digits from row 3 to row 4.

In row 2, position A stores information from a counter which times the sender. In position B, bits 1 and 2 comprise a counter for the control of the counter in row 2 of position A. Bit 3 is the disconnect sender indication. The sender-outpulsing sequence states comprise a five stage counter utilizing bit 4 of position B and all of position C.

In position D, bits 1-3 comprise the sender-seizure sequence QX. Bit 4 is an indication that the information has been stored in position B of memory row 3 which is the GR digit, a portion of the ticketer identity information received from the group selector marker.

The alternate route digit from the group selector marker is stored in position E for modification of the skip digit, position I of row two, and the mode of send digit, position G of row two. Position F indicates the sender address.

Position D is the mode of send information which is one of the three digits of instruction for the sender received from the translator.

In position H, bits 1-3 comprise the end of send control being one of the three sender instruction digits. Bit 4 of position H is the ticketing digit which indicates that ticketing is required.

The third digit of sender instruction, the skip digit, is stored in position I.

In position J trouble analysis information is stored for the control center.

In row 3 position A comprises a counter for the dial digit accumulator to store a dialed digit in binary code.

In position B information is stored indicating that the identity of the group selector has been recognized, which is part of the ticketer-identity information from the group selector marker. This indication is previously referred to as the GR digit.

Positions C-I store dialed digits. After a dialed digit is accumulated by the counters in position A, it is shifted in binary form to position C upon the next cycle of the registers. Thereafter the digits are shifted serially upon each cycle until all the dialed digits are stored in positions C-I.

If the dialed digits arrive in the register sender in the form of multi-frequency signals, then the decoded signals directly enter position C rather than being accumulated and coded at position A.

Position J is the tens digit which is part of the ticketer-identity information from the group selector marker.

In row 4, position A is another counter to accumulate dial digits in exactly the same manner as the counter in position A of row 3.

In position B, bits 1-3 comprise the delete digit which is one of the four processing digits for the translator. Bit 4 is the early out-pulse indication, which is an indication for the translator that early out-pulsing is required.

Positions C-I store dial digits in exactly the same manner as positions C-I in row 3. The first seven dialed digits that are written into the memory are stored in positions C-I of row 4. The remaining dial digits to be written into the memory are stored in positions C-I of row 3.

Position J stores the units digit, which is part of the ticketer-identity information from the group selector marker.

In row 5, position A stores information from a counter to time the receipt of information being received from the register receiver for row 5 of the memory.

Position B stores one digit of the calling party's class of service information.

Positions C-I store the LNI and TNI information being received in parallel form via the register controller. These positions also store the calling party's directory number. If the call is from a local subscriber, the line number identification is transferred to the translator. The calling party's directory number is then received from the translator after translation of the LNI and written into these same positions in the memory. If the calling party is not a local subscriber, the calling party's directory number is received from the tributary office and shifted serially into positions C-I of row 5, entering at position C.

Position J stores further information regarding the calling party's class of service.

In row 6, position A stores information from a counter to time the register transceiver, which transfers information from the translator for storage in positions B-J of row 6.

Positions B-J store switching information received from the translator.

*(9) Read shift buffer*

Referring now to FIG. 16, the read shift buffer provides a temporary storage for information which is read from the ferrite core memory, and directs the arrangement of dialed digits for storage in the memory. This buffer arrangement consists of read shift control, empty indication, and miscellaneous logic 1601-03, read shift flip-flops, decoder logic 1604-11, reverting-call comparison logic 1612, and carry buffer control logic 1613. The read buffer, which comprises flip-flops PA1-4, PB1-4, PC1-4, PD1-4, PE1-4, PF1-4, PG1-4, PH1-4, PI1-4, and PJ1-4, receives information in a parallel manner during the read control pulse TX2 from the read control. The system logic then makes use of the information from the read buffer flip-flops. When the read shift buffer is used to direct the arrangement of dialed digits, it receives information during the read interval. The dialed digits are shifted serially from one position to the next succeeding position in a shift-register manner during the shift interval, and finally are placed back into the ferrite core memory during the write control pulse TX6. Read shift control 1601 directs this operation.

Decoder logic 1604–11 converts information from binary to decimal for various groups of bits from the read buffer flip-flops. The reverting call comparison logic 1612 performs a reverting-call test. The comparison is made between the line number identification of the calling subscriber which is stored in the memory row TY5, and the translated switching information which are returned from a directory number translation. Should the reverting-call coincidence occur, this logic informs the register controller to modify the translated switching instructions and part of the sender instructions so that the call will route to the reverting-call trunk.

Carry buffer control logic 1613 controls the carry buffer flip-flops. These commands are generated as a result of the information received from the ferrite core memory and other portions of the register sender.

(10) Carry buffer

Referring now to FIG. 16, the carry buffer provides a means for transferring information from one memory row to another memory row, and for entering the multi-frequency digits into the ferrite-core memory array. The carry buffer comprises the carry flip-flops 160, the decoder logic 1613–15, the long-count counter LC1 and 2, and the multi-frequency digit entry flip-flops MF1, 2, 4, and 8.

The fact that the registers each comprise several memory rows lends to the problem of passing information between memory rows of the same register. Information that a translation is possible is determined by the type and number of digits in storage which exists in memory row four. This information must be passed to memory row one during TY7, which initiates the action required for translation. The same problem is encountered when information must be transferred from one memory row to another memory row. The method of solving this problem is the use of a buffer storage, the carry flip-flops. Information contained in row 1 of the memory may be placed in the carry flip-flops during the first sub-time slot of a register, thus making that information available to any other row. Since the first memory row is enabled twice, during the first sub-time slot and the last sub-time slot, any of the other rows in the register may also pass information to row 1 by means of the carry register.

The carry buffer consists of 37 bits of buffer storage, comprising flip-flops AC, CB, CE, CT, CX1, CX2, DD, DR, DS, EP, FD, FM, FP, FT, HE, HS, KE, KM, LX1, LX2, PP, RA, RC, RP, RQ, RT, ST, TA, TB, TD, TL1, TL2, TL4, TL8, TS, TR, and TN. The DC settings of these flip-flops are located in the carry control logic 1613 of the read shift buffer.

Flip-flop AC is a command to advance the count of the dial digit storage, the accumulator, of row 3 or row 4. The information to add is obtained in row 1 from analysis of the pulse highway. Flip-flop CB indicates that a coin-box call is in progress. Flip-flop CE indicates that the register should be cleared, which means that the stored information in a register must be erased. This information is placed in the carry register during the registers first sub-time slot whenever the register is returning to the idle condition from the disconnect states. It is also used to erase any false information that may arise in any row whenever the register is in the idle sequence state.

Flip-flop CT indicates that a code translation is in progress. Flip-flops CX1–2 provide sequence control for the transfer of dial digits from row 4 to row 3. Flip-flop DD indicates that row 3 or row 4 contain at least one dialed digit. Flip-flop DR is the disconnect register indication. Flip-flop DS is the disconnect sender indication. Flip-flop ES is the early outpulsing of dial digits indication. Flip-flop FD indicates that dialing is finished. Flip-flop FM is the multi-frequency interdigital pause indication. Flip-flop FP is an indication of an interdigital pause during dialing, stating that the count of a dialed digit in rows 3 and 4 is complete. The information of the interdigital pause is obtained in row 1 from the analysis of the pulse highway.

Flip-flop FT signifies a fast time-out. This function being true reduces the normal 20 second time-out period to 4 seconds. If the subscriber has dialed an operator, the normal time-out is reduced to 4 seconds. The other case, where a fast time-out is required, is in timing of the downcheck lead from the local register junctor.

Flip-flop HE indicates that time-out translation of one digit is in progress. Flip-flop HS indicates that the sender's instructions are in storage. Flip-flop KE indicates that this register is using the register transceiver. Flip-flop KM indicates that this register is using the register receiver. Flip-flops LX1–2 comprise the internal translation control. Flip-flop PP is the subscriber's line loop indicator. Flip-flop RE indicates that this register is connected to the control console. Flip-flop RC indicates that a time-out translation of two digits is in progress. Flip-flop RQ indicates a request for the sender. Flip-flop RT is the request for the register transceiver. Flip-flop ST is the multi-frequency end-of-send recognition. Flip-flop TA is the initiate ticketing access indication. Flip-flop TB indicates that a call is in progress and will be ticketed. Flip-flop TD is the dial digit time-out indication. Flip-flop TL1, 2, 4, and 8 comprise the four bits of the totals digit. Flip-flop TS indicates that trouble is present in the sender transmitter or the sender assignor. Flip-flop TR indicates that trouble is present in the register common control equipment. Flip-flop TN indicates that a 1A1 code has been dialed.

The majority of these flip-flops re-write the information into the memory as received from the read shift buffer. However, flip-flops AC, CE, DD, FP, FT, HE, HS, RC, RP, ST, TA, TD, and TN are added to store the necessary additional information which is provided by the carry buffer.

The decoder logic 1613–15 is that portion of logic which is used to convert information from binary to decimal for various groups of bits in the carry flip-flops. The long-count counter comprising flip-flops LC1–2 provide two slow rates of counting. They can provide the counter with repetition rates of 300 milliseconds and 1.2 milliseconds for the mode of count as stored in position A of row 1 and row 2 in the memory. The DC settings of LC1 and LC2 are connected to astable-multivibrators AS1 and AS2 respectively, AS1 having a repetition rate of 300 milliseconds and AS2 having a repetition rate of 1.2 milliseconds.

The multi-frequency entry flip-flops MF1, 2, 4, and 8 provide a means for placing the multi-frequency digits into the ferrite core array when information is received in the multi-frequency receiver.

(11) Register transceiver

Referring now to FIG. 17, the register transceiver provides a means for communicating between the register sender and the translator or the ticketer. Serial transfer is used employing diphase transmission techniques. Information transferred between this component and the read shift buffer or the register controller is accomplished in a parallel manner. The register transceiver operates on a hold til finished basis. Seizure of this circuit depends upon control signals developed in the register controller.

The register transceiver comprises shift register 170, diphase sender-receiver 171, control flip-flops 172, address flip-flops AD1–3, and instruction flip-flops IN1, 2, 4, and 8. The information from the memory is transmitted to control input and output logic 1705 of the shift register to load the shift register in a parallel manner. This information is then transferred from the shift-register flip-flops and transmitted in serial form to the translator for translation to the called party's directory number. Both code translation and directory number translation may be performed. The translated information is received by the diphase receiver and serially shifted into the same shift register. This information is then read out of the shift register in a parallel manner for presentation to the register controller.

The register transceiver also takes the line number identification from the memory and transmits it to the translator in the same manner as described above for a line number translation.

The register transceiver also transmits the necessary ticketer information to the ticketer. This information includes the area code, the office number, the station number of the called subscriber, and the directory number of the calling subscriber.

Flip-flops IN1, 2, 4, and 8 are four binary weighted flip-flops used to store the instruction digit from the memory, which is one of the four processing digits for the translator. Flip-flops AD1, 2, and 4 are three binary weighted flip-flops used to store the address digit of the processing digits for the translator for which service is requested.

There are seven control flip-flops: BU1, CP1, LD, RF, RV, SE, and ST. Flip-flop BU1 indicates that the register transceiver is busy. Flip-flop CP1 indicates that the translator transceiver has completed its task. Flip-flop LD indicates that the shift register has been loaded. Flip-flop RF indicates that the receive operation is finished. Flip-flop RV indicates that the register transceiver is in the receive mode. Flip-flop SE indicates that the register transceiver is in the send mode. Finally, the flip-flop ST indicates that serial transmission may now be sent.

When the register transceiver is called upon to transmit information from the register sender, flip-flop BU is set in response to logic 1700. Thereupon the address flip-flops are set in response to logic 1703, thereby indicating which drum will receive the information. Simultaneously, the instruction flip-flops are set to indicate the method by which the shift register will be loaded.

Once this preliminary information is stored, flip-flop SE is set during the coincidence of sub-time slot TY7 and the control pulse TX6. During the same sub-time slot flip-flop LD is set during control pulse TX7, which indicates that the shift register is loaded. When one of the TT1–7 commands is received from a translator or a ticketer to indicate to the register transceiver that information can now be sent, this signal sets the ST flip-flop, thereby causing diphase transmission to the appropriate translator or ticketer. The shift register serially transfers the information to the diphase sender, which in turn transfers the information to the translator or ticketer in high-speed serial binary form.

When the shift register has transferred all of its information, the input and output logic 1705 indicates that the shift register is empty and causes flip-flop SE to reset. Flip-flop RV is simultaneously set to indicate that the register transceiver is now in the receive mode. When information is ready to be transmitted to the register transceiver, the shift register receives the information from the diphase receiver in a serial manner. When all of the information is finally received and stored in the shift register, flip-flop PR1 of the shift register is set. The input output logic 1705 thereby causes logic 1700 to set flip-flop RF, indicating that all of the information is received.

When the time slot of the particular register which is being served by the register transceiver next appears, flip-flop CP1 is set in response to the KE bit of information stored in row 1, bit 1 of position E, which indicates that the register is the one which is being served by the register transceiver. Thereupon the shift register is unloaded in a parallel manner and transmitted to the register controller for storage in the ferrite-core memory.

(12) Sender assigner

Referring now to FIG. 18, the sender assigner provides the selection control to establish a connection from a register junctor to an idle sender. It couples any one of 24 register junctors to any one of the 10 senders.

The sender assigner comprises a ten-step counter, comprising flip-flops AS1, 2, 4, and 8. This counter sequentially scans the idle test leads from the associated senders. The scanning process is continued as long as the sender assigner is not busy and an idle sender is not available. As soon as an idle sender is found, the counter stops. This count represents the identity of the idle sender that will be attached to the next register junctor requesting service.

This sender identity marks the corresponding sender pull lead of the register sender matrix by means of one of the ten reed relay drivers in response to logic 1800. The time slot of the register junctor which is demanding the service similarly marks the register pull lead PR with a battery indication. Flip-flops RG1–24 in response to logic 1802 cause the appropriate reed relay driver to connect ground to the corresponding register pull lead. Thus these two marks cause the appropriate reed relay in the register sender matrix to operate, thereby establishing a connection between the register junctor and the idle sender.

Once the connection has been established, flip-flop BY is reset, thereby allowing the ten-step counter to start the scanning process again. Once a sender has been assigned to the register junctor, the idle test lead of the sender should become busy within 20 milliseconds. Otherwise, the sender assigner will signal the register controller that trouble has occurred in the register sender matrix or in the sender, and a disconnect cycle starts. If the sender idle test lead was marked busy within the allotted 20 milliseconds, there is no indication of trouble and the release of the sender assigner follows. However, before the sender assigner is released, the identity of the attached sender is forwarded to the register controller for storage.

(13) Register sender matrix

Referring now to FIG. 19, the register sender matrix provides a switching stage between the register junctors and the senders. The register sender matrix is a single stage matrix capable of connecting any one of twenty four registers to any one of ten senders. The crosspoint reed relay has two windings, operate and hold, and six make contacts. The leads switched by the contacts are: two transmission loop leads, T and R, the crosspoint hold lead C, the group selection call signal lead EC, the end of send signalling lead ES, and the busy signalling lead BY. The PR lead controls the operation of the reed relays.

(14) Sender controller

Referring now to FIG. 20, the sender controller provides the gating control needed for proper transfer to the sender transmitters of the translated switching digits, dialed digits, and one of the following: LNI, TNI, or the directory number of the calling subscriber. It also controls the sending mode used to outpulse these digits. Gating control is also provided for the return of alternate route instructions and ticketer identity. By means of SD gating logic 2006, in conjunction with the buffer storage of the particular sender sequence state SX, the sender controller presents to the sender the digits to be outpulsed. Either one or two digits at a time are forwarded to the senders. When the digits furnished are to be outpulsed in a multi-frequency mode, the start and end of send digits are generated and also forwarded by means of logic 2005. Through the use of these buffer flip-flops and decoding logic 2003, the sender controller informs the sender, that is associated with the register being served, to accept the digits being presented by the sender controller.

When outpulsing is necessary the sender controller also controls the mode of send of the senders by means of control logic 2004. Commands to send in a dial-pulse or multi-frequency mode, end of send, and sender release control signals are forwarded at the appropriate time due to logic 2005.

The sender address is buffered by the SN address flip-flops 201. The sender controller further provides gating control for the entry of the alternate route digit and the ticketer identity digits received from the sender by means of AR and TI logic 2007 and the AR and TI storage 202. These digits are forwarded to the register controller for storage and interpretation.

(15) Multi-frequency and dial pulse generator

Referring now to FIG. 20, the MF and DP generator provides pulses required by the senders for out-pulsing and multi-frequency and dial pulse modes of sending. This circuit consists of two generators, one providing pulses for dial pulse sending and the other for MF sending. The generators are identical except they are wired for different settings of speed and percent make.

Each generator comprises a four bit, sixteen count binary counter, which is driven by pulses reoccurring each ten milliseconds from the time division generator.

The flip-flops which provide MF and DP pulses are set at the beginning of each cycle. The reset of these flip-flops is controlled by the time division generator to allow the output of the flip-flops to be separated in increments of approximately one millisecond.

(16) Time division generator

Referring now to FIG. 13, the time division generator provides the register time slot pulses TZ1–25, sub-time slot pulses TY1–8, and control pulses TX1–8 so that the common equipment can operate in a time division mode. The time division generator comprises 125-kc. clock 139, gating logic 1300, and the three ring counters TX, TY, and TZ.

The 125-kc. clock is a free running astable multivibrator producing two pulse trains, A00 and B00, of eight microsecond periods with one microsecond pulse width. Pulse train B00 is delayed from pulse train A00 by four microseconds.

The three ring counters are connected in tandem and use pulse trains A00 and B00 as timing pulses to generate the register time slot pulses, sub-time slot pulses, and control pulses. Each register time slot pulse TZ1–25 is a unique time slot for each register and is four hundred microseconds in duration. There are seven sub-time slot pulses TY1–8 in a register time slot. Each of the seven sub-time slot pulses is associated with a memory row and the pulse duration is fifty-seven microseconds. The sub-time slot pulse is further divided into seven control pulses TX1–7. These control pulses are used to generate commands and perform logic for each memory row and are of eight microsecond duration.

The sub-time slot pulses, the control pulses, and the pulse trains, A00 and B00, are also combined by coincidence gates to form single commands for use throughout the register sender. For example, the coincidence of B00, TY7, and TY6 form the single command B76.

B. OPERATION

(1) Local call

Assume now that one of the local subscribers initiates a call to another local subscriber. Upon removal of the handset by the calling subscriber the line marker 200 identifies the line and searches for an idle register junctor. After finding an idle register junctor, such as local register junctor 601, the line marker determines if a path can be established from the calling line to that register junctor. Assuming that this is so, the line marker extends a call signal from the LNI sender 283 in the form of negative battery potential through a relay winding to lead BY and thence to the register junctor 601. In the register junctor, relay 10GO operates over its upper winding, and at its contacts GO–1 ground is extended on lead EC to the buffer-multiplexer 631. This signal is an input to logic 1201 which is individual to the register junctor 601. During the time slot of the associated register an output signal on lead MAL through OR gate 130 and logic 1306 sets the flip-flop EC. If the register receiver is idle, it sequences to the busy state by means of logic 1307 which sets flip-flop BU. Thereupon a go command is extended to the proper register junctor by means of logic 1303 and gated pulse amplifier 133 to lead SGO, thence through logic 1202 to set the flip-flop 1GO in the register junctor buffer and lead multiplexer. The shift register is reset by a signal from gated pulse amplifier 137. Also the "have register receiver" condition KM is written in the memory in row 1, position E, bit 3. The timer in row 5, position A is started to time the receipt of the LNI information in the shift register of the register receiver 630. The register sequence state RX is advanced from idle to receiving LNI. Relay driver 121 operates, placing ground on lead GO to the register junctor. In the register junctor this ground on lead GO holds the relay 10GO operated. This additional path to ground through the lower winding of relay 10GO reduces the resistance to ground on lead BY, which in the LNI sender 283 causes a relay to operate to connect the diphase sender to the TR and RR leads. The diphase signals are transmitted via leads TR and RR in the register junctor to the leads TDM and RDM to the diphase receiver 139 of the register receiver, and into its shift register. This information includes the calling party's equipment location number and class of service. Upon receipt of the entire portion of the information into the shift register, flip-flop PR2 is set causing logic 1309 to set flip-flop CP2. The KM condition is erased from the memory. Flip-flop PR2 causes logic 1310 to move the diphase receiver out of the receive mode. The output of flip-flop CP2, through logic 1308, gated pulse amplifier 134 to lead RGD, and logic 1202 resets flip-flop 1GO; and at the same time through logic 1301 and gated pulse amplifier 131 to lead SHD and through logic 1202 sets flip-flop 1H. Thus the relay driver 120 operates, and relay driver 121 restores. In the register junctor, the removal of ground from lead GO signals the LNI sender of the marker to stop transmission. Relay 10GO restores. Ground on lead H operates relay 10H1, which causes the operation of relays 10H2, 10H3 and 10H4. Negative 8 volt potential is applied to lead ITJ to mark the register junctor busy. Relay 9A is connected to leads PR and RR and operates over the subscriber's loop. Relay 9DT operates over its upper winding and locks over its lower winding. Dial tone from source DT is connected through contacts DT–3 and the lower winding of relay 9A to the tip conductor TR. Relay 9A at its contacts A–4 sends ground to logic 1201 to record in memory row 1, position B, bit 4 that the subscriber is connected to the P highway. The LNI information is transferred in parallel from the shift register into row 5 of the memory, and upon completion thereof the ANI timer counter in row 5, position A, is turned off. The register sequence state RX advances to dialing.

When the subscriber starts dialing, at the first interruption of the line loop relay 9DT restores to remove dial tone from the line. The counter in row 1, position A and the accumulator in row 4, position A supervise the dialing impulses and record the dialed digit in the accumulator in binary form. When the counter indicates the end of the first digit, the number in the accumulator is transferred to position C in row 4. This digit is shifted down one position each multiplex cycle until it reaches position I, where it is stored. Subsequent digits are similarly received in the accumulator and shifted into their positions in row 4 until three digits have been received, and stored in positions I, H and G. The "request for translator" condition RT becomes true in row 1, position B, bit 3. When the register transceiver 690 becomes idle, its shift register is loaded with the first three dialed digits; processing information comprising a request for code translation and the totals digit; and the class of service information. This information is transmitted to the translator, which processes it and returns with the instructions digit, request for code translation being zero, and the totals digit indicating which one of the number groups stores the information. This information is written into the memory. The instructions digit indicates that the register should wait until seven digits have been received before requesting another translation. When the seven digits have been received the translator is again requested, and the seven digits and the necessary processing information are loaded into the shift register and sent to the translator. The translator returns the sender instructions, and the switching digits, as well as an upgraded set of process digits.

The sender assigner is then requested, which assigns an idle sender. The sender controller 670 transfers information from the register to the sender. The sender then transmits the switching information by diphase to the markers to complete the connection, and releases the sender. The recognition of a sender release signal, by the register controller, causes the register controller to extend a disconnect signal to the register junctor and returns the register's storage area to the idle condition.

While we have described above the principles of our invention in connection with specific apparatus, it is to be clearly understood that this description is made only by way of example and not as a limitation to the scope of our invention.

At the end of the specification of U.S. Patent 3,170,041, issued February 16, 1965, to K. K. Spellnes, for a Communication Switching System, there appears a list of copending U.S. patent applications owned by the same assignee which relate to the electronic automatic exchange system disclosed in FIGS. 1–7 herein. In particular the time division multiplex register arrangement using a plurality of rows of storage in a memory for each register, with shared common logic, as disclosed herein, is covered by application Ser. No. 268,385, filed March 27, 1963, for Register-Sender Arrangement for a Communication Switching System, by R. E. Schauer, K. E. Prescher, J. G. Van Bosse, and A. C. Lange; and its continuation application Ser. No. 367,003, filed May 13, 1964, for Communication Switching System—Common Control Arrangement, by K. E. Prescher and J. G. Van Bosse. Other register features disclosed herein are covered by application Ser. No. 308,112, filed September 11, 1963, for Register-Sender Arrangement for a Communication Switching System Common Control Arrangement, by D. K. K. Lee and H. L. Wirsing.

What is claimed is:

1. In a communication switching system having switching stages for extending connections between calling and called lines, and having common translating means;
   register apparatus comprising time multiplex shared equipment and a memory in a recirculating arrangement controlled by pulses in cyclically recurring time slots, to form a plurality of registers, each having an individual time slot;
   a register transceiver comprising a shift register, a sender, and a receiver;
   a signalling path interconnecting the register transceiver and the translating means;
   means for initiating a request for transfer condition by a given register, and means effective during the time slot of said register responsive to said request condition and the transceiver being idle for loading bits of information into the shift register in parallel, and supplying a request-for-service indication to the translator,
   means responsive to an acknowledgment of the request by the translating means to set the register transceiver to a start transmission condition in which the sender is actuated and shift signals are supplied to shift the information out of the shift register as serial binary digits to modulate the sender to cause it to transmit the information in serial binary form over the signaling path to the translating means,
   means responsive to completion of transmission of information from the register transceiver to change it to a receive mode in which the receiver is actuated and shift signals are supplied to the shift register;
   the translating means having an arrangement to receive the serial binary information from the signaling path, an arrangement to translate the information, and an arrangement to send the translated information in serial binary form over the signaling path to the register transceiver;
   the translated information received at the register transceiver being demodulated by the actuated receiver and shifted into the shift register;
   and means effective during the next time slot of said given register for transferring the information in parallel from the shift register into the memory.

2. In a communication switching system, the combination as claimed in claim 1, wherein said register transceiver includes a busy-indicating device which is set to its busy state during said time slot in which the shift register is loaded, remains in the busy state until the translated information is returned, and resets to idle during said time slot in which the information is transferred from the shift register into the memory.

3. In a communication switching system, the combination as claimed in claim 2, wherein there is a plurality of groups of said register apparatus, each group having its individual transceiver, memory, time shared equipment, and time division control arrangement; all groups having access to the same translating means on a one-at-a-time basis.

4. In a communication switching system, the combination as claimed in claim 3, wherein there are a plurality of translators, and at least one ticketer; and said register transceiver includes address means for selecting to which translator or ticketer to transmit the information.

5. In a communication switching system, the combination as claimed in claim 3, wherein said translating means includes a plurality of number groups, and wherein for a given call said translation occurs twice, the result of the first translation including a number group identity which is stored in said memory as part of the returned information, and is used in the second translation as an address to select the proper number group.

6. In a communication switching system, the combination as claimed in claim 2, wherein during the time slot in which the shift register is loaded the register is marked as using the transceiver, this mark being recirculated in this register's time slot and used to identify the register time slot in which the information is to be transferred from the shift register into the memory.

7. In a communication switching system, the combination as claimed in claim 1, wherein there is a plurality of bistable control devices associated with the shift register and sender-receiver means for controlling the operation thereof.

8. In a communication switching system, the combination as claimed in claim 7, wherein said bistable control devices include a busy indicating device which is set to the busy state in response to coincidence of the shift register being idle and a request for translation signal from a register during its time slot,
- a send-mode indicating device and a shift register loaded indicating device which are set in response to the completion of loading of the shift register,
- a start transmission device which is set in response to the receipt of said acknowledgment,
- a receive-mode indicating device which is set in response to the completion of transmission of all of the information from the shift register,
- a reception completed device which is set in response to the completion of receiving back the translated information,
- and a register-being-served identifying device which is set in response to said identifying indication occurring in the time slot of the register which is being served.

9. In a communication switching system having switching stages for extending connections between calling and called lines, and having common translating means;
- register apparatus which is taken into use upon the origination of a call for registering called-line directory number information as transmitted over the calling line;
- said register apparatus comprising register equipment shared by a plurality of calls in recurring time slots, with a memory comprising a coordinate array of storage elements in a recirculating arrangement with said equipment;
- a register transceiver and a translator transceiver interconnected by a signalling path, each transceiver comprising a shift register, a sender, and a receiver;
- means effective during the time slot of a call responsive to the register transceiver being idle for loading items of call informaiton into its shift register in parallel, and supplying a request-for-service indication to the translator;
- means responsive to an acknowledgment of the request by the translator for shifting the items out of the shift register serially to modulate the sender, which transmits the information over the signalling path to the receiver of the translator transceiver, where it is demodulated and shifted serially into the translator shift register;
- the information being taken by the translator, modified, returned to its shift register, and transmitted over the signalling path to the register receiver, where it is demodulated and shifted serially into the register shift register;
- and means effective during the time slot of the call for transferring the information in parallel from the shift register into the memory.

10. In a communication switching system having a first and a second unit interconnected by a signalling path;
- a transciever included in said first unit comprising a shift register having serial input and serial output data terminals, send means coupling the output data terminals to the said signaling path and receive means coupling the signaling path to the input data terminals; means included in the first unit for seizing the transceiver and for parallel loading data into the shift register thereof, means responsive to completion of said loading to supply a request-for-service signal to said second unit which acknowledges the request and returns an acknowledgment signal, means responsive to the acknowledgment signal to set the transceiver to a start transmission mode in which shift signals are supplied to the shift register to cause the data to be serially shifted from the shift register via the output data terminals and the send means to the signaling path and thence to the second unit; means responsive to completion of transmission of information from the transceiver to change it from the send mode to a receive mode in which shift signals are supplied to cause data appearing on the signaling path to be supplied via the receive means and the input data terminals and shifted into the shift register;
- the data being received at the second unit from the signaling path and other data subsequently returned in serial binary form via the signaling path to the first unit;
- the received data at the first unit being coupled via the receive means and the data input terminals into the shift register, and means for taking the received data from the shift register via parallel output conductors.

11. In a communication switching system having a first and a second supervisory unit, said first supervisory unit including a register transceiver, the register transceiver comprising:
- shift-register means for storing and transferring first information signals to said second supervisory unit;
- control means responsive to the shift-register means having stored said first information signals to transfer a request signal to said second supervisory unit and subsequently responsive to a go-signal received from said second supervisory unit to cause the shift-register means to transfer said stored information signals to said second supervisory unit; and
- said shift-register having means for subsequently receiving and storing second information signals received from said second supervisory unit for subsequent use by said first supervisory unit.

References Cited by the Examiner
UNITED STATES PATENTS

| | | | |
|---|---|---|---|
| 2,830,125 | 4/58 | Elliott | 179—18 |
| 2,890,284 | 6/59 | Flood | 179—18 |
| 2,984,703 | 5/61 | Hartley | 179—7.1 |
| 3,001,021 | 9/61 | Wright | 179—7.1 |

ROBERT H. ROSE, *Primary Examiner.*

WALTER L. LYNDE, *Examiner.*